(12) United States Patent
Kieras et al.

(10) Patent No.: US 6,334,767 B2
(45) Date of Patent: *Jan. 1, 2002

(54) MACHINE FOR MANUFACTURING THERMOPLASTIC TUBES

(75) Inventors: Ronald E. Kieras, Woodstock; John J. Rhoades, Poplar Grove, both of IL (US)

(73) Assignee: Thatcher Tubes LLC, Woodstock, IL (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/200,054

(22) Filed: Nov. 25, 1998

(51) Int. Cl.⁷ .................. B28B 11/00; B28B 21/22; B28B 21/42
(52) U.S. Cl. .................. 425/392; 264/132; 425/383; 425/403; 425/403.1
(58) Field of Search .................. 425/383, 384, 425/392, 393, 403, 403.1, DIG. 218, 136; 264/132

(56) References Cited

U.S. PATENT DOCUMENTS

| | | | | |
|---|---|---|---|---|
| 3,047,910 A | | 8/1962 | Downs ..................... | 18/59 |
| 3,382,533 A | * | 5/1968 | Fyfe et al. ............... | 425/510 |
| 3,600,918 A | * | 8/1971 | Lemelson ................. | 72/7.4 |
| 3,778,321 A | | 12/1973 | Abbott ..................... | 156/446 |
| 4,059,379 A | * | 11/1977 | Korff et al. .............. | 425/393 |
| 4,123,312 A | | 10/1978 | Schmid et al. ............ | 156/466 |
| 4,152,566 A | | 5/1979 | Magerle ................... | 219/10.53 |
| 4,392,807 A | * | 7/1983 | Greenspan ............... | 425/393 |
| 4,826,418 A | * | 5/1989 | Kamiguchi ............... | 425/136 |
| 4,906,170 A | * | 3/1990 | Nelson et al. ............ | 425/94 |
| 5,069,856 A | | 12/1991 | Holoubek et al. ........ | 264/519 |
| 5,211,798 A | | 5/1993 | Keller ..................... | 156/500 |

FOREIGN PATENT DOCUMENTS

| | | |
|---|---|---|
| CA | 2229879 | 10/1999 |
| JP | 48-61578 | 8/1973 |
| JP | 53-47475 | 4/1978 |
| JP | 10-278126 | 10/1998 |

OTHER PUBLICATIONS

Brochure—SAESA HS–150 Laminate Tube–Making System.
Brochure—The Fully Automatic Laminate Tube Production Line—SAESA 801, 802.

* cited by examiner

Primary Examiner—Nam Nguyen
Assistant Examiner—Emmanuel Luk
(74) Attorney, Agent, or Firm—Armstrong, Westerman, Hattori, McLeland & Naughton, LLP

(57) ABSTRACT

The machine of the present invention is a means for manufacturing thermoplastic tubes from hollow thermoplastic sleeves by a variety of different manufacturing processes. The machine is a single apparatus having an indexing table with a plurality of mandrels for holding hollow thermoplastic sleeves for the purpose of transporting the same around a closed manufacturing path. The manufacturing path of the machine of the present invention is a series of stations which are mechanical devices for carrying out the manufacturing steps necessary to produce tubes from thermoplastic blank sleeves. The stations of the manufacturing path are modular so that they may be removed, added or rearranged; may be optionally connected to a process logic controller and may optionally have sensors for information feedback to the PLC device.

16 Claims, 33 Drawing Sheets

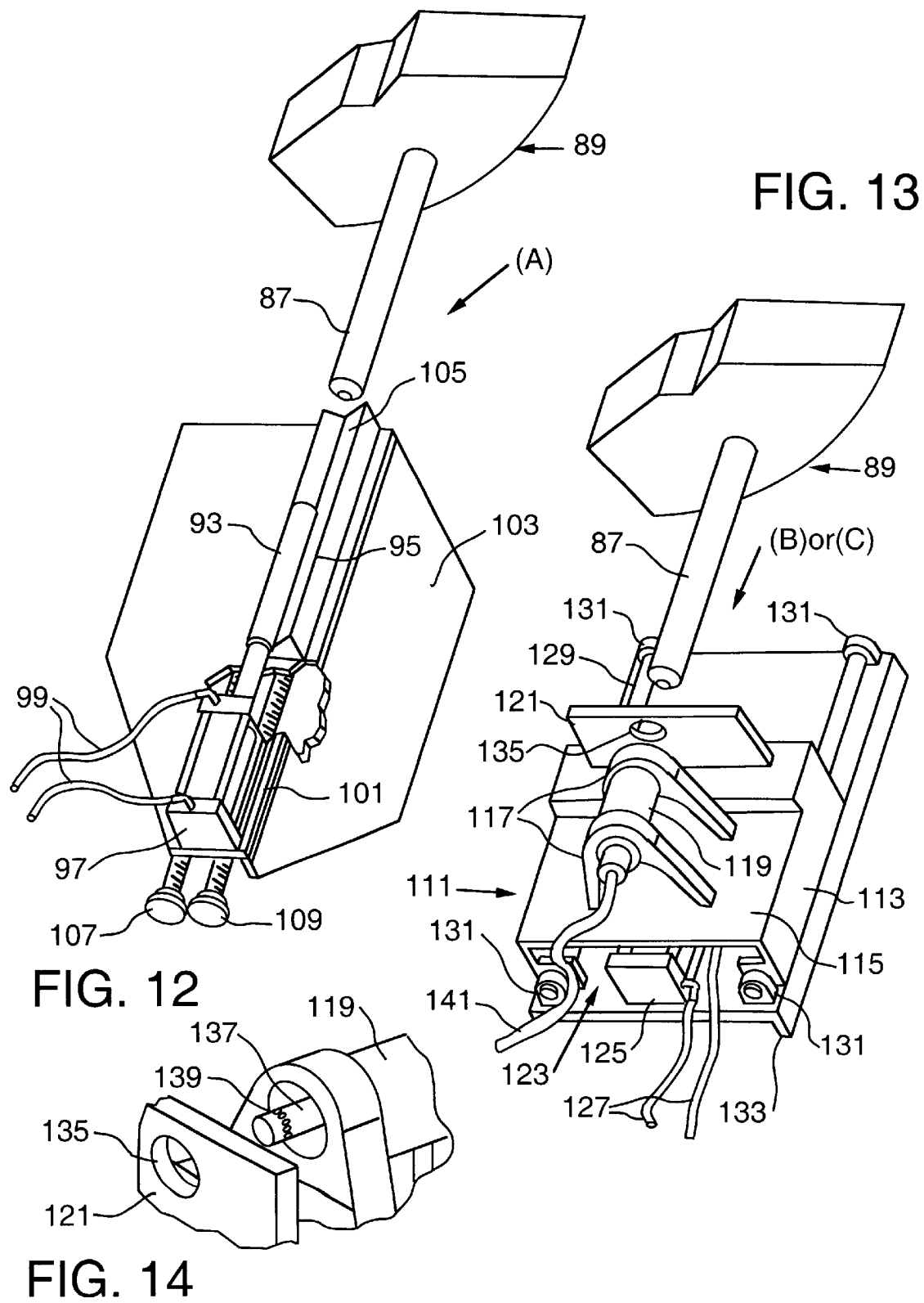

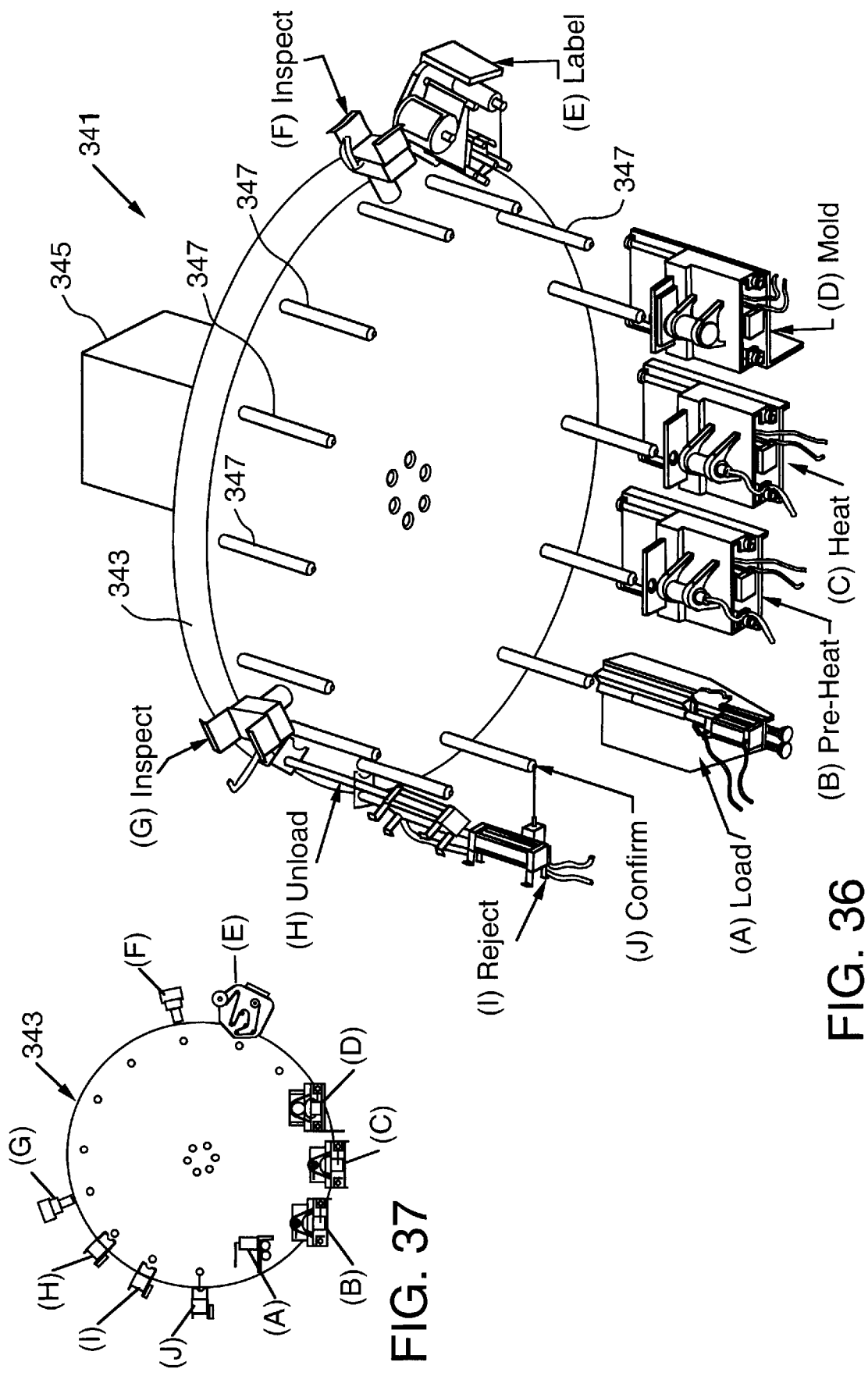

MACHINE FOR MANUFACTURING THERMOPLASTIC TUBES

CROSS REFERENCE TO RELATED APPLICATIONS

This application is related to three applications: "Method for Manufacturing Thermoplastic Tubes" application Ser. No. 09/199,500 filed Nov. 25, 1998, now U.S. Pat. No. 6,221,189, in the names of Ronald E. Kieras and John J. Rhoades; "Process Control Method for a Machine for Manufacturing Thermoplastic Tubes" application Ser. No. 09/199,643 filed Nov. 25, 1998, now U.S. Pat. No. 6,165,395, in the names of Ronald E. Kieras, John J. Rhoades and Thomas A. Frazier; "Plant for Manufacturing and Packing Thermoplastic Tubes" application Ser. No. 09/199,617 filed Nov. 25, 1998, now U.S. Pat. No. 6,047,525, in the names of Ronald E. Kieras and John J. Rhoades "Method of Forming a Headed Thermoplastic Tube" application Ser. No. 09/199,695 filed Nov. 25, 1998, now U.S. Pat. No. 6,136,247, in the name of John J. Rhoades; and "Method of Forming a Headed Thermoplastic Tube with a Reusable Closure in a Single Step" application Ser. No. 09/199,692 filed Sep. 12, 1990, now U.S. Pat. No. 6,129,880, in the name of Ronald E. Kieras and John J. Rhoades which applications are assigned to the assignee of the present application and incorporated by reference herein.

FIELD OF THE INVENTION

The present invention is a machine for manufacturing thermoplastic tubes from thermoplastic sleeves.

BACKGROUND OF THE INVENTION

The machinery commonly used today for making finished, headed thermoplastic tubes from 2 to 10 inches in length and from ½ inch to 3 inches in diameter comprises a series of machines arranged linearly and having a total process line length of about 80 to 100 feet and a total height of about 20 to 30 feet. Process lines of such dimensions are housed in factories often having several acres of floor space.

A conventional process line for producing a single type of thermoplastic tube in today's manufacturing plants includes machines for heating raw polymer material into molten plastic; extruding the molten plastic through a die to form an extruded, stretched hollow body; cooling and then cutting the hollow body into sleeves of equal lengths; transporting the sleeves to a machine for molding a head on one end of the sleeves to form headed tubes; transporting the headed tubes to another machine for decorating or applying a graphic to the headed tubes; transporting the printed tubes to yet another machine for applying a coating; transporting the printed tubes to a different machine for applying a cap to the headed end of the tubes and transporting the capped tubes to a final machine for unloading the tubes from the process line. The removed tubes are then packed for inventory or shipment. Such a process line requires at least four workers during operation, with one worker at the extrusion machine, at least two workers along the line to monitor the tube conveyors and other various machines and a final worker to pack the finished tubes at the end of the line.

Increasing size has dominated production equipment design in an effort to take advantage of economies associated with large size. A conventional process line can simultaneously handle several hundred tubes in different stages of production. While some production advantages can be achieved by large size, many limitations exist, even in view of the giant size of the machinery.

Conventional process lines have inherent manufacturing inefficiencies dictated by several factors such as those associated with the line machinery itself namely: large scale, mechanical operation, and process limitations as well as other inefficiencies like unit cost limitations. Manufacturing inefficiencies, like those described below, are serious barriers which ultimately can limit the varieties of tubes available in the market.

Large scale processing machines have land, capital, and labor requirements, the costs of which are high. Additionally, large scale equipment is complex and as a result it requires more labor and higher skilled labor to operate and maintain. Most importantly, large scale design does not necessarily improve total efficiency. While production capacity may be increased, it may be done at the cost of efficiency. Complex machines require a significant amount of capital, time and labor input which can mean low overall efficiency when compared to the output.

The mechanical operation of conventional line machinery can add inefficiency to the manufacturing process. Process line down-time is inevitable because of the mechanical constraints of current machinery. For example, about 70% to 80% of line down-time is attributable to the tube and sleeve conveyor systems. One process line will have several transport systems, each system typically being a long chain with tube holding mandrels spaced every couple of inches, wrapped around many drive gears. These chain systems easily become jammed, frequently deliver improperly positioned articles to the process machinery and often need to be stopped for adjustment and resetting. As a result of stopping one transport system, the entire manufacturing line must be shut down.

Line down-time results in production loss. If one of the processing machines on the line malfunctions on the night shift, for example, when an engineer is not available to correct the problem, the entire line will be stopped and it will remain idle until morning. This loss is inefficient and costly to a manufacturer.

The inflexibility of the production equipment creates inherent constraints on the manufacturing process. Line equipment cannot easily be rearranged to effectuate different manufacturing processes because the individual machines weigh several thousands of pounds and are not readily mobile. Furthermore, large scale machines are built for a single purpose and are limited to that purpose. For example, offset printing machines are limited to printing articles by the offset printing method. Thus the arrangement of production equipment limits the number of processing methods available to a manufacturer.

Process control for monitoring and controlling the quality of each individual tube product is not commercially available for adaption to current machinery. For example, there is no known practical way to identify, monitor and track defective products during the manufacturing process. Defective products are removed only at the end of the line. When a defect occurs on a tube at the beginning of the line, continued processing of that tube is inefficient since the tube will eventually be discarded.

Because an 80 to 100 foot tube production line requires at least four laborers per shift, has a predictable defect rate, requires time to retool for each job and costs money even to remain idle, it creates a high manufacturing cost that can only be lowered by large production jobs. It is a waste of resources to manufacture small numbers of tubes on such large machinery because the manufacturing cost per tube is too high. Conventional process lines can be limited to certain size manufacturing jobs in order to recapture manufacturing costs.

While the output of a single machine of the present invention does not compare to the production capacity achieved by one conventional 80 to 100 foot processing line, if the output of one simple efficient machine is multiplied by the use of a series of such machines, then the total output of the series of machines can rival the conventional process lines. Thus, where efficiency is maximized and multiplied, a great number of thermoplastic tubes may be produced.

OBJECTS OF THE INVENTION

It is the principle object of the invention to provide a machine for manufacturing thermoplastic tubes that more efficiently uses land, labor and capital, as compared to conventional manufacturing machines.

It is an object of the present invention to provide a flexible machine for manufacturing thermoplastic tubes to accommodate different manufacturing process methods.

It is a another object of the present invention to provide a machine for manufacturing thermoplastic tubes which can mark, identify, index and track every thermoplastic article being handled.

It is still another object of the present invention to provide a machine for manufacturing thermoplastic tubes which can be associated with other similar machines of the present invention.

It is yet another object of the present invention to provide a machine that provides an operating environment substantially free of contaminants, such as dirt and dust, for manufacturing thermoplastic tubes suitable for the pharmaceutical industry.

It is a further object of the present invention to provide a machine for manufacturing thermoplastic tubes of improved quality.

It is yet a further object of the present invention to provide a machine for manufacturing thermoplastic tubes which can manufacture large numbers of tubes as well as small numbers of tubes at similar operational costs.

It is still a further object of the present invention to provide a machine for manufacturing thermoplastic tubes which can be operably associated with a programmable logic controller.

It is a specific object of the present invention to provide a machine for manufacturing thermoplastic tubes which can monitor and confirm the integrity of each manufacturing process step.

It is another specific object of the invention to provide a single machine for the production of thermoplastic tubes which can fit into a 4×4 foot area.

Other objects, features and advantages of the present invention will become apparent from the following detailed description taken in conjunction with the accompanying drawings.

SUMMARY OF THE INVENTION

The machine of the present invention manufactures thermoplastic tubes from thermoplastic sleeves by a variety of different process methods. The machine has an indexing device with a plurality of mandrels for holding thermoplastic sleeves for the purpose of transporting the same around a closed manufacturing path. The manufacturing path of the machine of the present invention comprises a series of manufacturing stations which have mechanical devices for carrying out the manufacturing steps necessary to produce tubes from blank sleeves.

The manufacturing stations of the manufacturing path are modular so that they may be removed, added or rearranged; the stations may be optionally connected to a programmable logic controller (PLC) and may optionally have sensors for information feedback to the PLC device. The flexibility to add, remove or rearrange manufacturing stations gives the machine of the present invention the capacity to carry out a variety of different manufacturing process methods for making thermoplastic tubes. Further, with the addition of at least one PLC device, the machine can be operated by feedback control and can be associated with other similar machines.

The machine of the present invention overcomes the aforementioned disadvantages of the conventional process lines for manufacturing thermoplastic tubes. The machine is itself more mechanically efficient than a conventional process line. For example, it utilizes a single indexing device, a few feet in diameter at its maximum, which serves the same purpose as the 100 foot or longer transportation system of conventional process lines. The machine has modular manufacturing stations which can be added, removed or rearranged to create a variety of different manufacturing processes and the stations are simplistic in design which lowers the necessary capital and labor inputs. Furthermore, accurate process control may be added to the machines which creates labor savings, improves efficiency and reduces product waste.

BRIEF DESCRIPTION OF THE DRAWINGS

FIG. 12 is a schematic view of a load station;

FIG. 13 is a schematic view of a prehea station or heat station;

FIG. 14 is a schematic view of a heating probe of the preheat or heat stations shown in FIG. 13;

FIG. 36 is a schematic view of a machine of a sixth embodiment;

FIG. 37 is a schematic view from the front of the machine of FIG. 36;

DETAILED DESCRIPTION

I. Organization

Figure 1:
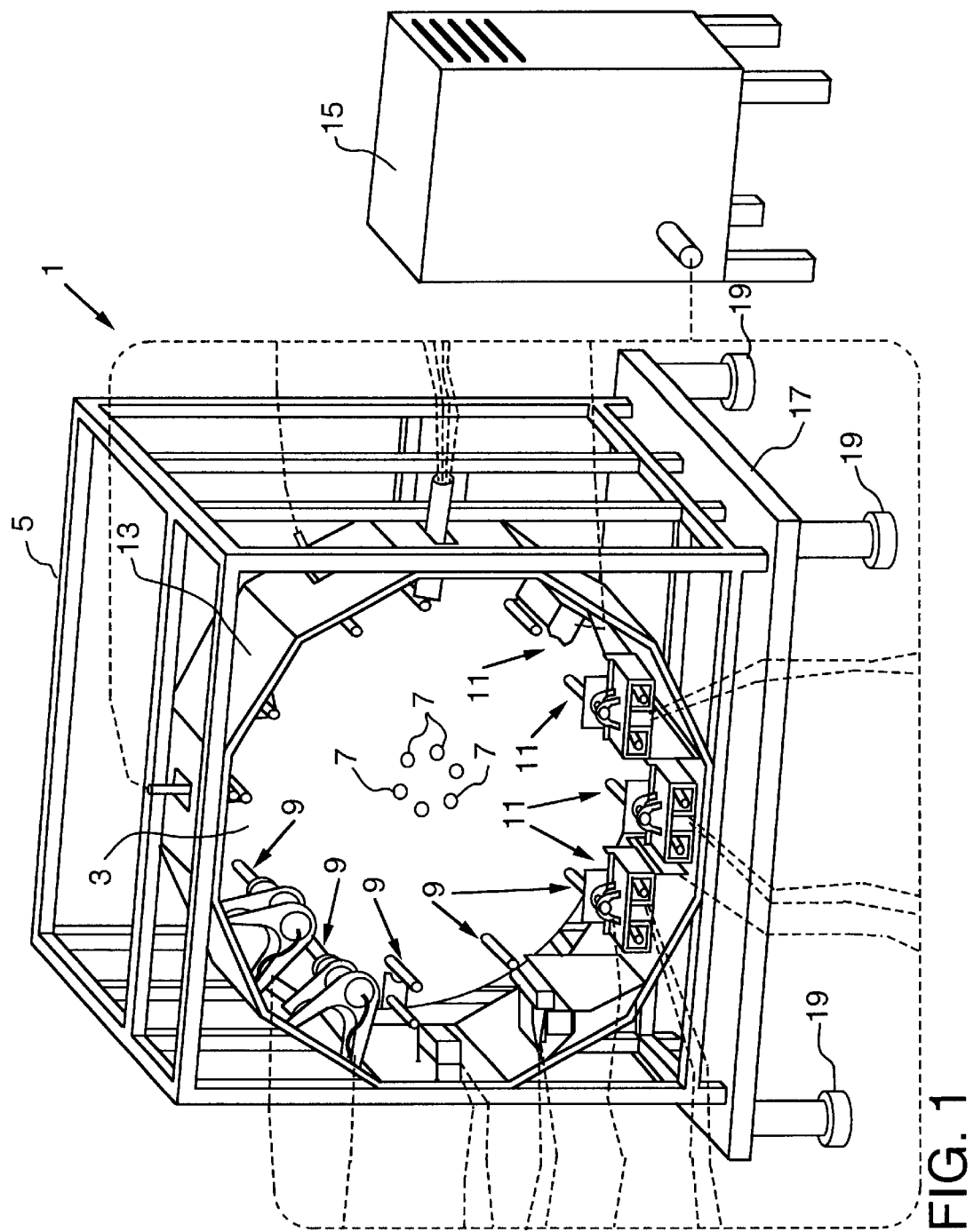
FIG. 1 is a schematic view of a machine of the present invention of a first embodiment having a PLC device.

This specification is organized into the following sections:

I. Organization

II. Introduction
   1) Conventional Manufacturing Machinery
   2) The Machine of the Present Invention III. Manufacturing with a Machine of the Present Invention
   1) Loading Thermoplastic Sleeves
   2) Forming a Head on Thermoplastic Sleeves
   3) Decorating Thermoplastic Tubes
   4) Finishing Thermoplastic Tubes
   5) Unloading Thermoplastic Tubes
   6) Additions and Alternatives
   7) Large Scale Manufacturing IV. Manufacturing with a Programmable Logic Controller V. Manufacturing Example VI. Further Embodiments The machine of the present invention, the method of manufacturing with the machine and the process control of the machine are summarized in the Introduction. Next the machine and method of manufacturing are described in detail as the machine and method would be utilized to manufacture thermoplastic tubes from thermoplastic sleeves. Manufacturing with a programmable logic controller is described followed by a manufacturing example and further embodiments of the machine of the present invention.

II. Introduction

The machine of the present invention manufactures thermoplastic tubes from thermoplastic sleeves by a variety of different process methods. The machine is a single apparatus having an indexing device transportation means, i.e) an indexing table or indexing drum, with a plurality of mandrels for holding hollow thermoplastic sleeves for the purpose of transporting the same around a closed manufacturing path. The manufacturing path of the machine of the present invention comprises a series of stations which have mechanical devices for carrying out the manufacturing steps necessary to produce thermoplastic tubes from thermoplastic sleeves.

A tube, as the term is used herein, refers to any thermoplastic sleeve having at least a head on one end. A sleeve, as the term is used herein, is a hollow body of a discrete size of any shape. A sleeve may be fabricated from a sheet, extruded in sleeve form, or made by any other known means. The sleeves used in the present invention are preferably cut from an elongated longitudinally stretched and extruded thermoplastic hollow cylinder.

The thermoplastic tubes produced according to the present method can be formed from various thermoplastic materials. Such thermoplastic materials include, but are not limited to, high density polyethylene, low density polyethylene, polypropylene, a polyester such as polyethylene terephthalate, polycarbonates, polyvinyl chloride, and the like.

Thermoplastic tubes may also be formed from multi layers or laminates of various plastic materials, such as a layer of an oxygen-impermeable material comprising a polyamide such as nylon, or ethylene polyvinyl alcohol, a polyvinylidene chloride or the like sandwiched between two polyethylene outer layers. Also, five layer composites comprising an outer layer and an inner layer of a thermoplastic such as polyethylene, polypropylene, a polyester such as polyethylene terephthalate, an intermediate layer of an oxygen-impermeable material, and adhesive layers between the oxygen-impermeable material and the outer and inner layers of thermoplastic to bond the same, can be used to form thermoplastic tubes according to the present method.

Thermoplastic tubes are formed from a flexible material and are readily squeezable and collapsible to force the contents of the tube out of an orifice formed in the end of the tube at the head portion. They are generally of a size having a wall thickness of the sleeve portion of between about 0.010 to 0.040 inch in thickness, while a shoulder and a neck portion of the tube will be thicker than the wall of the sleeve, generally between 0.035 to 0.045 inch thick. Since the tube is preferably formed from an extruded sleeve, the wall thickness of the sleeve portion will be very uniform, with a variance in wall thickness of the sleeve portion being only about + or −10 percent.

Preferably the extruded sleeve from which the thermoplastic tube is formed is a sleeve cut from an extrusion which has a wall thickness in the molten state preferably two to three times the wall thickness of the final cooled extruded thickness. The extrusion from which the sleeve is cut can be of any shape. Consequently, the sleeve cut from the extrusion can take the shape of the extrusion like cylindrical, oval, elliptical, rectangular or any other shape. The shape of the sleeve used in the present invention is typically cylindrical. Such a tubular extrusion, as is known, is formed by extruding thermoplastic material from an extrusion annulus in a molten state and stretching the hot tubular form, in the direction of the longitudinal axis, into a tube or sleeve having a wall thickness one-half (½), one-third (⅓), or less, than the extrusion annulus. Such a stretch oriented extruded sleeve, when heated above the glass transition temperature of the thermoplastic material, due to the plastic memory of the thermoplastic material, will increase in thickness to the thickness of the molten material exiting the extrusion annulus, and shrink in length, thus providing sufficient molten plastic mass to form a head on the sleeve according to the present method. When using high density polyethylene (HDPE) or low density polyethylene (LDPE), for example, the annulus would extrude a tubular form of about 1.5 inch in diameter having a wall thickness between about 0.040–0.046 inch, which would be stretched into a stretch oriented extruded sleeve of about 1.0 inch in diameter having a wall thickness between about 0.015–0.018 inch. The final thermoplastic sleeves used in the present invention can be of any typical diameter such as ½, ⅝, ¾, ⅞, 1, 1 3/16, 1 ⅜, 1 ½ and 2 inches.

In addition to forming a head on a thermoplastic sleeve, there are many other manufacturing process steps that may be performed on a thermoplastic sleeve such as decorating, securing a cap to the headed end, marking articles with indicia, etc. All manufacturing steps are performed by the manufacturing stations located around the closed manufacturing path.

The stations of the manufacturing path of the present machine are modular so that they may be removed, added or rearranged; the stations may be optionally connected to a programmable logic controller (PLC) and may optionally have sensors for information feedback to the PLC device and feedback process control. The flexibility to add, remove or rearrange manufacturing stations gives the machine of the present invention the capacity to carry out a variety of different manufacturing methods for making thermoplastic tubes.

The configuration of the machine of the present invention i.e.) the configuration of the indexing device, manufacturing path and optional PLC device, depends on the desired tube to be produced. If only a simple tube is desired than the machine may be configured with the minimum stations necessary, namely a load station; a station for forming a head; and an unload station. Such a machine may also be appropriate if the sleeves are previously decorated or preprinted and only the manufacturing of a head is desired. If a decorated tube with a cap secured to the headed end is desired then the machine can be arranged with additional stations for decorating and securing a cap to the tube.

Figure 5:
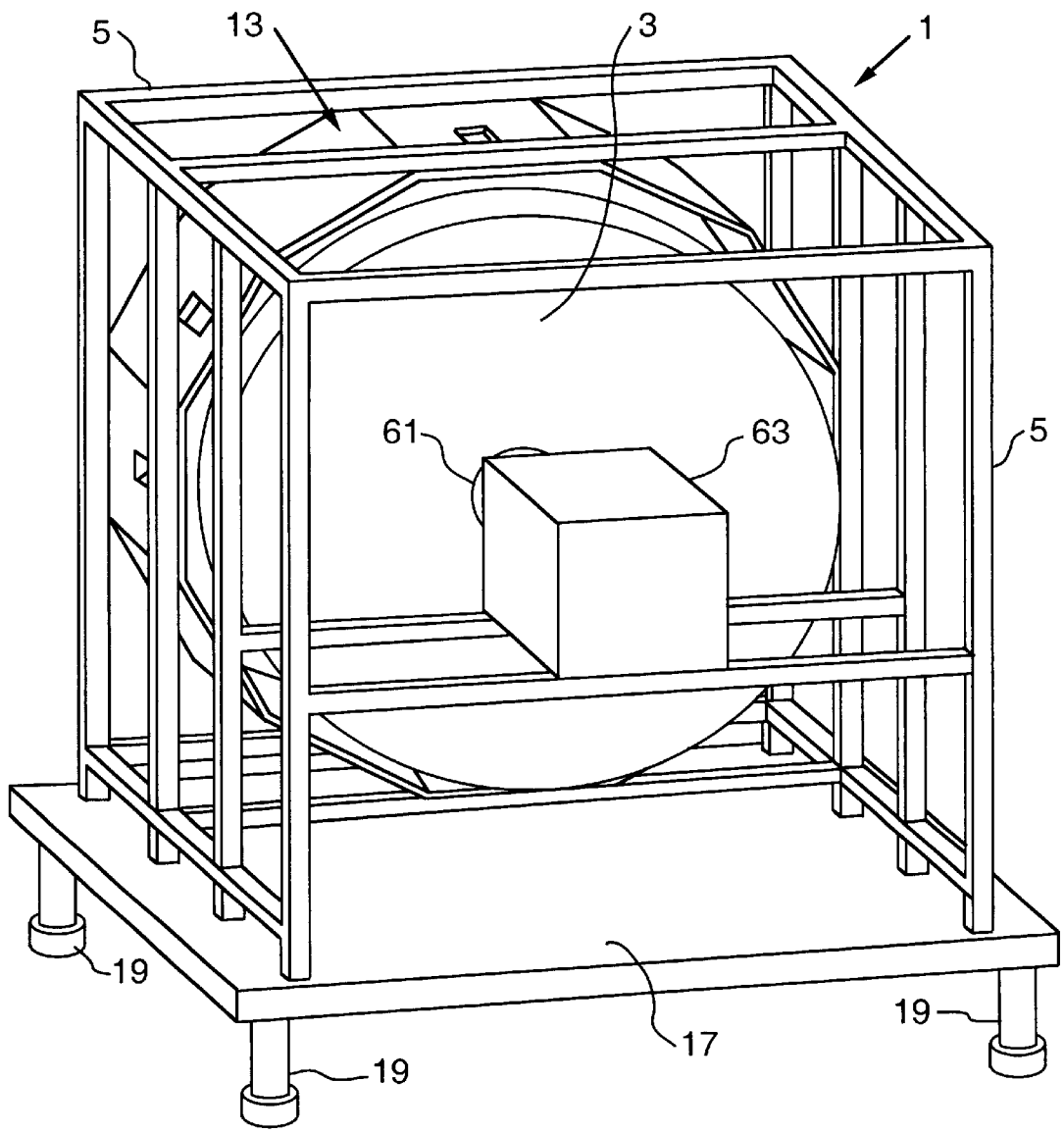
FIG. 5 is a schematic view from the rear of the machine of FIG. 4.

FIG. 1 illustrates a machine 1 of the present invention of a first embodiment having a indexing table 3 rotatable in a predetermined direction and housed in a frame 5 and mounted, by mounting bolts 7, on a fixed shaft 61 (FIG. 5) associated with an indexer 63 (FIG. 5). Indexing table 3 has a plurality of mandrels 9 mounted thereon for holding thermoplastic sleeves.

Adjacent each mandrel 9 on machine 1 is a manufacturing station 11, mounted on a mounting ring 13, for performing a process step on a sleeve mounted on each mandrel 9. The configuration of manufacturing stations 11 on mounting ring 13 comprises the manufacturing path. The manufacturing path is closed or endless because the first station in the path is adjacent to the last station in the path. All sleeves are transported around the manufacturing path by the indexing table 3. All manufacturing stations 11 of the manufacturing path may be connected to a PLC device 15, as shown by the dashed lines. Indexing table 3 rotates relative to the manufacturing stations 11. A base plate 17 with a plurality of leveling legs 19 supports frame 5. In another configuration, PLC device 15 may be housed on base plate 17.

The embodiments shown and described herein describe a machine of the present invention, a method of manufacturing with the machine and a process control of the machine. The embodiments do not intend to encompass every possible variation, configuration and combination of the machine, method of manufacturing, and process control within the scope of the present invention. Other embodiments will be apparent to those skilled in the art.

1) Conventional Manufacturing Machinery

Figure 2:
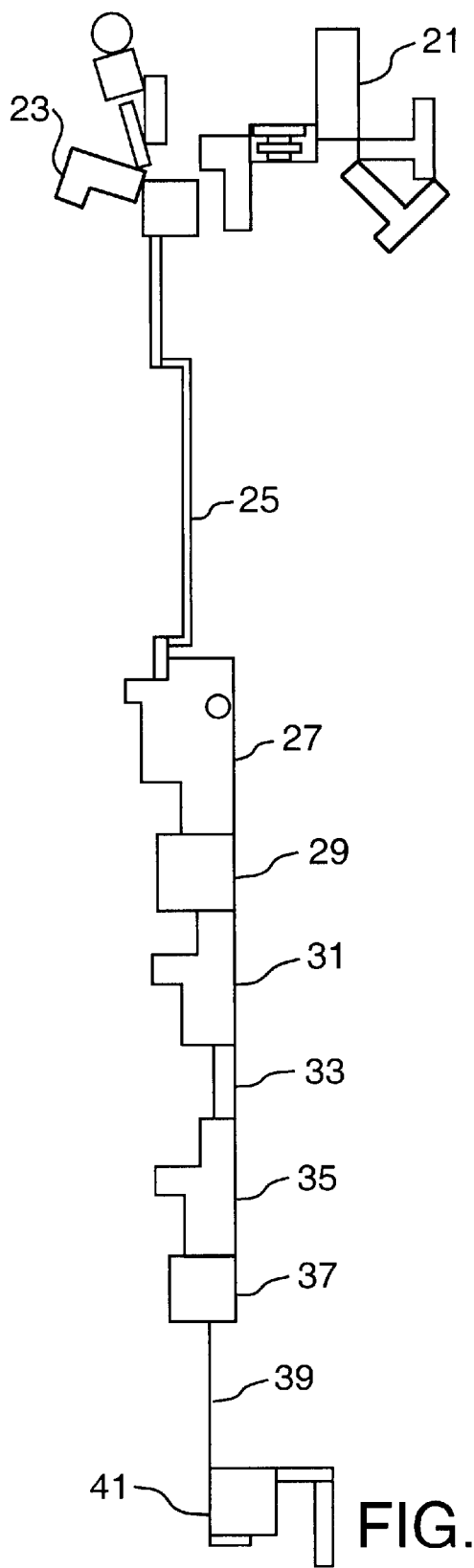
FIG. 2 is a schematic view of a single prior art process line for manufacturing thermoplastic tubes.
Figure 3:
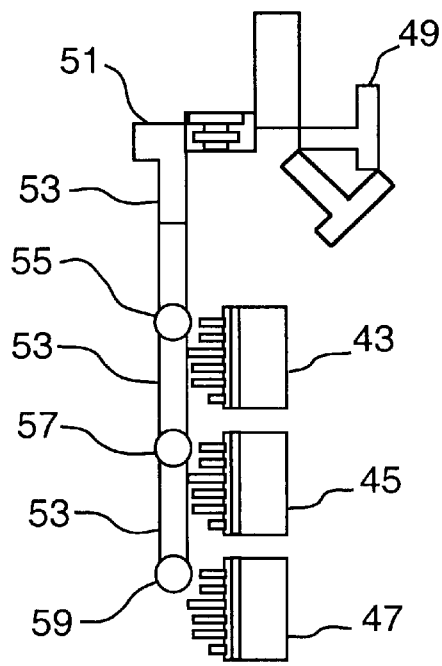
FIG. 3 is a schematic view of an arrangement of three manufacturing machines of the present invention for manufacturing thermoplastic tubes.

There is shown in FIGS. 2 and 3 a schematic view of the relative lengths of a conventional process line (FIG. 2) which is between 80 and 100 feet long and an arrangement of three machines of the present invention, about 30 feet long in length associated with a common conveyor (FIG. 3). Each arrangement in FIGS. 2 and 3 includes one machine for extruding a hollow thermoplastic body and cutting the body into thermoplastic sleeves of equal lengths.

In the conventional manufacturing process, the thermoplastic sleeves travel along a path 80 to 100 feet in length where the sleeve is formed into a thermoplastic tube which can be decorated, sealed with protective material and capped. Conversely, with only a single machine used in a plant of the present invention, a thermoplastic sleeve is loaded onto the machine whereby it travels around a closed path only a few feet in length where the sleeve is formed into a thermoplastic tube which may also be decorated, protective sealed and capped on the same manufacturing path.

Referring to FIG. 2, the machine 21 for extruding, cooling and cutting thermoplastic sleeves is followed by a loading machine 23 which loads thermoplastic sleeves onto a transportation belt 25 which transports the sleeves to a machine 27 for forming a head on one end of the sleeves. The resulting headed thermoplastic sleeves, which are now considered as thermoplastic tubes, are transported by a system 29 to a printing machine 31 for decorating the exterior of the thermoplastic tubes. The decorated thermoplastic tubes are then transported by a conveyor 33 to a capping machine 35 where a cap is snapped or screwed onto the headed end of the thermoplastic tubes. Finally, the capped tube is unloaded from the process line by an unloader 37 and transported by a conveyor 39 to a packing machine 41, where the tubes are packed for shipment.

By comparison, an arrangement of three machines 43, 45 and 47 is shown in FIG. 3. The arrangement includes a machine 49 for extruding, cooling and cutting thermoplastic sleeves followed by a loading machine 51 for loading thermoplastic sleeves onto a conveyor system 53. The sleeves travel down conveyor system 53 where they are loaded onto one of the three machines 43, 45 and 47 by mechanical feeders 55, 57 and 59. Machines 43, 45 and 47 transport the sleeves around a closed path only a few feet in length where the sleeves are transformed from blank sleeves into finished thermoplastic tubes by the action of several manufacturing stations located around the closed path.

The machine of the present invention uses significantly less sleeve and tube handling transfers compared to conventional tube manufacturing machines. This reduction, due in part to the compactness of the manufacturing path on the machine, improves efficiency and reduces the cost and time of the tube manufacturing process. In fact, the total time of manufacturing from resin pellet to finished tube is a few minutes as compared to at least a half an hour on conventional machinery. The machine of the present invention may be built to fit in a 4×4 foot area.

2) The Machine of the Present Invention

Figure 4:
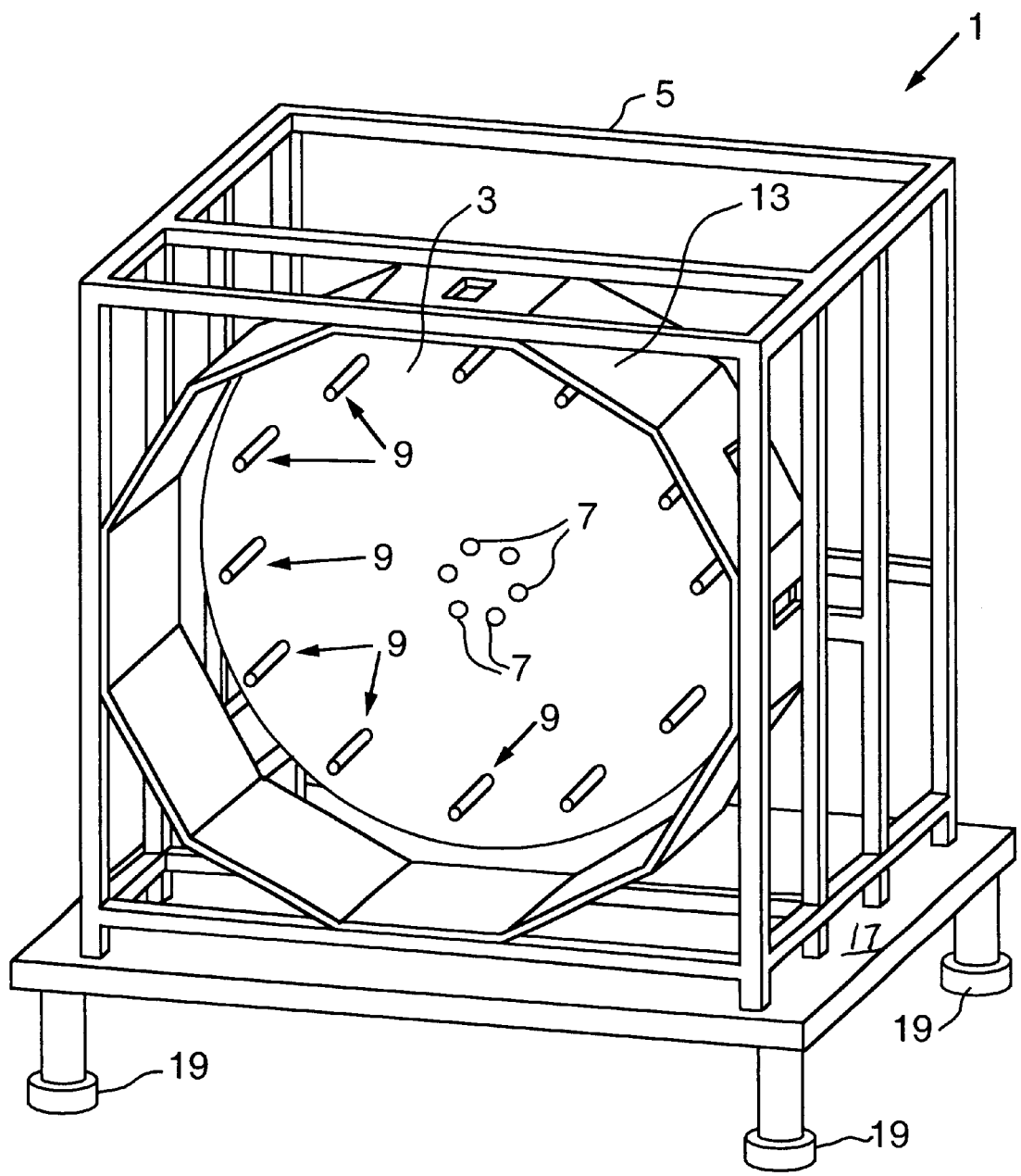
FIG. 4 is a schematic view of the machine of the first embodiment without the PLC device, shown only with an indexing table, holding mandrels, and a mounting ring for mounting manufacturing stations.

FIGS. 4–9 illustrate, in greater detail, machine 1 of the first embodiment that may be used as one of machines 43, 45 and 47 shown in arrangement in FIG. 3. FIG. 4 shows mandrels 9 of machine 1, shown without PLC device 15. Mandrels 9 are evenly spaced on indexing table 3. Indexing table 3 is typically a circular plate. While the preferred embodiment of indexing table 3 is an aluminum plate, indexing table 3 may be substituted by any other means which transports sleeves around a closed manufacturing path.

The manufacturing stations 11 of the closed manufacturing path (FIG. 1) are mounted and arranged on a support, such as mounting ring 13 (FIG. 4). Mounting ring 13 supports manufacturing stations 11 in a position such that manufacturing stations may perform a process step on a sleeve or tube on mandrel 9. In the embodiment in FIG. 1, mounting ring 13 supports manufacturing stations 11 so that they are adjacent to and in front of a corresponding mandrel 9. Alternatively, stations 11 could be mounted on a frame (not shown) in the same plane as indexing table 3 so that manufacturing stations are beside a corresponding mandrel 9.

FIG. 5 is a perspective view from the rear of machine 1 of FIG. 4, showing indexing table 3 connected to a shaft 61 rotatably mounted on an indexer 63. Indexer 63 may be conveniently mounted on frame 5.

Indexer 63 is a means for rotating or advancing indexing table 3 in a step-wise or incremental manner so that sleeves loaded onto mandrels 9 stop at each manufacturing station of the closed path for a time period long enough to effectuate a manufacturing process step. Indexing table 3, of this embodiment, rotates counterclockwise.

Figure 6:
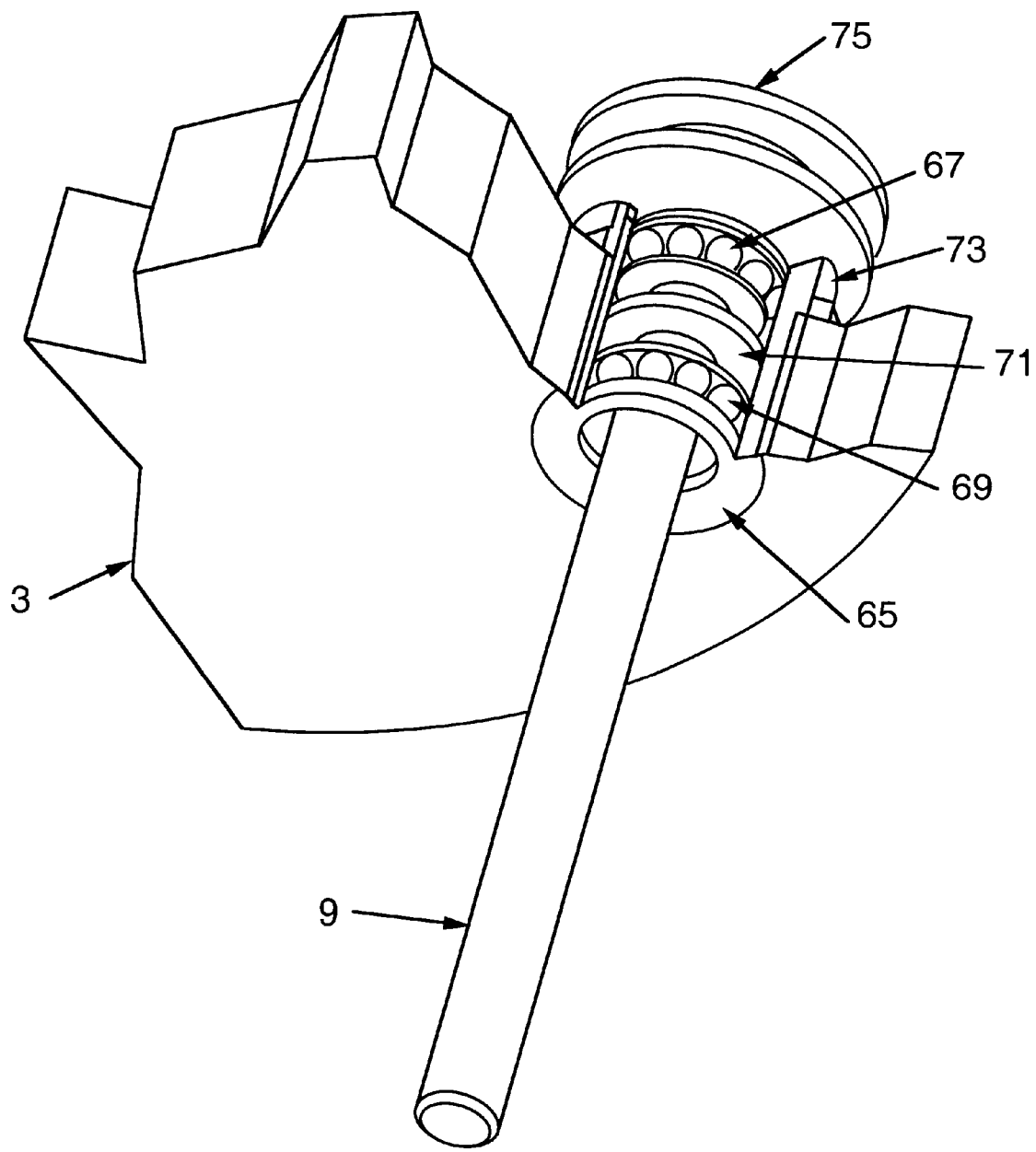
FIG. 6 is a schematic view of a housing for seating a holding mandrel in an indexing table.

FIG. 6 illustrates a housing assembly 65 for mandrel 9 on indexing table 3 of machine 1. Housing assembly 65 at the base of mandrel 9 allows mandrel 9 to rotate smoothly at various speeds, which is necessary for certain manufacturing steps. Inside housing assembly 65 are two rings 67 and 69 of ball bearings separated by a bearing spacer 71. A bearing clamp 73 is also added to housing assembly 65 for support. At one end of mandrel 9 is mounted a mandrel pulley 75 for improved weight distribution and a means to rotate mandrel 9. The desirable housing assembly 65 materials are durable materials, such as metal, because the components of housing assembly 65 wear.

Figure 7:
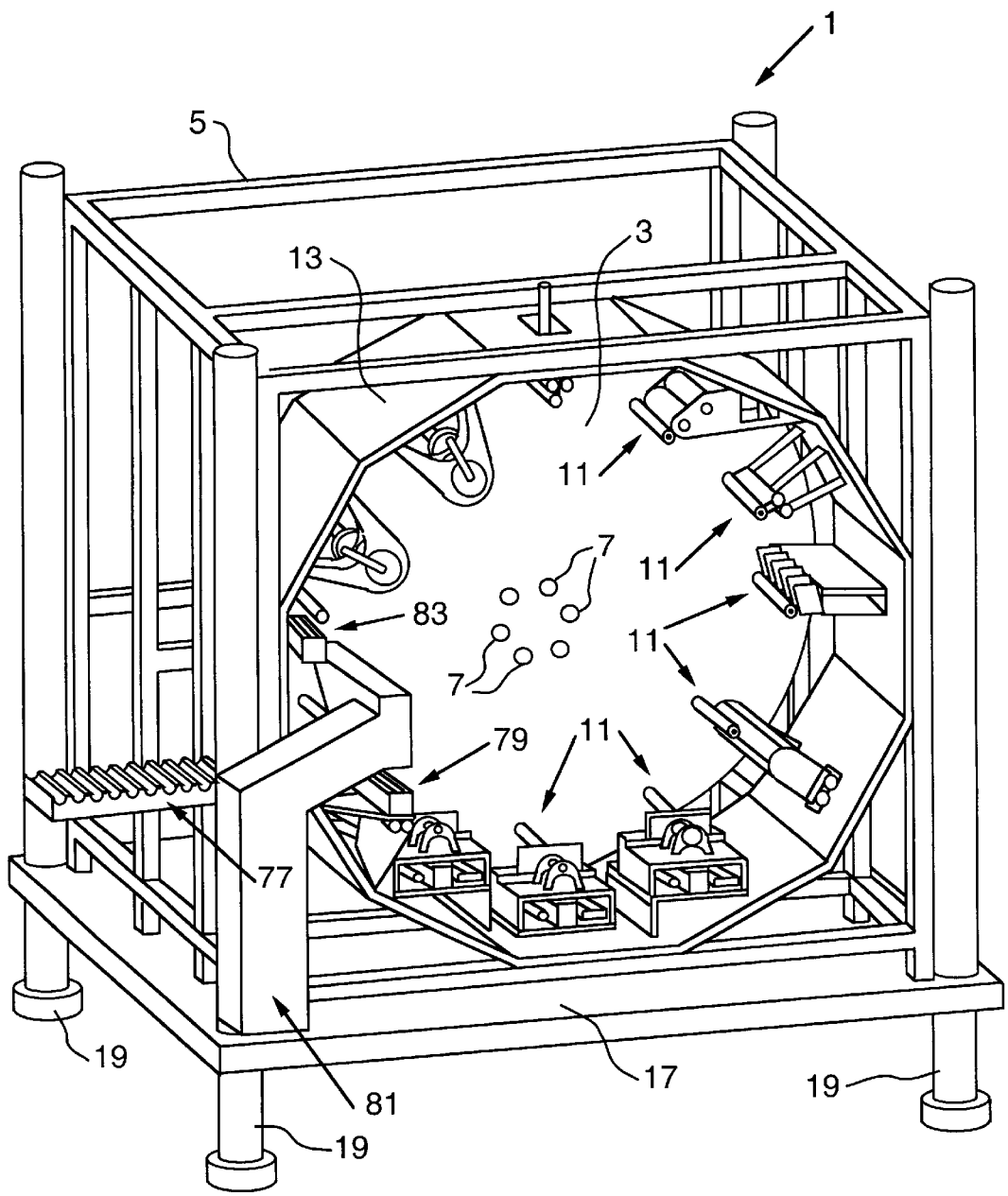
FIG. 7 is a schematic view of a machine of the first embodiment without the PLC device shown with supply and removal means.
Figure 8:
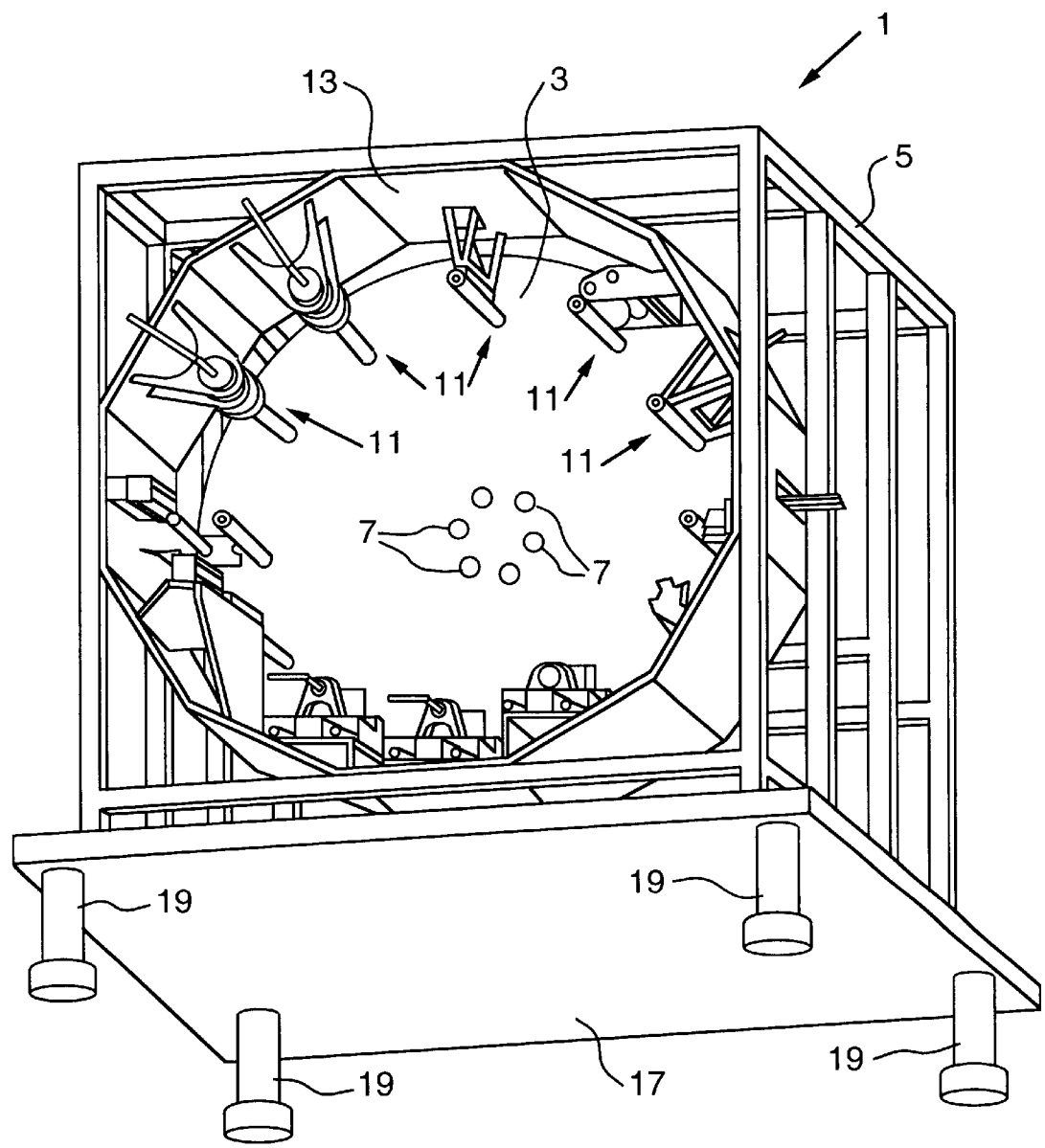
FIG. 8 is a schematic view of the machine of the first embodiment without the PLC device shown from a lower perspective.

FIGS. 7 and 8 show perspective views of machine 1. FIG. 7 shows machine 1 with pickle sorter 77 which supplies sleeves directly to load station 79. FIG. 7 also shows unload chute 81 which transports tubes from machine 1 that have been removed by unload station 83 from indexing table 3. FIG. 8 shows, in greater detail, the relative locations of load station 79, unload station 83 and the remaining manufacturing stations.

To make machine 1 operable, machine 1 must be connected to a power source and other additional input sources as necessary, such as compressed air, water, electricity, steam, heated air, etc. In additional to supplying sleeves to machine 1, other raw materials such as caps, formed heads, etc. may be necessary for the manufacturing process.

Figure 9:
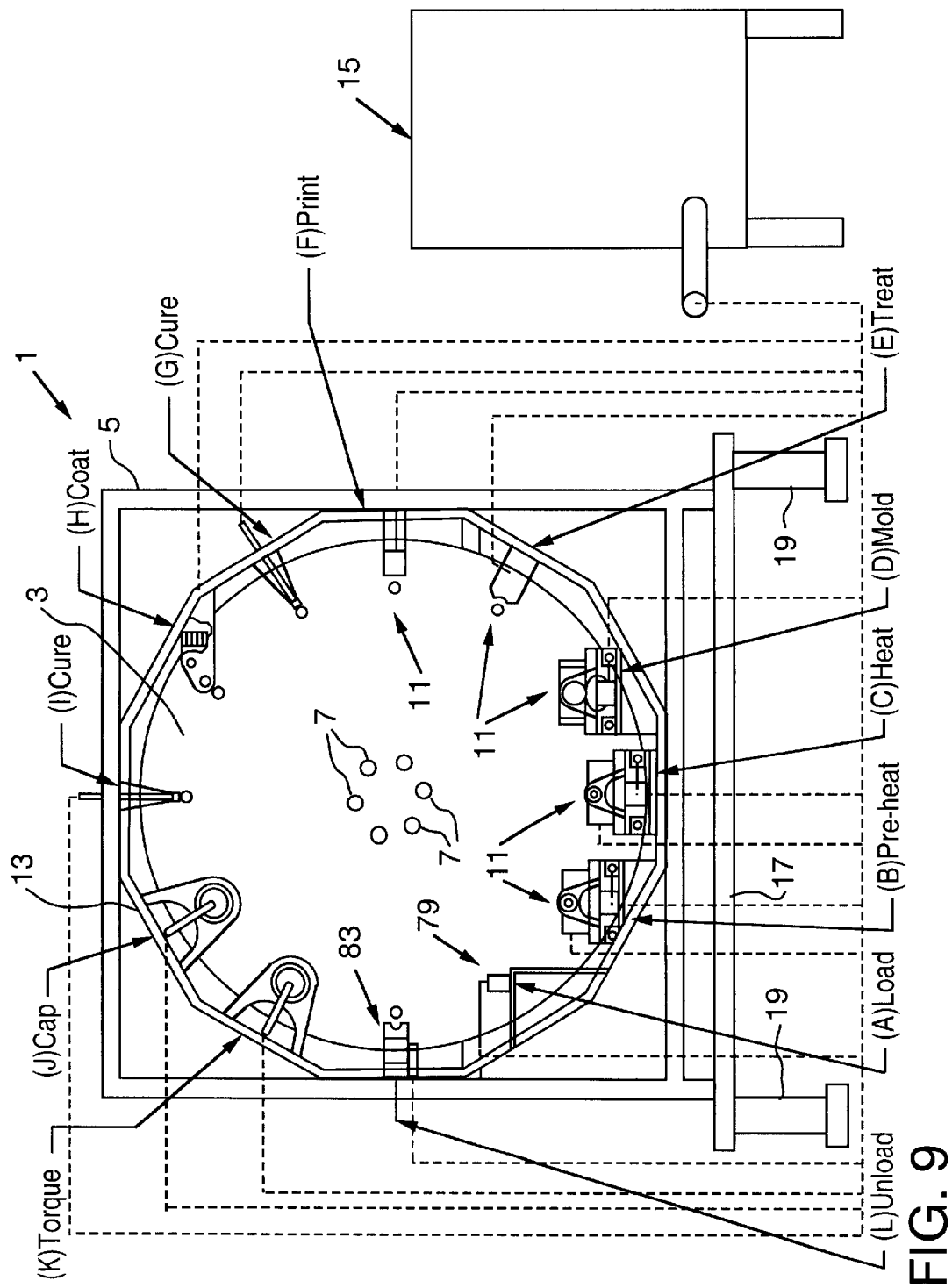
FIG. 9 is a schematic view of the machine of the first embodiment shown from the front with various stations identified.

FIG. 9 schematically shows the configuration of the 12 manufacturing stations 11 of machine 1, all connected to PLC device 15. The manufacturing stations and corresponding manufacturing process steps shown are: (A) load, (B) preheat, (C) heat, (D) mold, (E) treat, (F) print, (G) cure, (H) coat, (I) cure, (J) cap, (K) torque and (L) unload.

The minimum process steps necessary to form a tube from a sleeve are: loading the sleeve on the machine, forming a head on the sleeve, and unloading the headed sleeve. Besides the minimum steps, many other finishing or intermediate steps may be performed by additional manufacturing stations to produce a product of higher complexity.

Figure 10:
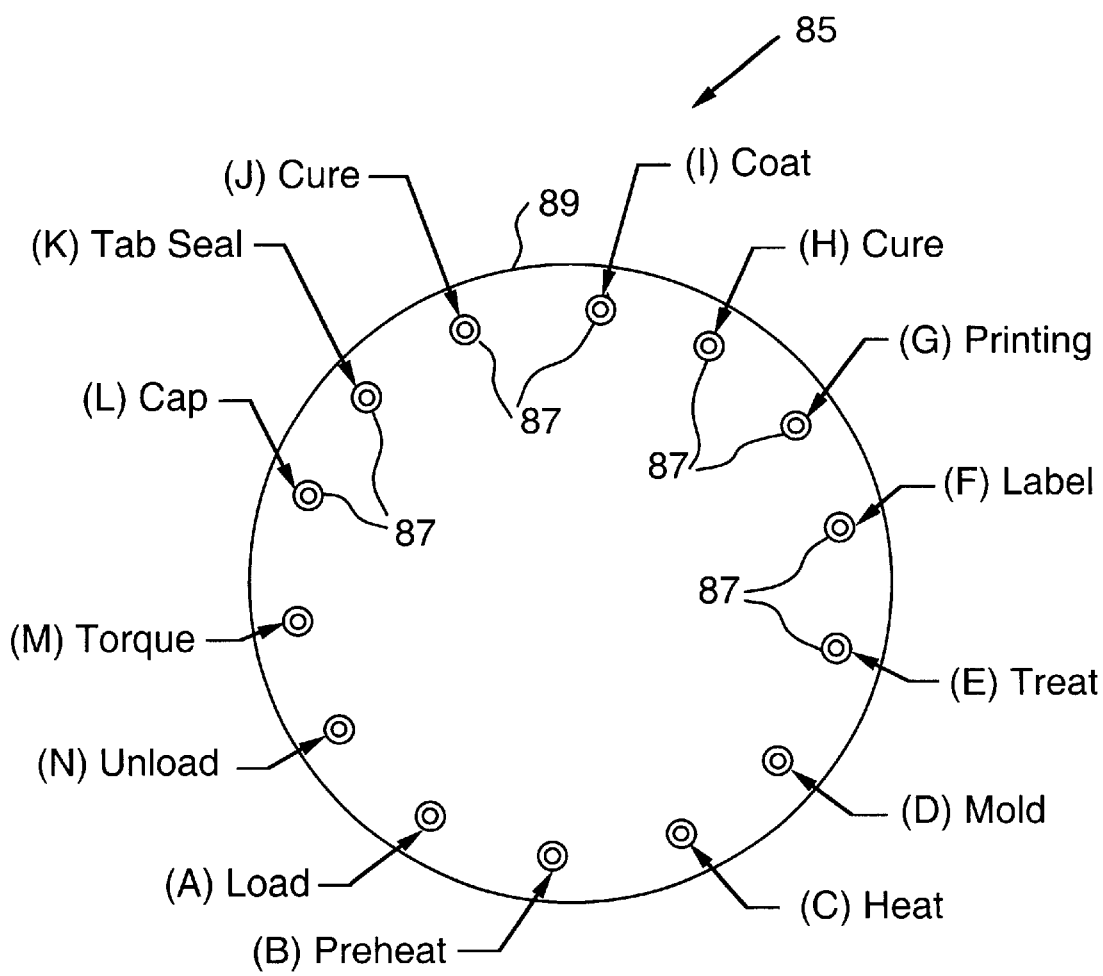
FIG. 10 shows the relative locations of fourteen different manufacturing stations located around the circumference of an indexing table, comprising a second embodiment of the machine of the present invention.

For example, machine 85 a second embodiment of a machine of the present invention represented schematically in FIG. 10, has 14 stations located adjacent to each of 14 mandrels 87 mounted on indexing table 89, which rotates counterclockwise via indexer 91 (FIG. 11) in this embodiment. The 14 different stations and corresponding process steps are as follows: (A) load, (B) preheat, (C) heat, (D) mold, (E) treat, (F) label, (G) print, (H) cure, (I) coat, (J) cure, (K) tab seal, (L) cap, (M) torque and (N) unload.

Figure 11:
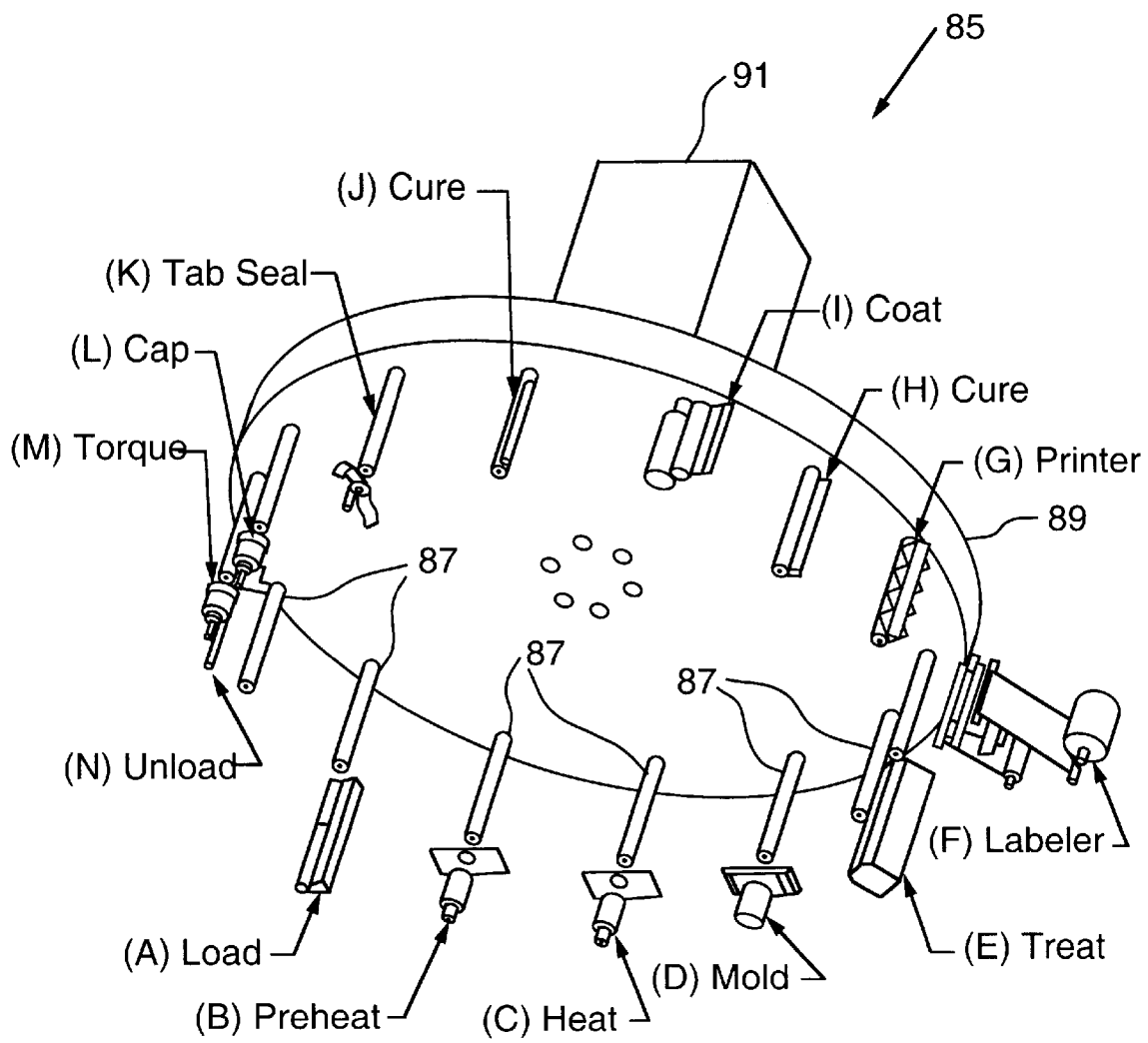
FIG. 11 is a schematic view of an indexing table and the fourteen manufacturing stations of FIG. 10.

FIG. 11 is a perspective view of machine 85 of FIG. 10, showing partial illustrations of manufacturing stations (A) through (N). Machine 85 has three different decorating stations, (F) label, (G) print and (I) coat. It is unlikely that a manufacturing process would employ all three stations. Typically, only one or two of the decorating stations would be operable. Non-operable stations may be turned off manually or by a PLC device or they may be removed.

III. Manufacturing with a Machine of the Present Invention

Again the configuration of the indexing device, manufacturing path and optional PLC device, depends on the desired tube to be produced. A decorated, sealed and capped tube will be produced using machine 85, a second embodiment of a machine of the present invention, illustrated in FIGS. 10 & 11 having 14 stations. All 14 manufacturing stations belonging to machine 85 are described below.

Each manufacturing station comprises a device for performing a manufacturing step and a means for mounting the device on a support or frame, like mounting ring 13 of FIG. 1. The mounting means may include a portion which is adjustable, like an X-Y positioning table, so the relative location of the device to the sleeve holding mandrel may be changed. The adjusting may be done manually or optionally by PLC control. The manufacturing stations operate continuously and may be coordinated with the rotation of the indexing device.

The manufacturing stations of the second embodiment shown in FIG. 11 may be grouped into five general process steps: 1) Loading, 2) Forming a Head, 3) Decorating, 4) Finishing and 5) Unloading. As will be described below there are many ways to effectuate the manufacturing process steps to create decorated, sealed and capped tubes.

1) Loading Thermoplastic Sleeves

After transporting sleeves to a machine of the present invention each sleeve is loaded on a mandrel on the indexing device at a load station. The load station comprises a loading device that can load a sleeve onto a mandrel which is about 0.005 inch smaller in diameter than the sleeve, to provide a snug fit and a means to mount the loading device to the frame of the machine. Preferably, the sleeve should be loaded and positioned so that one end of the sleeve extends a predetermined distance over one end of the mandrel.

The loading device may be conventional device: a pneumatic push rod, a cam driven push rod, an advancing and retracting linear actuator, a crank motion device or a servo-motor driven push rod. The preferred loading station, a pneumatic push rod, is described below as load station (A).

(A) Load Station

FIG. 12 illustrates the preferred embodiment of load station (A), which loads and positions sleeves onto mandrel 87 on indexing table 89. Load station (A) comprises a pneumatic loading device and a means for mounting the loading device to a frame or a mounting ring, like mounting ring 13 of FIG. 1. In this embodiment, pneumatic loading device comprises a pneumatic push rod 93 which pushes sleeves supplied to cradle loader 95, by pickle sorter 77 as shown in FIG. 7, onto mandrel 87.

Pneumatic push rod 93 is driven back and forth along cradle loader 95 by air cylinder 97, supplied with air by air lines 99, positioned behind cradle loader 95 on a mounting bracket 101. Mounting bracket 101 is further mounted on mounting plate 103 which is attached to a mounting ring or equivalent, like ring 13 of FIG. 1.

Cradle loader 95 has a "V" shaped surface 105 for aligning the center axis of a thermoplastic sleeve resting on V-shaped surface 105 with the center axis of mandrel 87, so the sleeve may be loaded onto mandrel 87, with a clearance as small as 0.005 inch, without damage. Cradle loader 95 is secured on mounting plate 103.

Both cradle loader 95 and air cylinder 97 are mounted on a portion of mounting plate 103 that is adjustable relative to the location of mandrel 87, much like an X-Y positioning table. The adjustment may be done manually by a X-axis adjustment rod 107 and a Y-axis adjustment rod 109. Alternatively the adjustment could be controlled by a PLC device.

Load station (A) operates as follows: A sleeve is supplied to V-shaped surface 105 of cradle loader 95 from a supply means. When the center axis of the sleeve is aligned with the center axis of mandrel 87, push rod 93 pushes the sleeve along V-shaped surface 105 so that the sleeve loaded onto mandrel 87 and preferably positioned with a portion extending over the end of mandrel 87 so that an end is exposed.

The ideal cradle loader has a low coefficient of friction and a surface that will not mark or scratch sleeves which rest on the surface. Possible materials that have a non-marking surface with a low coefficient of friction are Teflon and Delrin, a type of lubricated nylon.

After sleeve is loaded onto mandrel 87, indexing table 89 advances or "indexes" one position and stops again so that the loaded sleeve is adjacent to the next station downstream load station (A) in the closed manufacturing path.

2) Forming a Head on Thermoplastic Sleeves

In the preferred embodiment, a head is formed on the exposed end of the loaded sleeve by first heating the exposed end above the glass transition temperature so the thermoplastic is molten and then forming the molten thermoplastic into a head with a mold die or equivalent device.

In this embodiment, a single indexing device supports sleeves and tubes in a variety of different stages of manufacturing. The speed of rotation of the indexing device is limited by the speed of the slowest manufacturing step. In this embodiment time is conserved by dividing the heating step between two stations, a preheat station and a heat station.

Machine 85, of the second embodiment, formes a head on a thermoplastic sleeve by the separate steps of preheating, heating and molding. Three manufacturing stations are used, preheat (B), heat (C) and mold (D).

(B) Preheat Station

FIG. 13 illustrates preferred preheat station (B), located downstream from load station (A). Preheat station (B) heats the portion of a sleeve which extends beyond the end of mandrel 87 above the glass transition temperature to create a molten thermoplastic mass for molding into a head. Preheat station (B) has a heating device secured to a movable carriage and means to mount the device and carriage to the frame of the machine of the present invention, like mounting ring 13 of FIG. 1. The carriage brings the heating device into proximity with the exposed portion of the sleeve.

In FIG. 13 carriage 111 has a frame or housing 113 which provides a top surface 115 for securing by brackets 117 a heating device 119 behind a sleeve cooling bushing 121 and an interior cavity 123, under top surface 115, for mounting or locating a means to impart motion to carriage 111, like an air cylinder 125. Carriage 111 is pneumatically driven by an air cylinder 125, supplied with air by lines 127. Carriage 111 is slidably mounted on rods 129 which are linear guide means. Each rod 129 is secured by a bracket 131 at each end of rod 129 to mounting plate 133.

Preheat station (B) operates as follows: when a sleeve loaded and positioned on mandrel 87 is aligned with the center axis of cooling bushing 121 and heating device 119 of preheat station (B), carriage 111 advances along rods 129 to bring heating device 119 in proximity to the sleeve. Carriage 111 may move by any conventional method, namely a servo or indexing motor, a pneumatic, hydraulic, electric or magnetic actuator.

As carriage 111 advances, the exposed portion of the sleeve enters and passes through an orifice 135 in cooling bushing 121. The exposed portion of the sleeve is partially inserted into heating device 119. Heating probe 137 located in heating device 119 extends into the exposed portion of the sleeve. The interior surface of the exposed portion is then heated by hot air exiting small openings 139, shown in FIG. 14, at the end of heating probe 137. Air is supplied to heating device 119 by supply line 141. Cooling bushing 121, which may be cooled by a water jacket (not shown), substantially prevents the heat applied to the exposed end of the sleeve from spreading to the remainder of the sleeve.

Carriage 111 retracts by the action of air cylinder 125 to its original position, out of the path of motion of mandrel 87, after a preselected period of time. The time of heating depends on the material and the thickness of the thermoplastic to be heated. After carriage 111 retracts, the preheating step is completed.

Any means for heating an air flow in heating device 119 is satisfactory. Typically, heating device 119 is made of a metal which has good electrical resistance. In this embodiment, heating device 119 is itself heated so that air flowing through it is raised to the desired temperature. The air flow rate, the temperature of the heating element and time of heating can all be controlled by a PLC device.

Preheat station (B) is made of light weight durable materials. For example, cooling bushing 121 may be made of aluminum and heating element 119 and heating probe 137 may be made of stainless steel. Aluminum provides a durable and light weight material for housing 113 of carriage 111. Rods 129 receive a lot of wear so they need to be made of a durable and hard material. Ideally, rods 129 can be made from cold rolled steel.

After the heating at preheat station (B), indexing table 89 advances one position so that the heated exposed end of the sleeve is now adjacent heat station (C).

(C) Heat station

FIGS. 13 and 14 also illustrate the preferred heat station (C) of this embodiment. Preferably heat station (C) is physically the same as preheat station (B). Heat station (C) operates in the same manner as preheat station (B) and heats the preheated exposed portion of the sleeve above the glass transition temperature. Depending on the heating time of preheat station (B), the carriage 111 of heat station (C) (FIG. 13) may move at the same rate or a different rate than carriage 111 of preheat station (B).

As the inside surface of the sleeve is heated close to the glass transition temperature, in this embodiment, the inside surface melts faster than the outside surface. The heating of a longitudinally stretched and extruded thermoplastic sleeve results in die swelling. Die swelling is the shrinking and thickening of a thermoplastic sleeve because the plastic memory of the sleeve wants to return the sleeve to its original larger shape, the shape of the die used in the extrusion process. The molten preform mass at the heated end of the sleeve thickens and is ideal for molding a head onto the end of the sleeve.

After the heating is completed carriage 111 of heat station (C) retracts out of the path of mandrel 87. Indexing table 89 advances one position so that the hollow thermoplastic sleeve is adjacent mold station (D) downstream from heat station (C).

(D) Mold station

Figure 15:
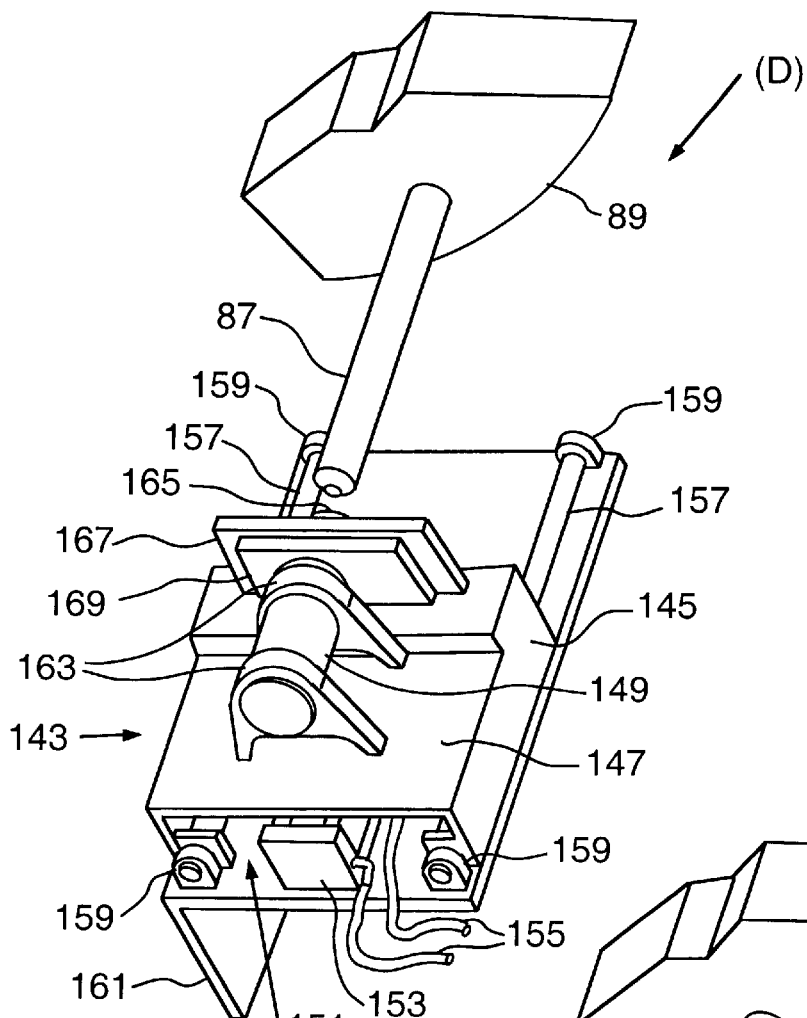
FIG. 15 is a schematic view of a mold station.
Figure 16:
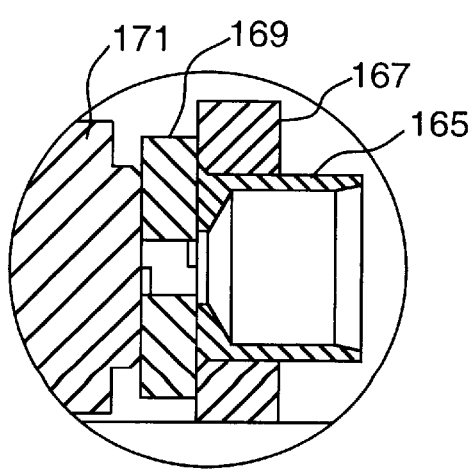
FIG. 16 is a cross-sectional view of a mold die used in the mold station of FIG. 15.

FIGS. 15 and 16 illustrate preferred mold station (D), located downstream from heat station (C). Mold station (D) forms a head from the heated thermoplastic mass at the end of the sleeve previously heated in preheat station (B) and heat station (C). Mold station (D) has a mold die secured to a movable carriage and means to mount the device and carriage to the frame of the machine of the present invention, like mounting ring 13 of FIG. 1. The carriage brings the mold die into contact with the exposed portion of the sleeve.

In FIG. 15 carriage 143 has a frame or housing 145 which provides a top surface 147 for securing a mold die 149 and an interior cavity 151, under top surface 147, for mounting or locating a means to impart motion to carriage 143, like an air cylinder 153. Carriage 143 is pneumatically driven by an air cylinder 153, supplied with air by lines 155. Carriage 143 is slidably mounted on rods 157 which are linear guide means. Each rod 157 is secured by a bracket 159 at each end of rod 157 to mounting plate 161.

In this embodiment, mold die 149, secured by brackets 163 to top surface 147 of carriage 143 and preferably made of aluminum or steel, has four components: a mold bushing 165, a mold bushing plate 167, a thread insert plate 169 and an orifice pin bushing 171, as illustrated in cross-section in FIG. 16. Mold bushing 165 forms the entrance to mold die 149. Mold bushing 165 guides the heated sleeve into mold die 149. The subsequent components, mold bushing plate 167, thread insert plate 169 and orifice pin bushing 171 shape portions of a head on the end of the sleeve. A die with four components, like mold die 149, allows a manufacturer to selectively shape the head of a sleeve with specific members to comprise mold die 149. Orifice pin bushing 171 contains a spike (not shown) located in the center to form an orifice in the headed end of the thermoplastic tube.

Alternatively the mold die may be a one-piece die which does not open. Such a die would be useful for forming a simple head on a sleeve. The die may take the form of a simple one-piece member with a concave face to shape the sleeve end portion of the molten thermoplastic into a closed end of a tube. But if threads or undercuts are desired on the head, then at least a portion of the mold die, for example, must open to allow the release of the tube once the head has been formed. Simple open and close pneumatic dies, like an air cylinder split die, are available for this purpose.

The time and pressure of the molding step are important. The time for molding should be limited to the time necessary to form a head from the heated thermoplastic. If a head is not removed from a die once formed, it may stick to the inner surface of the die. If the mold pressure is too great, the thermoplastic may be pressed out of the mold. If the mold pressure is weak, a head may be poorly formed and uneven. The time of molding and pressure used will depend on the thermoplastic and its thickness. Time and pressure may be controlled by a PLC device.

After a head is formed, indexing table 89 indexes to the next station located downstream, treat station (E).

3) Decorating Thermoplastic Tubes

As previously mentioned there are a variety of ways to decorate the outside surface of a thermoplastic sleeve or thermoplastic tube if it has been so formed. The decoration step may precede the head forming step. In this embodiment however, decoration occurs after forming a head on the sleeve.

Decorating may occur by a variety of different means and methods. For example, a label may be applied to a tube by a label dispensing device. A tube may be marked with an indicia, including an individual indicia or a printed graphic. Many printing methods are know for printing indicia on tubes, such as offset printing, screen printing, foil printing, inkjet printing, letter printing, computer printing, etc. A tube may also be decorated by being coated, heat embossed or etched.

The outside surface of a thermoplastic tube or sleeve is typically treated prior to decorating by printing, coating or labelling so that the outer surface is more receptive or adherent to a printed graphic. The type of treatment step will depend on the decoration step that follows.

The manufacturing stations used to decorate the thermoplastic article on machine 85 of the second embodiment include: treat station (E) for pretreating the thermoplastic article, label station (F), print station (G), coat station (I) and cure stations (H) and (J).

(E) Treat station

Often before a printed indicia or label may be applied to thermoplastic polymer, the polymer must be treated to receive the printed indicia or label. There are a variety of ways to surface treat thermoplastic, such as, flame treatment, corona treatment, ionic treatment, electrical treatment, heat treatment or chemical treatment.

Corona treating is common and works as follows: A corona treating system is like a capacitor. High voltage is applied to an electrode. Between the electrode and a "ground" is a dielectric, comprised of the thermoplastic tube and air. The voltage buildup on the electrode ionizes the air in the electrode, creating the highly energized corona. This excites the air molecules, reforming them into a variety of free radicals, which then bombard the tube surface, increasing its polarity by distributing free bond sites across it. This makes the surface more receptive to printed indicia.

Flame treatment is common for bottles, tubing, and automotive parts. Like corona, it induces an ionized airstream, which alters the surface as it impinges upon it. Flame treatment is accomplished by burning an ultra-lean gas mixture, whose excess oxygen is rendered reactive by high temperatures.

Treatment, specifically corona and flame treatment, alter a polymer's surface chemistry. The presence of carbonyl and hydroxyl groups, which are absent on an untreated surfaces, enhances wetability, allowing inks, coatings, and adhesives to flow out and coat uniformly.

Figure 17:
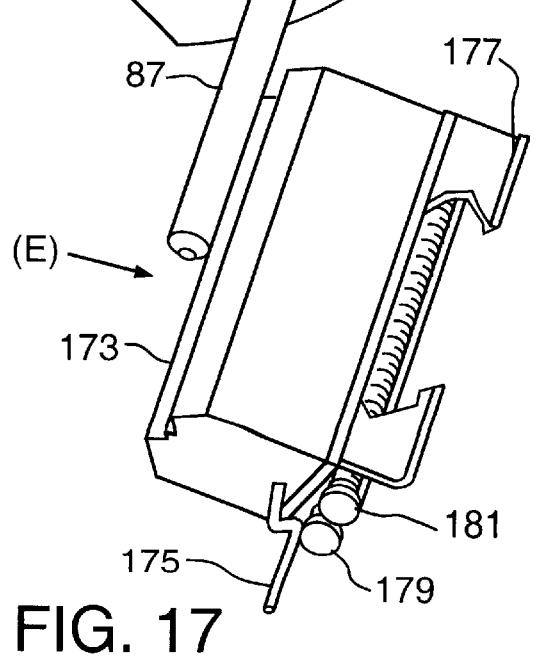
FIG. 17 is a schematic view of a treat station.

FIG. 17 illustrates treat station (E). Treat station (E) comprises treatment device 173, having supply line 175, which provides the means for treating a thermoplastic tube located on mandrel 87. In this embodiment, treatment device 173 is a corona treater. Treatment device 173 is secured to mounting bracket 177 that is adjustable relative to the location of mandrel 87, much like an X-Y positioning table. Mounting bracket 177 has a X-axis adjustment rod 179 and a Y-axis adjustment rod 181. Mounting bracket 177 is further mounted on the frame of the machine.

(F) Label Station

In this embodiment, the first decorating station downstream treat station (E) is label station (F). Label station (F) has a device for applying adhesive labels to the exterior surface of thermoplastic tubes and a means to mount the device to the frame (not shown) of the machine. A device suitable for applying labels to thermoplastic tubes may be used in label station (F). The indigo or zicon processes are preferable for labeling on thermoplastic tubes.

Figure 18:
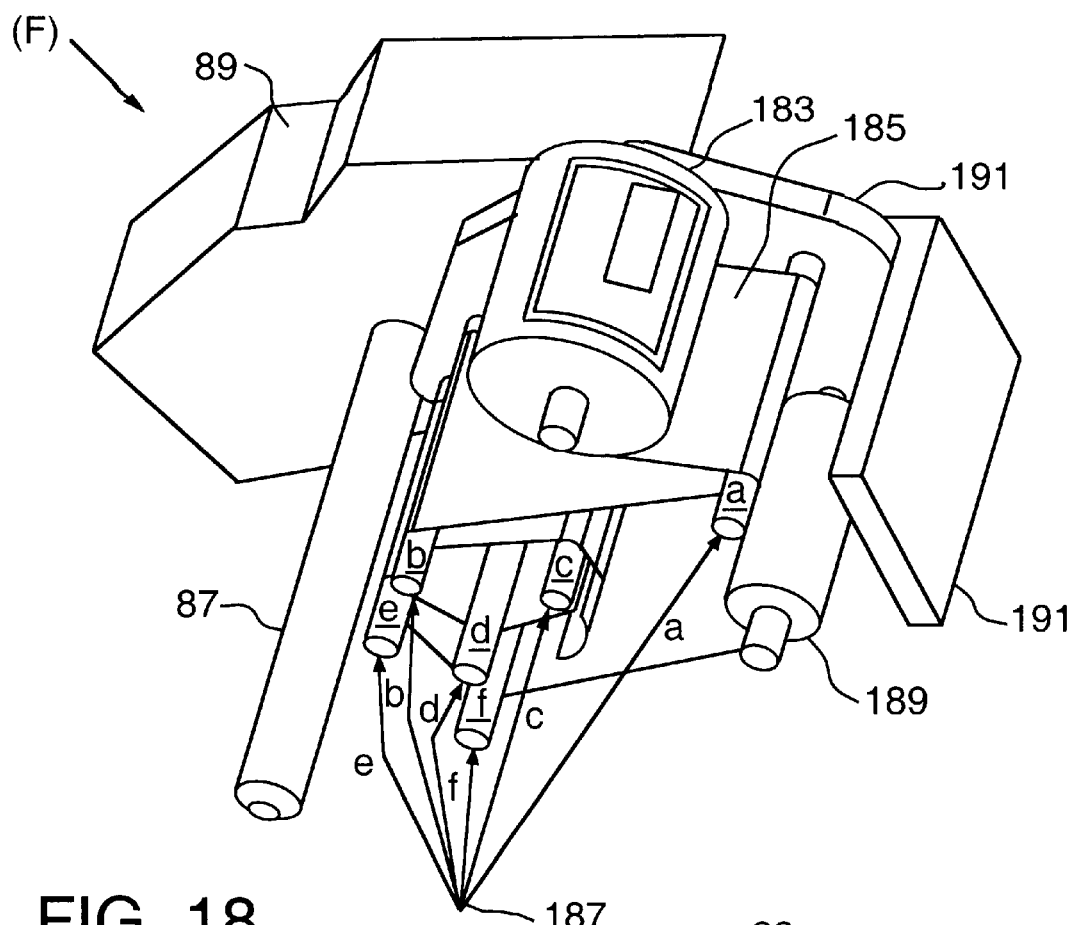
FIG. 18 is a schematic view of a label station.

FIG. 18 illustrates preferred label station (F). Label station (F) has a label dispenser 183, which dispenses sheet 185, having labels thereon, which travels through a series of directional cylinders 187a, b, c, d, e, and f, which are label guides, to a final label intake roll 189. Sheet 185 exits dispensing device 183, travels to directional cylinder 187e, which is in close proximity with a tube on mandrel 87. When sheet 185 passes directional cylinder 187e, an individual label is pinched off sheet 185 and pressed against a tube. The empty label sheet 185 is rewound on label intake roll 189.

It is important that the labels are applied to tubes and not to mandrel 87. To avoid such error, a sensor can be included in label station (F) to detect whether a tube is located on mandrel 87.

Label station (F) is a labeling device housed in a frame 191 which is mounted on a frame or mounting ring, like mounting ring 13 as shown in FIG. 1, of the machine of the present invention.

(G) Print station

Figure 19:
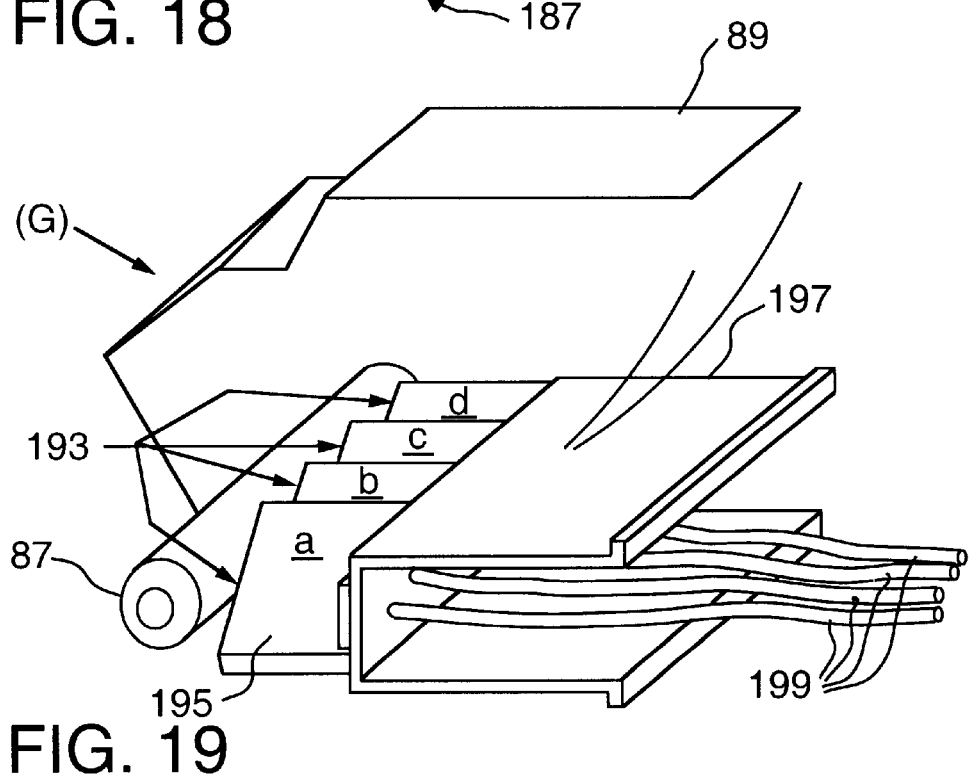
FIG. 19 is a schematic view of a print station.

Instead of applying an adhesive label to the exterior of the thermoplastic tube, a printed indicia may be applied to the tube. FIG. 19 illustrates a preferred inkjet printer of print station (G) having four printer head cartridges 193a, b, c and d disposed on a bar 195 which is secured to mounting bracket 197, which is further mounted to the frame (not shown) of the machine of the present invention. Printer head cartridges 193a, b, c and d are connected to a plurality of ink supply and control lines 199.

The inkjet printer of print station (G) is preferably controlled by a PLC device. A PLC device gives a manufacturer the ability to mark each tube with an individual indicia or the same printed graphic. A PLC device can control the ink flow and pattern of printing from the printer head cartridges of an inkjet printer.

A PLC device may be programmed to print individual indicia, like a unique serial number on each tube. Thus an inkjet printer is advantageous because of the ability to quickly and automatically alter, modify, and change printed indicia on thermoplastic tubes.

After a printed indicia is applied to the tube, the printing must be cured.

(H) Cure station

Figure 20:
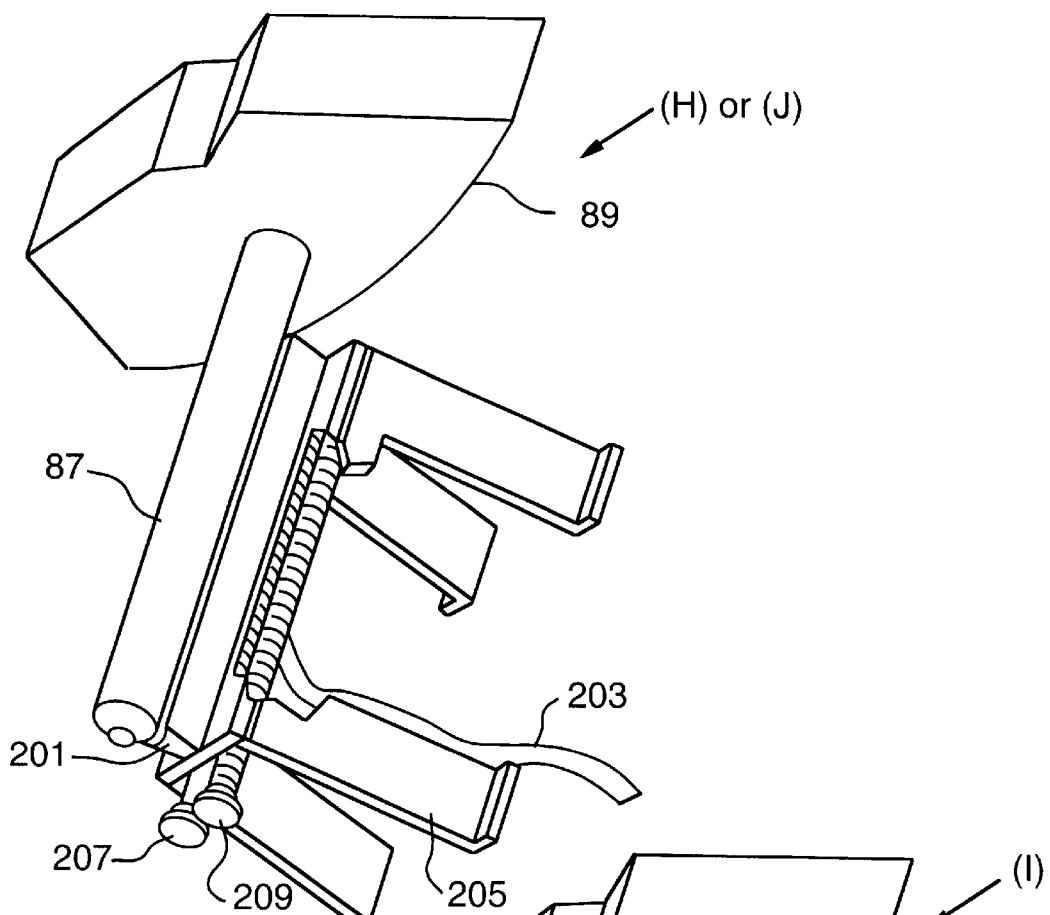
FIG. 20 is a schematic view of a cure station.

Cure station (H), located downstream from print station (G), cures the printed indicia applied to the thermoplastic tube. FIG. 20 illustrates preferred cure station (H), having a curing unit 201 connected to a supply and control line 203. Curing unit 201 is secured to mounting bracket 205 that is adjustable relative to the location of mandrel 87. Adjustment may be done manually by a X-axis adjustment rod 207 and a Y-axis adjustment rod 209. Alternatively the adjustment could be controlled by a PLC device. Mounting bracket 205 is secured to the mounting ring or equivalent of the frame of the machine of the present invention.

Curing unit 201 may cure the printed graphic by any known means such as heat, infrared light, hot air, or ultra violet light. In the embodiment illustrated in FIG. 20, curing unit 201 is a hot air curing unit where hot air is discharged from curing unit 201 onto the tube.

Curing unit 201 may be left on continuously. Or, like other stations in the manufacturing process, it may be computer controlled so that the curing process may be controlled with more precision. Because curing unit 201 may be a UV light emitting unit, safety shutters (not shown) may be provided to shield operators from the exposure of UV light.

(I) Coat station

Figure 21:
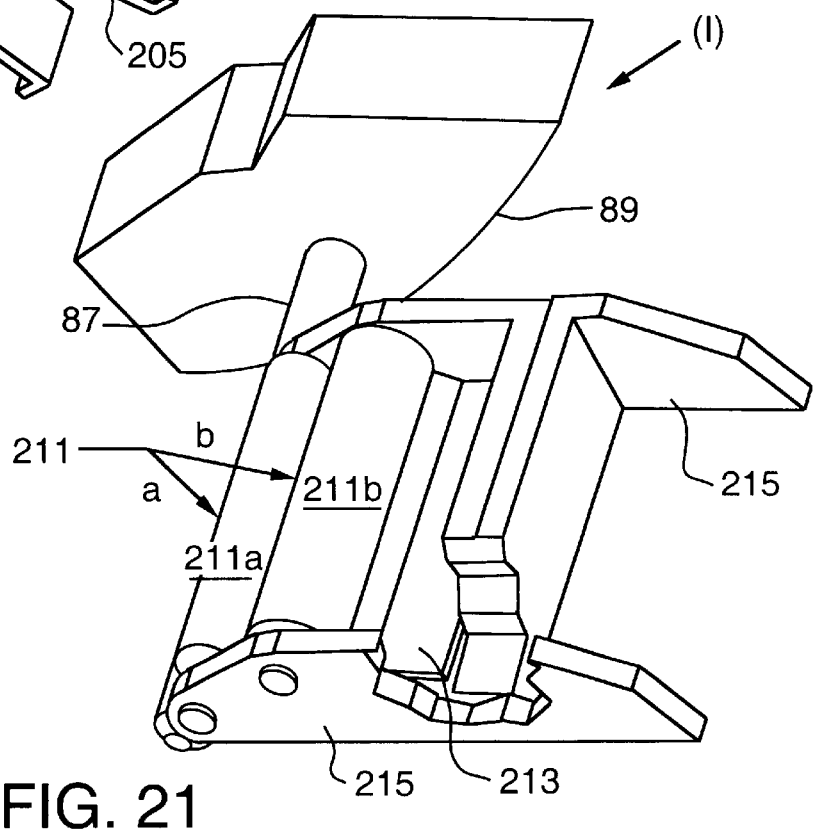
FIG. 21 is a schematic view of a coat station.

The third decorating station on machine 85 is coat station (I) which is a station for applying a coat of material to a tube. This may be an alternative to decorating via label station (F) or print station (G). Coat station (I) may also be used in conjunction with label station (F) and print station (G). FIG. 21 illustrates preferred coat station (I). Coat station (I) has two coater rollers 211a and b in front of a doctor blade 213, all of which are supported on a mounting bracket 215 further mounted on the frame of the machine of the present invention. The two coater rollers 211a and b contact a tube on mandrel 87 and apply a chemical coat directly onto the tube. The chemical coat is applied to coater rollers 211a and b by doctor blade 213. Doctor blade is connected to a chemical supply line (not shown). After a chemical is applied on the tube the chemical coating is typically cured.

(J) Cure Station

Final cure station (J) is the same as cure station (H) illustrated in FIG. 20. Final cure station (J) is for the purpose of curing coating or indicia on tubes and may cure by the same means as cure station (H). In the present embodiment, final cure station (J) is a heat cure station having a curing unit 201 which is a hot air curing unit where hot air is discharged from curing unit 201 onto the tube.

After decorating, the thermoplastic tube may advance through a variety of different finishing stations for finishing the decorated tube. The number, arrangement and variety of finishing stations will depend on the desired tube to be produced.

4) Finishing Thermoplastic Tubes

Besides forming a head on a thermoplastic sleeve and decorating the same, there are many different process steps that may be performed for finishing the thermoplastic tube.

For example, the orifice on the formed head may be sealed with a protective foil, a closure means may be secured to the formed head and the closure may be torqued automatically for proper tightness.

Machine 85 of FIG. 11 includes the following finishing stations: tab seal (K), cap (L) and a torque station (M).

(K) Tab Seal Station

Figure 22:
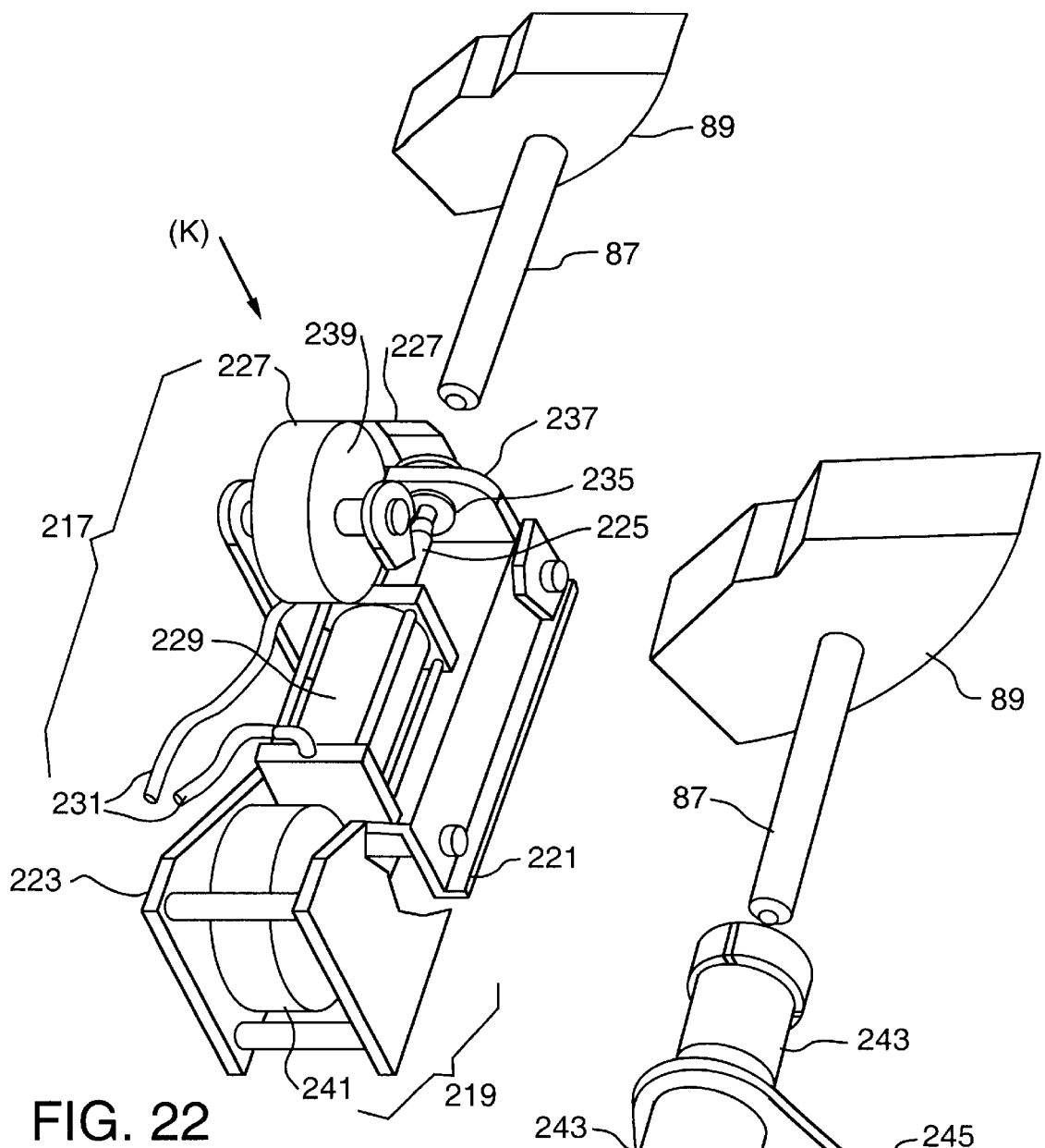
FIG. 22 is a schematic view of a tab seal station.

FIG. 22 illustrates a tab seal station of the preferred embodiment. A tab sealer 217 is housed in a frame 219 comprising a mounting bracket 221 on which tab sealer 217 rests connected to a mounting plate 223 located on either side of the mounting bracket 221. This structure can support the remainder of the device as necessary to place a small protective seal, made of foil or other material, over the orifice of headed thermoplastic tubes.

A protective tab seal is added to tubes by means of a applicator device which, in the preferred embodiment is a tab seal punch 225 which cuts and places appropriately sized tab seal material 227 over the orifice of a thermoplastic tube.

As shown in FIG. 22 tab seal punch 225 is driven by an air cylinder 229 supplied with air by air and control lines 231. The tab seal punch 225 slidably moves, by the action of the air cylinder 229 through a tab seal die 235 on a tab seal mounting plate 237 and contacts tab seal material 227 on the other side of the tab seal die 235. This tab seal material 227 is supplied from a tab seal stock roller 239. Tab seal material 227 unwinds from stock roller 239, passes tab seal punch 225 and is taken up by tab seal foil intake roller 241.

By the pneumatic action of the tab seal punch rod 225 through the tab seal die 235, small portions of tab seal material 227 are cut from the ribbon of tab seal material 227 and brought into contact with the headed end of a thermoplastic tube whereby the tab seal foil is cut and secured.

The tab seal station (K) illustrated in FIG. 22, operates continuously as long as it is supplied with tab seal foil stock. To possibly accommodate longer continuous manufacturing periods, a tab seal foil stock roller (not shown) may be mounted on top of the frame of the machine such that tab seal foil stock ribbon is wound from the foil stock roller down in front of the tab seal die to supply foil stock to the tab seal station. This ribbon may be wound under the die and back up to a larger intake roll (not shown) mounted elsewhere on the manufacturing station. Therefore this allows for the possibility of much larger stock and intake rolls to accommodate larger manufacturing times.

(L) Cap Station

Cap station (L) is located downstream from tab seal station (K). This station provides a means for adding a closure or cap, typically made of plastic, to the headed end of a tube. The cap may be either snapped onto the end of the thermoplastic tube or screwed on if the head has screw threads.

Figure 23:
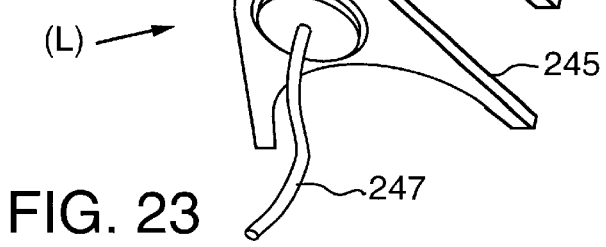
FIG. 23 is a schematic view of a cap station.

Preferable capping station (L), as shown in FIG. 23, comprises a cap applicator 243 and brackets 245 for mounting cap applicator 243 to the frame of the machine, like mounting ring 13 of FIG. 1. Cap applicator 243 is a device which secures a cap or closure to the headed end of tubes. Each cap is individually placed on the headed thermoplastic tube by cap applicator 243. If the cap must be screwed on to the head of the thermoplastic tube, then cap applicator 243 has a screw type mechanism for rotating caps. Cap applicator 243 is continuously supplied with caps by a supply line (not shown). Cap applicator 243 is connected to power supply and control line 247.

After a cap is applied to the headed thermoplastic tube, the torque of the cap is typically adjusted.

(M) Torque Station

Torque station (M) is located downstream from cap station (L). Torque station (M) is provided for adjusting the torque of the closure applied to the head of the thermoplastic tube in cap station (L).

Figures 24, 25:
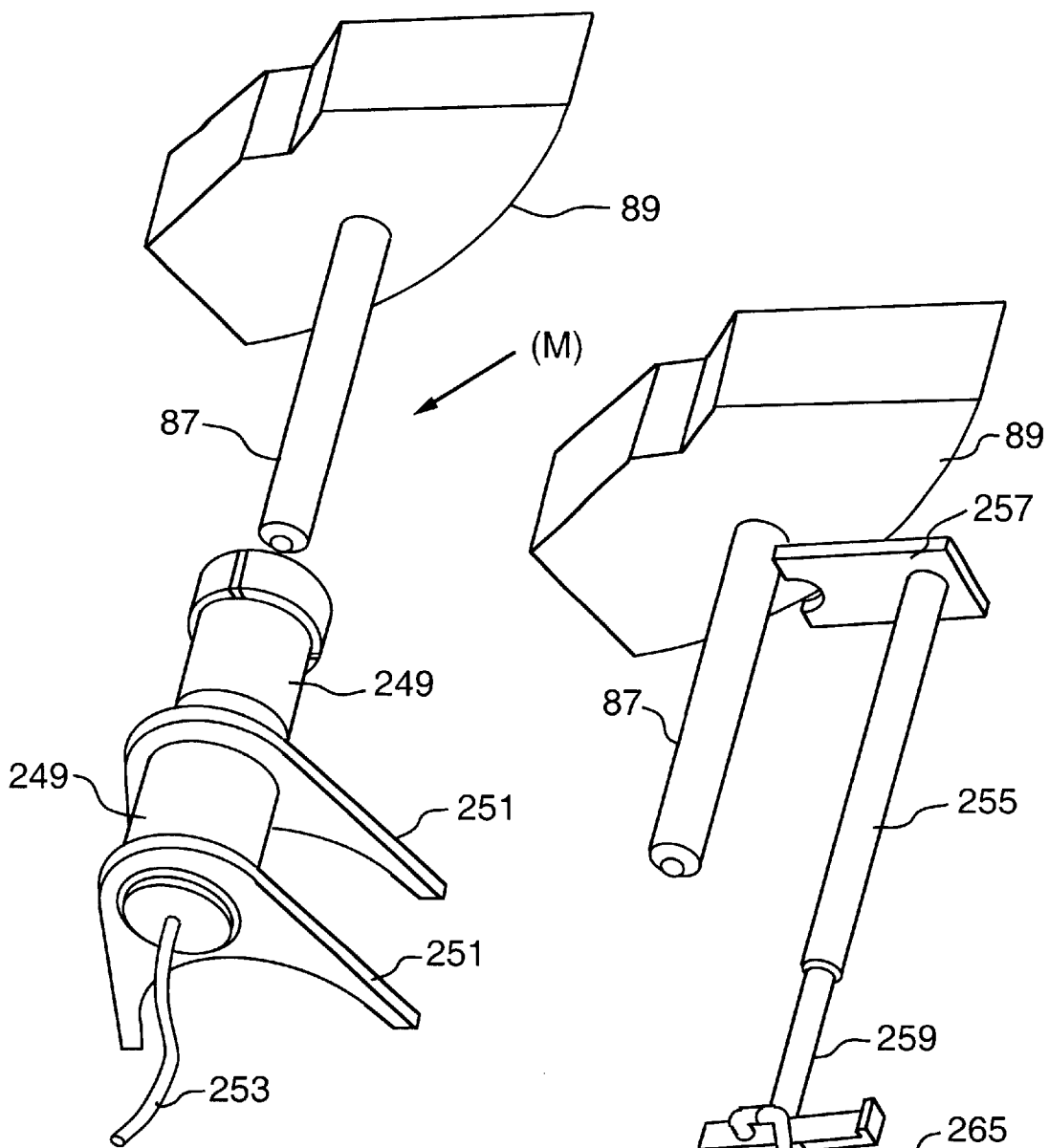
FIG. 24 is a schematic view of a torque station.
FIG. 25 is a schematic view of an unload station.

As illustrated in FIG. 24, torque station (M) comprises a cap torque chucking device 249 and brackets 251 for mounting torque chucking device 249 to the frame of the machine, like mounting ring 13 of FIG. 1. Chucking device 249 adjusts the torque of each cap on each tube. It can accomplish this device by a mechanical screw means.

Torque station (M) is connected to power supply and control line 253.

5) Unloading Thermoplastic Tubes

Manufacturing on a machine of the present invention ends with unloading tubes from mandrels 87. To unload thermoplastic tubes off mandrels, the following devices, each comprising an unload device or stripper, may be used: a pneumatic stripper, a stripper driven by a cam driver, an advancing and retracting linear actuator stripper, a crank motion stripper or a servo-motor driven stripper. The preferred unloading device is a pull rod stripper driven by an air cylinder which works similarly to push rod 93 of load station (A).

(N) Unload Station

The final station of machine 85 is illustrated in FIG. 25 as unload station (N). Unload station (N) is downstream torque station (M) and next to the first station in the manufacturing path load station (A).

Pneumatic stripper 255, with stripper plate 257, is driven back and forth along guide arm 259 by air cylinder 261, supplied with air by air lines 263, positioned behind guide arm 259 on a mounting bracket 265. Mounting bracket 265 is further mounted on a mounting plate, like mounting plate 103 of FIG. 12, which is attached to a mounting ring or equivalent, like ring 13 of FIG. 1. Stripper 255 removes the finished thermoplastic tubes from mandrel 87 by stripper plate 257 attached to the end of stripper 255.

Unload station (N) operates as follows: a stripper plate 257 slides back and forth in contact with mandrel 87 unloading any tube on mandrel 87. Once the thermoplastic tube has been removed, stripper 255 and stripper plate 257 return to their original position.

All of the 14 stations described above operate to form one embodiment of a complete manufacturing process for decorated capped and torqued thermoplastic tubes.

6) Additions and Alternates

The machine of the present invention is intended to be flexible to that manufacturing stations of various types, numbers and arrangements may be configured on the machine so that a large variety of tubes can be manufactured. In addition to the stations and methods described above, many other manufacturing stations and process steps are possible. Described below are other methods and devices for the machine of the present invention, without intending to be limiting.

Forming a head a sleeve, for example, may be done by a variety of different methods. For example, a previously formed head may be joined with a thermoplastic sleeve by heat welding or sonic welding the sleeve and the head together. Or a head may be formed from the end of the thermoplastic sleeve by the process disclosed in U.S. Pat. No. 5,069,856, assigned to the assignee of the present invention and the process of which is incorporated herein. Further a head may be formed by injection blow molding or blow molding a head directly onto a sleeve loaded onto a mandrel on the indexing device.

Still further a head may be molded in a reusable closure means or cap. An example of molding in a reusable closure means is described co-pending application "Method of Forming a Headed Thermoplastic Tube with a Reusable Closure" application Ser. No. 09/199,692, assigned to the assignee of the present invention and incorporated by reference herein. Therefore, depending on the finished product desired any number of different methods may be used to form a head on the end of thermoplastic sleeve.

An example of forming a head in a in a reusable closure means is as follows: A method of forming a tube from an thermoplastic extruded, stretched sleeve is provided by positioning a sleeve over a forming mandrel with an exposed portion of the sleeve extending beyond a head forming end of the mandrel. The inner wall surface of the exposed portion of the thermoplastic sleeve is heated to a temperature above the glass transition temperature of the thermoplastic material to render the inner surface area molten, while maintaining the outer surface of the sleeve below the glass transition temperature so as to provide support for the exposed portion of the sleeve and retain the cylindrical shape thereof. The heated exposed portion is then shaped into a conical shape, such as by directing hot air against the outer surface thereof. Pressure is then applied to the conical shaped exposed portion of the thermoplastic extruded sleeve by contacting the exposed portion with a reusable closure means to form a headed thermoplastic tube. The pressure applied to the conical shaped exposed end portion forces the same into a reusable closure means for the tube held in place by a holding or gripping member.

The reusable closure means used in this method functions as a mold for the neck or a mold for both the shoulder and neck when forming a head on the thermoplastic sleeve and a reusable cap for the finished thermoplastic tube. The reusable closure means is made of a material incompatible with the thermoplastic sleeve material such that when the molten end of the thermoplastic sleeve is pressed into the reusable closure means, the reusable closure means does not melt or stick to the molten preform.

Preferably, the reusable closure means has an orifice-forming spike located in the center of internal cavity. The orifice-forming spike is a protrusion which prohibits the complete closure, except for a small orifice, of the closed end when the conical shaped portion is being shaped in the molding process.

This method has several advantages. First, forming a head on the thermoplastic sleeve and capping the head with a closure means is performed in a single step. Secondly, forming a head in a closure means ensures a perfect fit. Thirdly, there is no die wear by forming a head in a reusable closure means. The reusable closure means serves as the die and it is replaced for every sleeve. Additionally, the method of the present invention is advantageous for forming an undercut on the head of the thermoplastic tube. An undercut is a groove, rib or niche created by a corresponding shape in a mold. If threads or undercuts are formed by the use of a die, then the die must be opened before the tube head is removed in order to provide clearance for the formed threads or grooves. However by forming the headed end of a thermoplastic tube in a reusable closure means, an open and close die need not be used in order to remove the capped tube. Additionally, unique features and shapes may be molded onto the thermoplastic tube depending on the shape of the mold, i.e) the reusable closure means.

Figure 48:
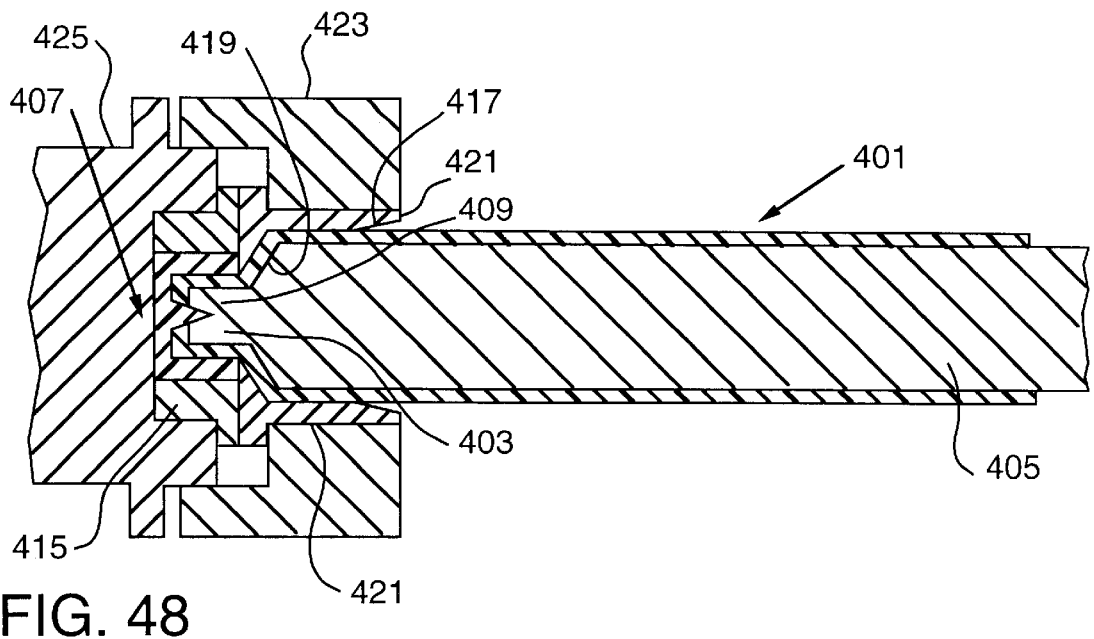
FIG. 48 illustrates pressure being applied to the conical shaped exposed portion of the thermoplastic extruded sleeve and contact with a reusable closure means to form a head.
Figure 49:
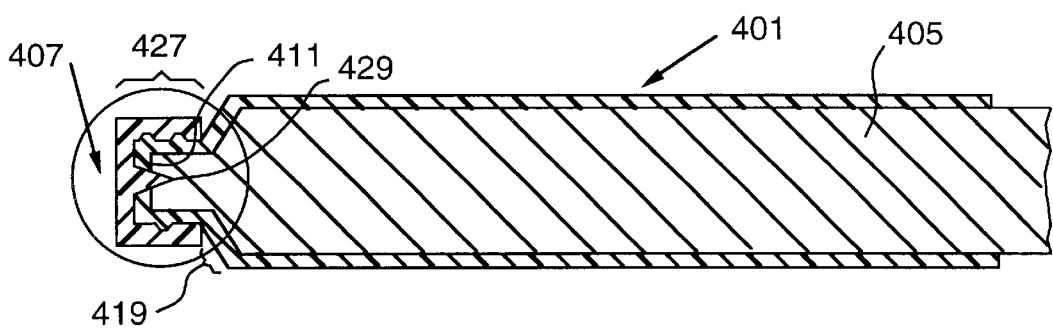
FIG. 49 illustrates a finished headed thermoplastic tube having a reusable closure means on the forming mandrel prior to release therefrom.
Figure 50:
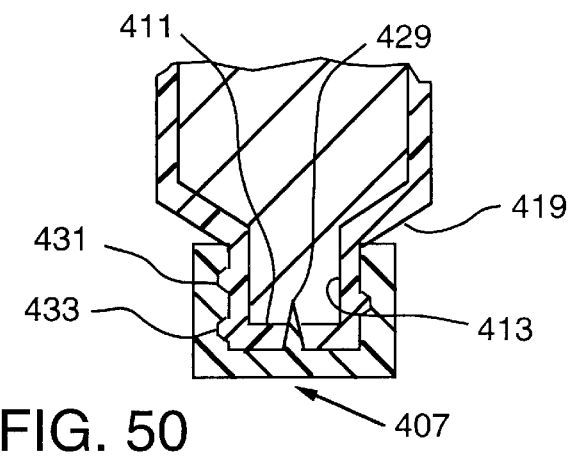
FIG. 50 is an enlargement of the circled portion of FIG. 49 showing a threaded fit of the reusable closure means with the thermoplastic tube.

The method is shown in detail in FIGS. 48–50. The forming of a head on a thermoplastic tube 401 is carried out by applying pressure to the conical shaped portion which includes the mass of moldable thermoplastic material. Sufficient force or pressure may be applied by use of the head forming end 403 of the forming mandrel 405 and a reusable closure means 407. Reusable closure means 407 has an internal cavity 409 formed by a bottom wall 411 and a side wall 413, as illustrated clearly in FIG. 50, and held in place by die member 415, shown in FIG. 48.

Die member 415 has an internal cavity the size of the exterior surface of the reusable closure means 407 in order to firmly hold the reusable closure means 407 during the forming of a head on the thermoplastic sleeve 401. Positioned on top of die member 415, so that an internal cavity is aligned with the internal cavity of die member 415, is shoulder forming member 417. Shoulder forming member 417 is shaped to form the shoulder portion 419 of the headed thermoplastic tube 401. Shoulder forming member 417 may have an angled portion 421 which acts to guide the insertion of thermoplastic sleeve 401 into shoulder forming member 417 and die member 415. Both shoulder forming member 417 and die member 415 are held in place by upper holding support 423 and lower holding support 425.

The forming mandrel 405 is illustrated by an arrow in FIG. 48 as being able to insert into shoulder forming member 417 and reusable closure means 407 to form the conical shaped portion of thermoplastic sleeve 401 into a head having shoulder portion 419 and neck portion 427.

Preferably, reusable closure means 407 has an orifice-forming spike 429 located in the center of internal cavity 409. Orifice-forming spike 429 is a protrusion which prohibits the complete closure, except for a small orifice, of the end of the thermoplastic tube 401.

FIG. 49 illustrates the formed headed thermoplastic tube 401 having reusable closure means 407 after removal from die member 415 and still retained on the forming mandrel 405.

FIG. 50 is an enlargement of the circled portion of thermoplastic tube 401 of FIG. 49. FIG. 7 shows a threaded fit of the reusable closure means 407 created by a continuous concave groove 431 having a "screw" or spiral path in the interior surface of the reusable closure means 407. Inside groove 431 is formed a reciprocating continuous rib 433 during the formation of neck portion 427 of thermoplastic tube 401. The cooperation of groove 431 and rib 433 creates a "threaded" fit so that the reusable closure means 407 may be screwed back on neck portion 427 once removed. Alternatively, groove 431 may have the shape of a non-continuous spiraling groove.

Yet a further method for forming a head on a tube involves rotating a sleeve while heating it. An example of this method is described co-pending application "Method of Forming a Headed Thermoplastic Tube" application Ser. No. 09/199,695, assigned to the assignee of the present invention and incorporated by reference herein. A thermoplastic extruded, longitudinally stretched sleeve is positioned over a forming mandrel with an exposed portion of the sleeve extending beyond a head forming end of the mandrel. The mandrel is then rotated while the sleeve is heated. The rotation provides for even heat distribution at the location where the heat is applied. The rotation of the sleeve is stopped and pressure is then applied to the conical-shaped, exposed portion of the thermoplastic, extruded sleeve by contacting the exposed portion with a molding die to form a headed thermoplastic tube.

Figure 51:
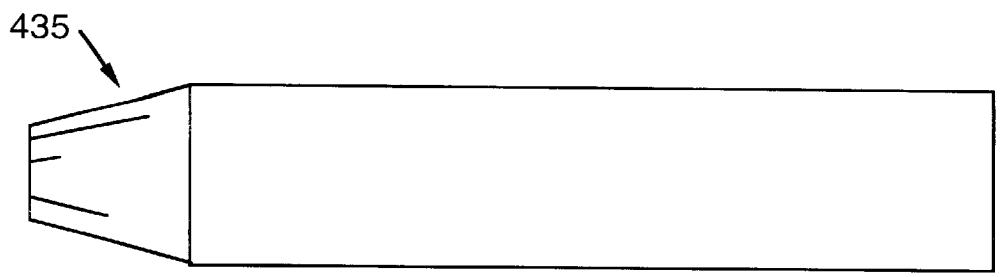
FIG. 51 illustrates a bullet-shaped preform mass.

Rotating or spinning the sleeve has the advantage of lessening the effect of gravity on the thermoplastic molten preform of the exposed portion if the mandrel is horizontal. For example, especially for larger diameter sleeves of a size such as a, 2 inch, 1 ½ inch, 1 ⅜ inch and 1 3/16 inch diameter, the centrifugal forces of the rotation will lessen the effect of the exposed portion to sag due to gravity. Centrifugal forces will pull the molten material outward resulting in a bullet-shaped preform 435 as in FIG. 51. Gravitational force can be negated or limited by the centrifugal force applied to the thermoplastic sleeve. Rotating the sleeve constantly changes the direction of forces acting on any specific section of the sleeve thereby cancelling the effect of gravity on that section and thus the entire sleeve.

Besides control over the preform mass, rotating provides even heat distribution in the exposed portion. An even temperature distribution and controlled preform shape are good manufacturing conditions for consistently creating high quality molded heads without overlap or flash defects. Previously these defects were harder to control. The rotation step may be used with thermoplastic sleeves of all sizes, such as ½, ⅝, ¾, ⅞, 1, 1 3/16, 1 ⅜, 1 ½ and 2 inches.

Furthermore, because of even heat distribution, higher temperatures may be used without burning the plastic of the sleeve. The use of higher temperatures decreases the heating time necessary to reach the glass transition temperature in exposed end of the sleeve.

Again, control is provided by rotating or spinning the sleeve while heating the inside to get a molten preform with uniform heat distribution. Spinning gives the manufacturer the ability to work with larger diameter tubes without the disadvantage of the tube collapsing on itself because of the stresses on the larger diameter tubes. This control is cannot be achieved by the methods of the prior art.

Figure 52:
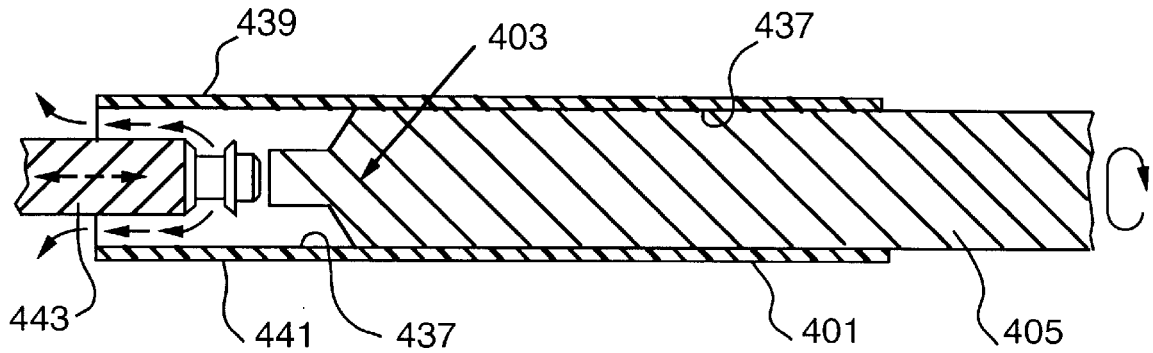
FIG. 52 illustrates heating of the exposed inner wall surface of the exposed portion of the thermoplastic extruded, stretched, horizontally disposed sleeve by a hot fluid while rotating the sleeve, as shown by the arrow.
Figure 53:
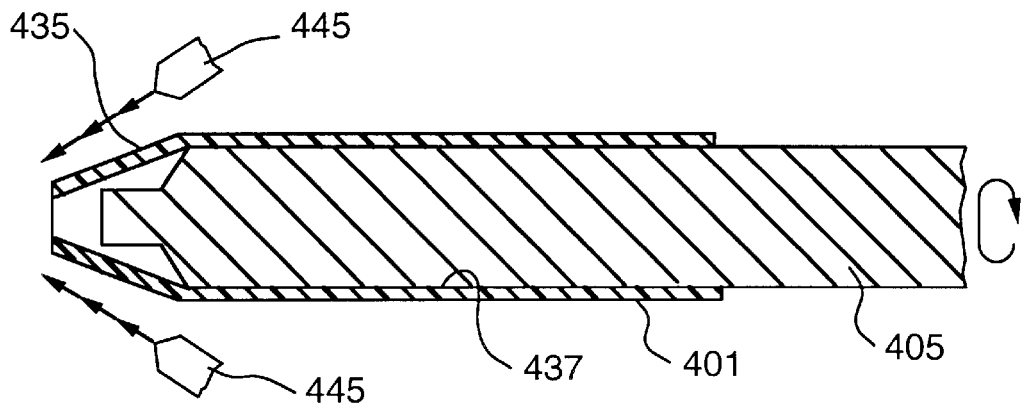
FIG. 53 illustrates the shaping of the heated exposed portion of the thermoplastic extruded horizontally disposed sleeve into a conical shape while rotating the sleeve, as shown by the arrow.

The details of the process are illustrated in FIG. 52. The hot fluid heats the inner wall surface 437 of the exposed portion 439 to a temperature above the glass transition temperature of the thermoplastic material and melts inner wall surface 437, while an outer surface 441 of the exposed portion 439 provides sufficient support to maintain the exposed portion 439 as a substantially cylindrical shape. When sufficient heat has been applied to the inner wall surface 437 of the exposed portion 439 to melt the same, the hot air nozzle 443 is removed from the exposed portion and the heated exposed portion 439 is shaped into a bullet-shape 435, such as by the application of additional heat of further hot fluid, indicated by arrows in FIG. 53. Additional hot fluid may be, for example, hot air from external hot air nozzles 445, which heats the outer surface 441 of the exposed portion 439 of the thermoplastic extruded, stretched sleeve 401.

Outer surface 441 is heated to a temperature above the glass transition temperature of the thermoplastic material whereby it melts rendering outer surface 441 into a moldable state.

While heating of the outer surface 441 by a hot fluid may be used to form the conical shape 435, it is also possible to continue the heating of the inner wall surface 437 of the exposed portion 439 until the outer surface 441 no longer maintains the substantially cylindrical shape, such that the conical shape 435 results in the exposed portion 439. Forming mandrel 405 may be rotated continuously during the entire heating process, as indicated by the arrows in FIGS. 52 and 53. Because the thermoplastic extruded sleeve 401 is a stretched material, when the exposed portion 439 is heated above the glass transition temperature, the plastic memory responds and the exposed portion 439 swells to a thickness of or substantially the thickness of the tubular extrusion thickness, generally about two to three times the wall thickness of the thermoplastic extruded, stretched, sleeve 401. The hot exposed portion 439, when above the glass transition temperature in addition to swelling in wall thickness, shrinks in the direction of the axis of the sleeve and provides a mass of moldable thermoplastic material for the forming of a head.

After shaping of the heated exposed portion 439 of the thermoplastic extruded stretched, sleeve 401 into the conical shape 435, the rotation of forming mandrel 405 is stopped and pressure is applied on the exposed portion 439 through the head forming end 403 of the forming mandrel 405 to form a headed thermoplastic tube 401.

An alternate way to form a head is to weld a preformed head onto a sleeve by high frequency sound. Sonic weld station, illustrated in FIG. 26, may be substituted for preheat (B), heat (C) and mold (D) stations of machine 85 as an alternative station for forming a head on a sleeve.

Figure 26:
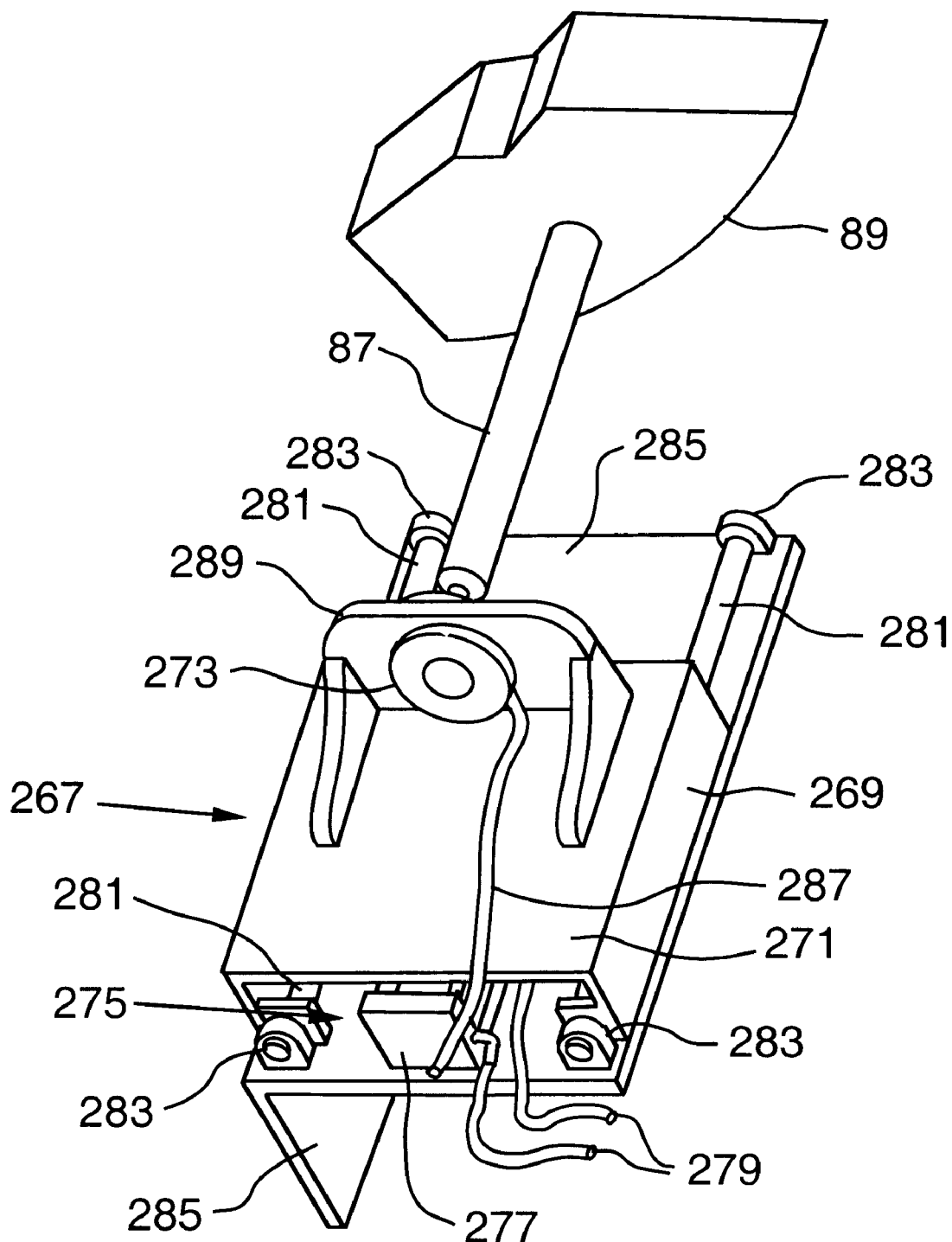
FIG. 26 is a schematic view of a sonic welding station.

FIG. 26 illustrates a preferred sonic welding station for welding by high frequency sound, a preformed head to a thermoplastic sleeve. Sonic weld station has a sonic welder attached to a movable carriage and means to mount the device and carriage to the frame of the machine of the present invention, like mounting ring 13 of FIG. 1. The carriage brings the sonic welder into proximity with a sleeve.

In FIG. 26 carriage 267 has a frame or housing 269 which provides a top surface 271 for securing sonic welder 273 and an interior cavity 275, under top surface 271, for mounting or locating a means to impart motion to carriage 267, like an air cylinder 277. Carriage 267 is pneumatically driven by an air cylinder 277, supplied with air by lines 279. Carriage 267 is slidably mounted on rods 281 which are linear guide means. Each rod 281 is secured by a bracket 283 at each end to mounting plate 285.

The sonic weld station operates as follows: when a sleeve loaded and positioned on mandrel 87 of machine 85, for example, is aligned with sonic welder 273, carriage 267 advances along rods 281 to bring sonic welder 273 in proximity to the sleeve. As carriage 267 advances, an exposed portion of the sleeve enters and passes into sonic welder 273 which welds a preformed head to the sleeve by means of high frequency sound.

Sonic welder 273 is connected to supply and control line 287 which supplies the input necessary for sonic welder 273 to operate.

Sonic welder 273 is mounted in housing 289 which is attached to top surface 271 of carriage 267. Carriage 267 retracts by the action of air cylinder 277 to its original position, out of the path of motion of mandrel 87, after a preselected period of time. The result of the manufacturing step is that a preformed head is welded onto a sleeve to form a tube.

The machine of the present invention is also useful for completing the manufacturing of tubes if, for example, the sleeves have been partially processed at another location. Preprinted sleeves may be loaded onto a machine of the present invention and the manufacturing of tubes may be completed by forming a head on the sleeves and performing any desired finishing step like, tab sealing, capping or torquing.

7) Large Scale Manufacturing

The machines of the present invention may be arranged into small groups. When arranged into small groups or "production cells," space, labor and raw material input can be saved. One production cell typically contains six machines each of which can manufacture headed, sealed, capped and decorated tubes from blank thermoplastic sleeves. A single cell has a total output equivalent to a single conventional process line.

A manufacturing and packing plant using machines of the of the present invention is an efficient arrangement of a plurality of production cells connected by a common transportation line. The efficient arrangement of cells leads to further decreases in labor necessary to operate a number of production cells. An example of the preferred manufacturing plant is described in co-pending application "Plant for Manufacturing and Packing Thermoplastic Tubes" assigned to the assignee of the present application and incorporated by reference herein.

IV. Manufacturing with a Programmable Logic Controller

A PLC device may be added to the machine of the present invention for the purpose of controlling the entire machine including the various manufacturing stations. In conventional process lines some of the manufacturing equipment is PLC controlled. However machine feedback control to control all aspects of a manufacturing step, product quality control and product feedback control and total mechanical control over sleeves and tubes have not been feasible. Such PLC control is almost impossible in conventional processing lines because large processing lines handle several hundred thermoplastic articles at a time and there is no systematic method for keeping track of individual articles and controlling the same on the conventional machines.

FIG. 1 illustrates one embodiment of a machine of the present invention, with each manufacturing station connected to a PLC device, as indicated by the dashed lines. The PLC device can perform a variety of functions: A PLC device may be employed to control, by turning on or turning off, each manufacturing station along a manufacturing path. A PLC device can control the inputs needed for each manufacturing station. For example, a PLC device can control the heating temperature of the preheat and heat stations. The PLC can control the speed of each manufacturing station and the speed of the entire manufacturing machine.

Process control for the machine of the present invention involves controlling the operation of individual manufacturing stations alone or in combination with other manufacturing stations around the closed manufacturing path. The operation of the manufacturing stations may be based on information gathered from sensors obtaining information about the operation of each manufacturing station itself, sensors obtaining information about the quality of the thermoplastic tubes produced, or information obtained from both the operation of each of the manufacturing stations and the quality of the thermoplastic tubes produced.

Examples of the sensors that may used are listed below in Table I

TABLE I

| SENSOR | TYPE | MEASUREMENT |
|---|---|---|
| 1. Load sensor | Electric Eye | Confirm Load |
| 2. Preheater Air Flow | Flow Meter | Air Flow Rate |
| 3. Preheater Temperature | Thermocouple | Air Temperature |
| 4. Sleeve Temperature | Infrared Sensor | Sleeve Temperature |
| 5. Heater Air Flow | Flow Meter | Air Flow Rate |
| 6. Heater Temperature | Thermocouple | Air Temperature |
| 7. Sleeve Temperature | Infrared Sensor | Sleeve Temperature |
| 8. Mold Temperature | Thermocouple | Cooling Water Temperature |
| 9. Mold Flowmeter | Flow Meter | Cooling Water Flow Rate |
| 10. Treater Confirmation | Electric Eye | Confirm Corona Arc |
| 11. Treater Amperage | Ammeter | Treatment Level/ Pinhole Detection |

TABLE I-continued

| SENSOR | TYPE | MEASUREMENT |
|---|---|---|
| 12. Label Sensor | Labeler Controller | Confirm Label Application |
| 13. Printer | Print Controller | Confirm Print Application |
| 14. Cure Sensors | Voltmeter Ammeter Thermocouple | Cure Unit Voltage Cure Unit Amperage Cure Unit Temperature |
| 15. Inspection System | Vision System (Camera) | Confirm Heading & Print Quality |
| 16. Coating Sensor | Level Sensor | Confirm Coating Pretense |
| 17. Cure Sensors | Voltmeter Ammeter Thermocouple | Cure Unit Voltage Cure Unit Amperage Cure Unit Temperature |
| 18. Inspection System | Vision System (Camera) | Confirm Heading, Print, & Coating Quality |
| 19. Tab Seal | Thermocouple Electric Eye | Punch Temperature Tab Seal Pretense |
| 20. Inspection System | Vision System (Camera) | Confirm Heading, Print, Coat, & Tab Seal Quality |
| 21. Capping | Electric Eye | Confirm Cap Pretense |
| 22. Torque | Torque Meter | Confirm Applied Torque |
| 23. Inspection System | Vision System (Camera) | Confirm Heading, Print, Coat, & Capping Quality |
| 24. Eject | Electric Eye | Confirm Tube Removal |
| 25. Reject | Electric Eye | Confirm Tube Removal |
| 26. Confirmation | Microswitch | Confirm Tube Removal |

After gathering selected information from sensors in various locations around the closed manufacturing path the process control method would continue as follows: a signal would be generated corresponding to the selected information gathered from each of the manufacturing stations. The signals generated would be imputed into a PLC device and with the use of the signals, the operation of corresponding manufacturing stations would be controlled by the PLC device.

In a typical example of the control system, the PLC device will compute all of the "decisions" regarding the operation of the manufacturing machine based on information received from sensors on each manufacturing station. This provides the manufacturer with the opportunity to monitor the activities that occur at each station and identify any abnormalities in the product or process immediately. Defective products can identified instantly and downstream stations may be shut off to conserve process resources. The defective products can then be segregated at a reject station on the machine.

The PLC device in combination with the manufacturing stations, sensors and indexing table can collect, on a continuous basis, the type, degree and frequency of failures of the product or process. This can provide a profile of effectiveness of equipment and each process step. Reports can be generated about process and quality of the product.

Further process control would include establishing setpoints for controlling the operation of each manufacturing station and with the use of the generated signals, as previously mentioned, the operation of each manufacturing stations could be controlled within the established setpoints. Setpoints may be established automatically after the machine invention has reached steady state. The PLC device would automatically establish upper and lower boundary setpoints based on the operation of the machine at steady state over a period of time. Alternatively, the setpoints may be predetermined and simply programmed into the PLC device.

The signals generated from the sensors located on the manufacturing stations themselves or around the closed manufacturing path may be mechanical, electronic, optical, pneumatic, hydraulic or combinations thereof, Any type of signaling means may be used to communicate among the sensors and the PLC device.

Another method for controlling the thermoplastic tube manufacturing machine is the following: marking each tube with individual indicia; sensing selected information from tubes marked with individual indicia; generating a signal corresponding to each of manufacturing stations based on selected information; inputting signals to the PLC device; and with use of signals, controlling the operation of a corresponding manufacturing station with the PLC device.

Each thermoplastic tube may be marked with an individual indicia from a computer controlled printing device, like the inkjet printer of FIG. 19, which has the capability of uniquely marking each tube. Then select information may be gathered from the tubes marked with an individual indicia by a sensing means. Further signals may be generated based on the selected information gathered. The signals may be input into a PLC device and with the use of the signals, the operation of corresponding manufacturing stations may be controlled. This type of process control is the use of a feedback loop based on individually marked tubes to indicate to a PLC device to make or stop producing certain types, kinds, or varieties of tubes.

For example if 15,000 tubes of three different lots of 5,000 tubes per lot, all having the same diameter, are to be manufactured, then a feedback loop based on marked indicia on each tube would allow a manufacturer to manufacture the 15,000 tubes continuously without stopping the machinery. After 5,000 tubes of one type have been manufactured and an indicia on tube number 5,000 was identified by sensing means, like a vision camera, then a signal could be generated based on this indicia, and sent to a PLC device. With the use of this signal, the PLC device may then control the operation of the machine, with a subsequent command control signal, to change production, like changing the decoration step or the finishing steps, to manufacture the second lot of 5,000 tubes. The process could be repeated for the third lot of 5,000 tubes. By this feedback control method based on marking each tube with an individual indicia, a manufacturer may operate a machine of the present invention with zero down time.

Figure 27:
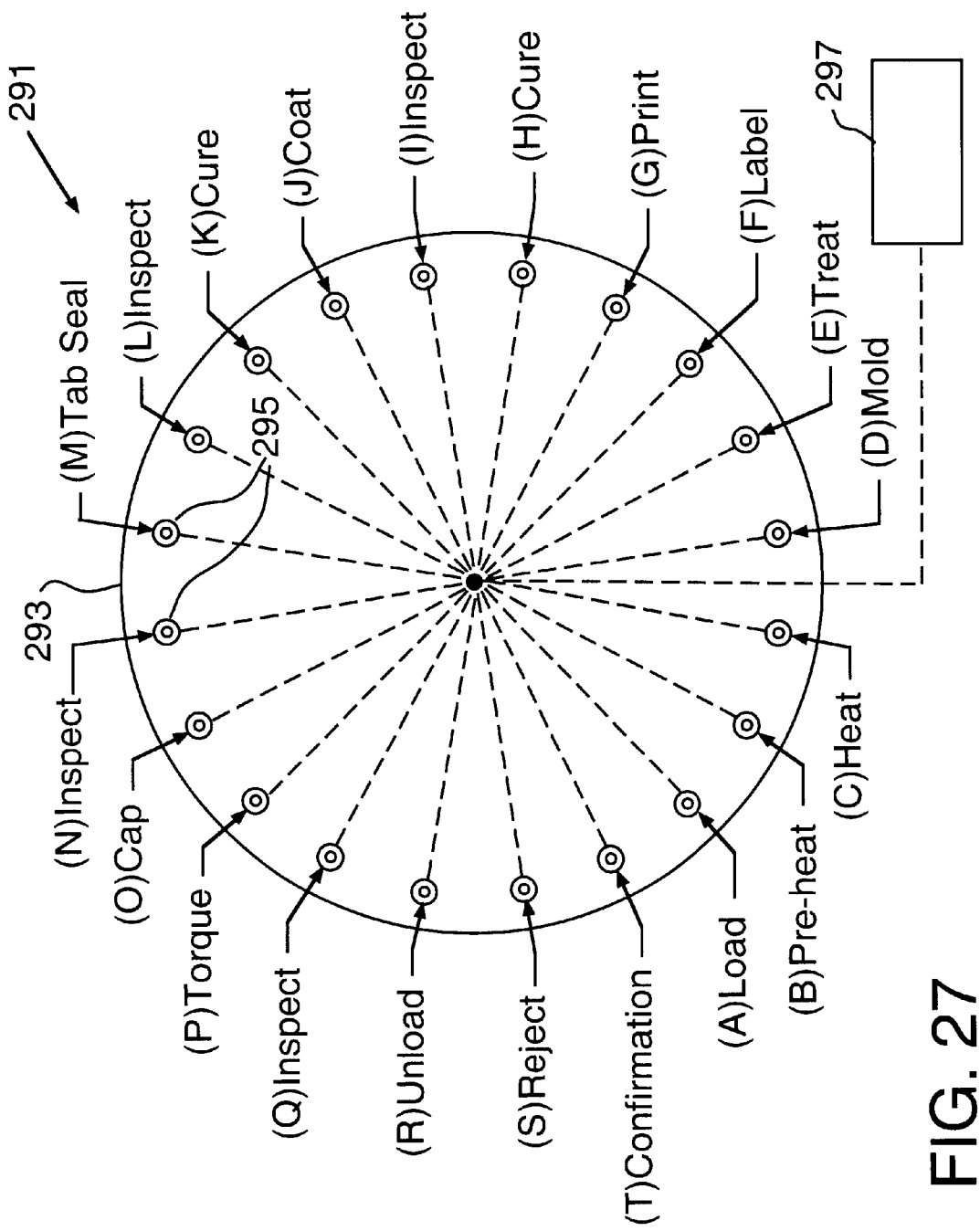
FIG. 27 shows the locations of twenty manufacturing stations along the edge of an indexing table, with each manufacturing station associated with a PLC device, which is a third embodiment of the present invention.
Figure 28:
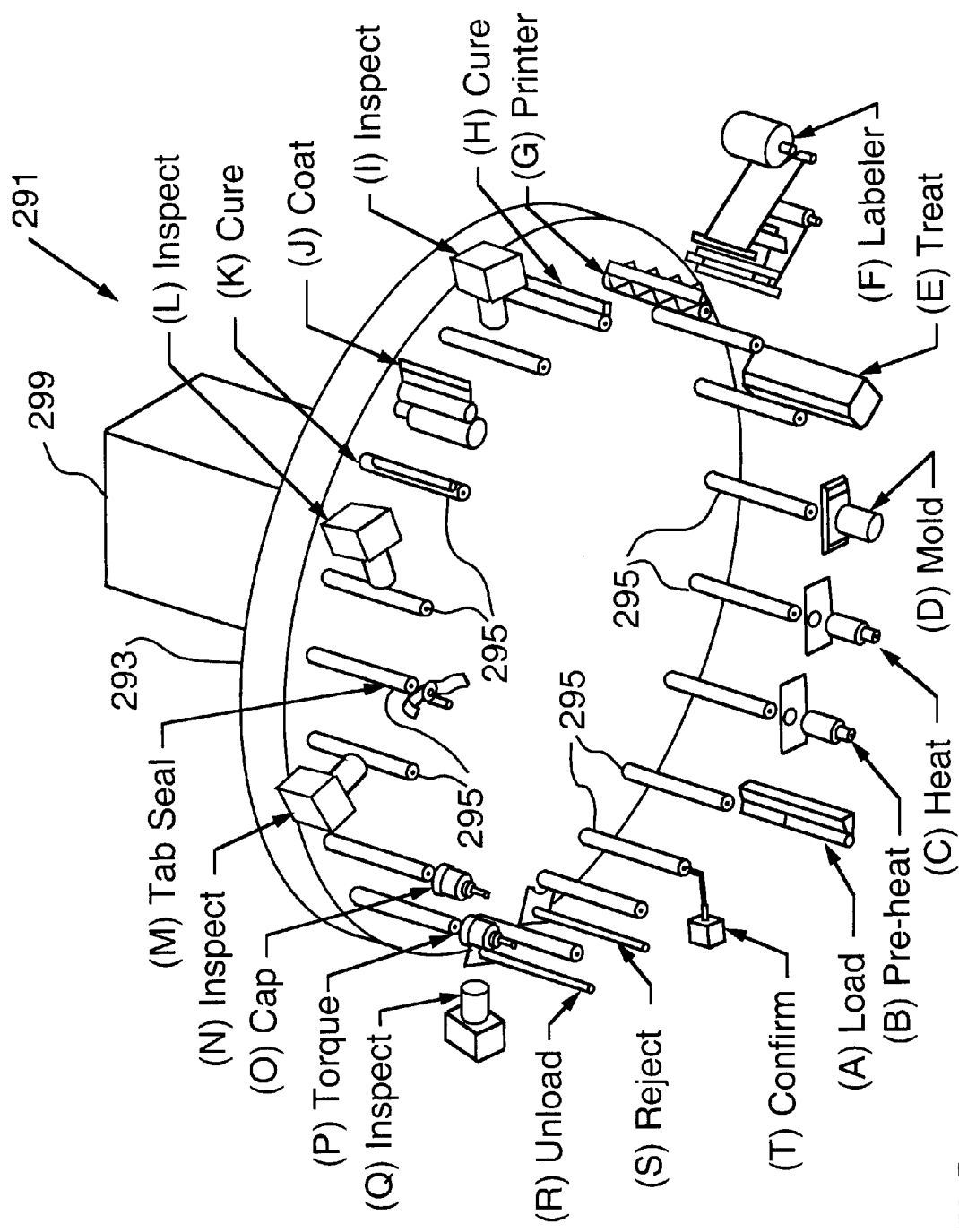
FIG. 28 is a schematic view of the twenty manufacturing stations of FIG. 27.

FIG. 27 is a schematic representation a machine 291 of a third embodiment invention having indexing table 293, 20 mandrels 295 mounted thereon and 20 manufacturing stations labelled (A) through (T), corresponding to each of 20 mandrels, all connected to PLC device 297. Indexing table 293 rotates counterclockwise in this embodiment in response to indexer 299 (FIG. 28). The 20 stations and corresponding process steps of this embodiment are as follows: (A) load, (B) preheat, (C) heat, (D) mold, (E) treatment, (F) label, (G) print, (H) cure, (I) inspect, (J) coat, (K) cure, (L) inspect, (M) tab seal, (N) inspect, (O) cap, (P) torque, (Q) inspect, (R) unload, (S) reject and (T) confirmation. FIG. 28 is a perspective view of FIG. 27, showing only the main components of manufacturing stations (A) through (T). The manufacturing stations of machine 291 which are common to machine 85 of the second embodiment are physically the same as the manufacturing stations of machine 85.

Figure 29:
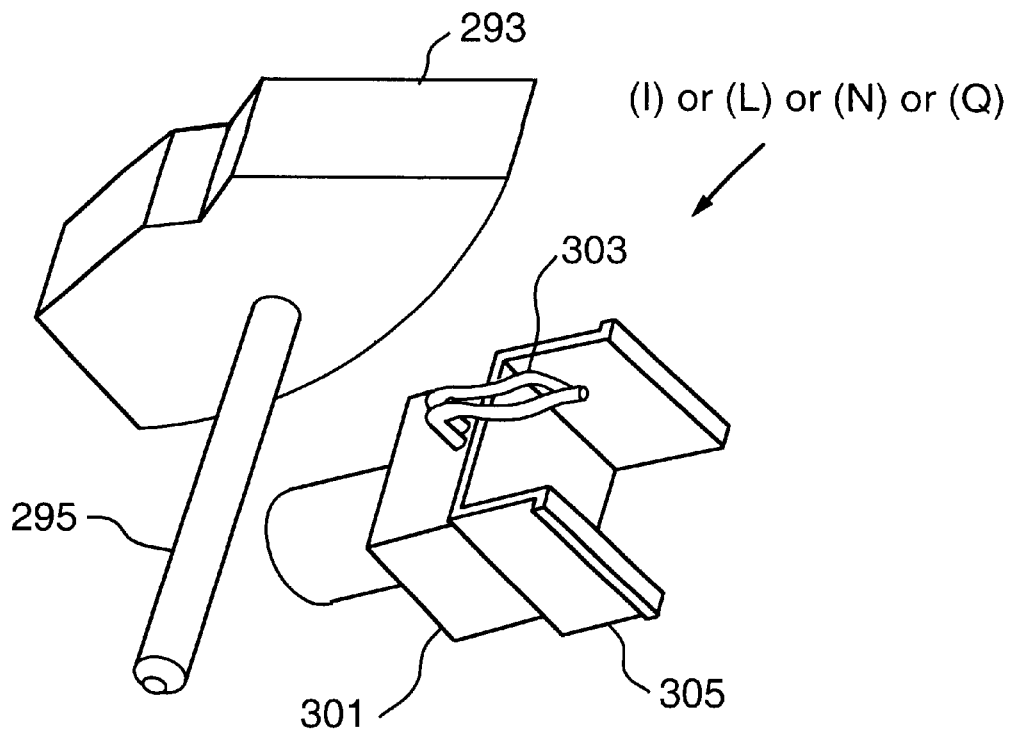
FIG. 29 is a schematic view of an inspection station.

In addition to adding sensors to the stations of the manufacturing path illustrated in FIGS. 27 & 28, additional stations have been added. Four inspection stations (I), (L), (N) and (Q) have been added at different locations along the closed manufacturing path. Product inspection may be performed by any known method. FIG. 29 illustrates any one of inspection stations (I), (L), (N), and (Q). An inspection station is typically a vision camera which has the ability to inspect product quality. The inspection station in FIG. 29 is illustrated as having a vision camera 301 receiving input and sending output signals to PLC device 297 (FIG. 27) through control and power line 303. Vision camera 301 is mounted on a bracket 305 which may be adjustable and mounted on a frame or mounting ring of the machine, like mounting ring 13 of machine 1 in FIG. 1. Inspection stations can identify and monitor individual indicia on sleeves and tubes so marked.

Figure 31:
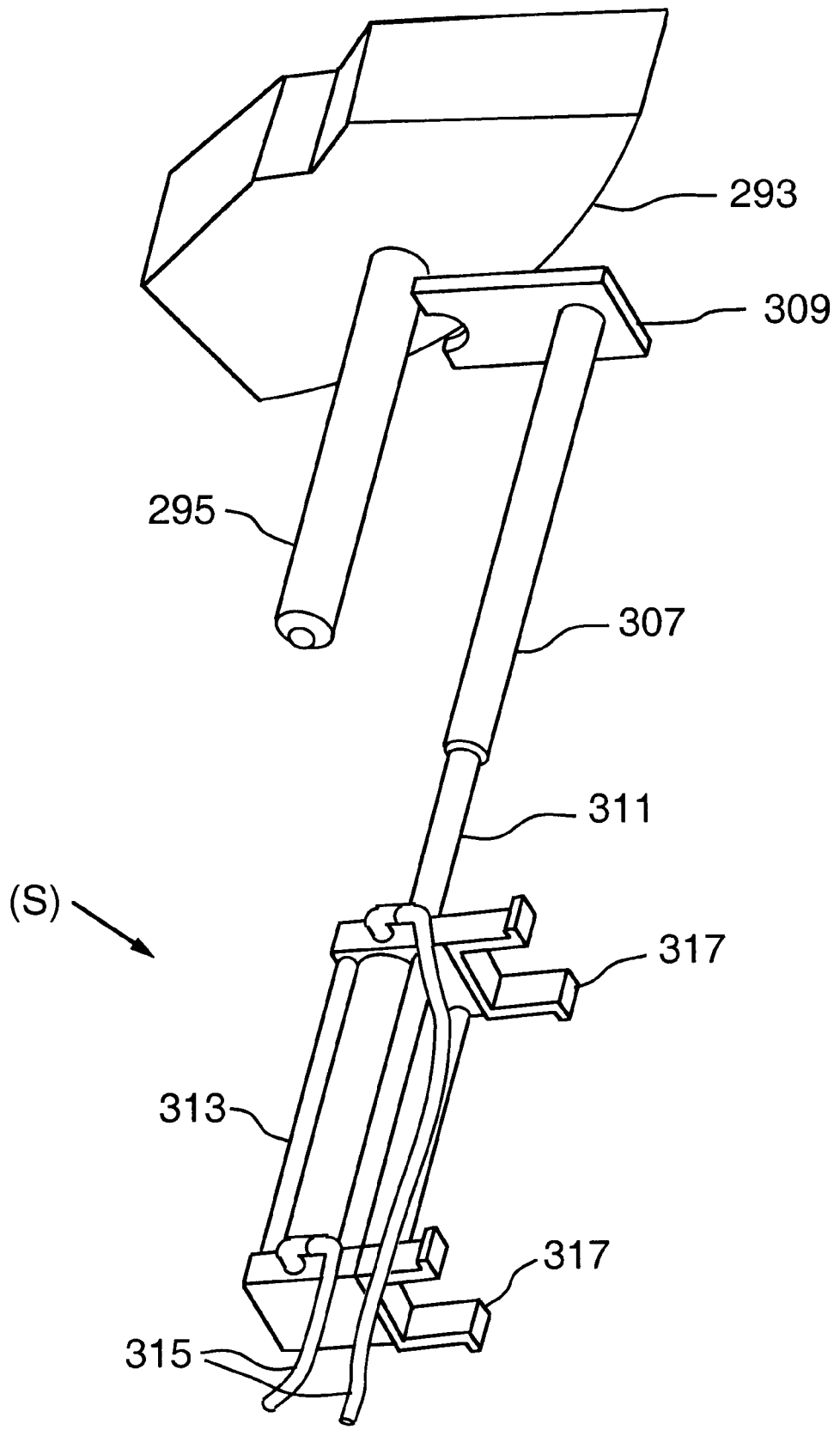
FIG. 31 is a schematic view of a reject station.

Preferred rejection station (S) is illustrated in FIG. 31. It is mechanically the same as unload station (N) of the embodiment on FIG. 25. Pneumatic stripper 307, with stripper plate 309, is driven back and forth along guide arm 311 by air cylinder 313, supplied with air by air lines 315, positioned behind guide arm 311 on a mounting bracket 317. Mounting bracket 317 is further mounted on a mounting plate, like mounting plate 103 of FIG. 12, which is attached to a mounting ring or equivalent, like ring 13 of FIG. 1. Stripper 307 removes defective tubes from machine 291 based on command signals from PLC device 297.

Reject station (S) operates as follows: a stripper plate 309 slides back and forth in contact with mandrel 295 unloading any tube on mandrel 295. Once the thermoplastic tube has been removed, stripper 307 and stripper plate 309 return to their original position.

Figure 30:
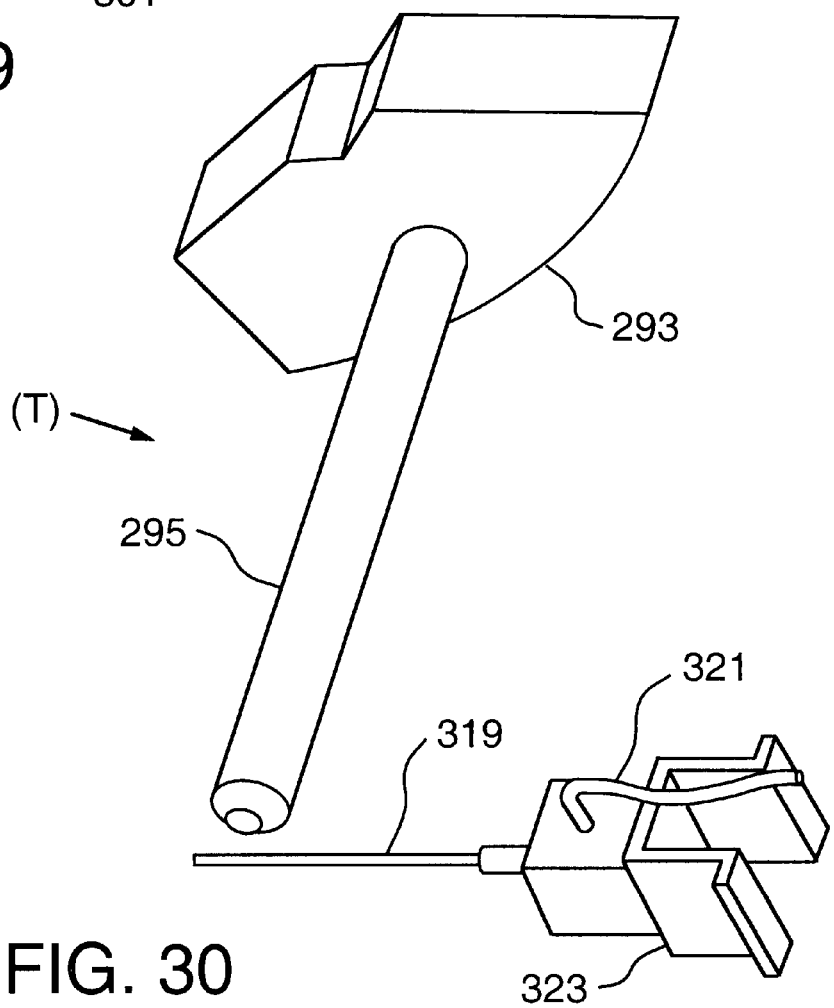
FIG. 30 is a schematic view of a confirmation station.

Confirmation station (T), illustrated in FIG. 30, is for the purpose of confirming that a tube has been removed by either unload station (R) or rejection station (S) from mandrel 295. The confirmation station (T) in FIG. 30 is shown as having a sensor arm 319 receiving input and sending output signals to a PLC device (not shown) through control and power line 321. Sensor arm 319 is mounted on a bracket 323 which may be adjustable (not shown). Confirmation station (T) can alternatively be an electronic or vision means for performing tube confirmation.

V. Manufacturing Example

A 10 mandrel machine having 7 manufacturing stations, in order: load, heat, mold, treat, print, cure, and unload, was used to manufacture headed and decorated thermoplastic tubes from longitudinally stretched and extruded thermoplastic sleeves. Headed tubes of high quality were produced at a rate of 13 tubes per minute (tubes/min). The following process parameters were used to achieve this output:

The machine used a 10 mandrel aluminum indexing table approximately 16 inches in diameter set at a counterclockwise rotation speed of 1.3 revolutions/min. The load station was a pneumatic push-pull device which loaded thermoplastic sleeves from a chain conveyor onto holding mandrels on the indexing table at a rate of 13 sleeves/min. Each sleeve was loaded onto a mandrel so that approximately 0.5 inch of sleeve extended beyond the end of the mandrel. The sleeve was then transported downstream to the second station in the manufacturing path, the heat station.

The heat station had a hot air heating probe mounted behind a cooling bushing on a slidable pneumatic carriage. The portion of the sleeve extending beyond the end of the mandrel was heated by air flowing at a rate of 40 cubic cm/second (cc/s) at a temperature of about 720° F., for approximately 3 seconds. The carriage was set at a speed of approximately 0.5 cycle/s.

Following the retraction of the carriage, the heated thermoplastic sleeve was indexed one position downstream to the mold station. The mold station was mounted adjacent the heat station on the same slidable pneumatic carriage. The carriage advanced to contact a mold die with the molten preform mass at the end of the heated sleeve. The contact time was about 3 seconds and the mold die temperature was room temperature.

The thermoplastic sleeve, now a thermoplastic tube, was next transported to a corona treatment unit. The treatment of the thermoplastic tube occurred for approximately 2 seconds. Following surface treatment, the tube was indexed further downstream to a coat station where a coating was applied to the tube surface. A thin coating was applied around the tube by the application rollers of the station. Following this, the thermoplastic tube was cured by hot air at the cure station, at a temperature of 300° F. from an industrial blower.

After hot air curing the finished thermoplastic tube was unloaded from the machine. The total processing time for one tube was 4.6 seconds and the machine produced tubes at a rate of 13 tubes/min. The tubes produced were finished commercially viable tubes of high quality and were later capped to produce headed thermoplastic tubes which were decorated and capped.

Producing tubes which have an adhesive label on the aforementioned machine was less complicated. Instead of treating and coating on the machine, a label station was added to apply labels to the thermoplastic tube. All of the parameters and stations previously mentioned were the same except for the addition of the label station. Labeled commercially viable tubes were produced at a rate of 13 tubes/min.

VI. Further Embodiments

The machine of the present invention is flexible and may be adapted to manufacture thermoplastic tubes of various lengths, thicknesses, weights, diameters, shapes, and complexity. In order adapt a machine to manufacture tubes of a specific diameter, the indexing table is fitted with appropriately sized mandrels and the manufacturing stations are adapted to work on the specific diameter thermoplastic sleeves. Adaptations for the stations may include adjusting the position of the station relative to the mandrel, changing the size of a bushing orifice, or changing the size of a component of a particular station. Additionally the machine of the present invention may altered to accommodate different transportation means-different indexing devices, like an indexing drum.

The machine of the present invention is flexible to accept a variety of manufacturing processes on the same machine. Different manufacturing processes are created by the number, sequence and variety of manufacturing stations around the closed manufacturing path. The stations around the path may be changed in a number of ways including: adding or removing manufacturing stations, turning on or turning off stations and rearranging the order of the stations.

The following figures will illustrate some of the possible configurations of a machine of the present invention which result in a variety of manufacturing methods.

Figure 33:
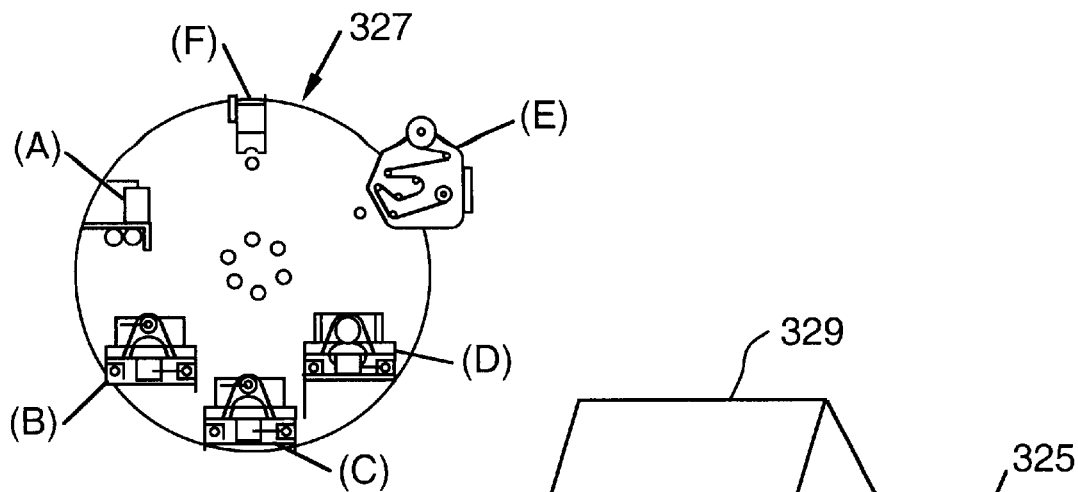
FIG. 33 is a schematic view from the front of the machine of FIG. 32.
Figure 32:
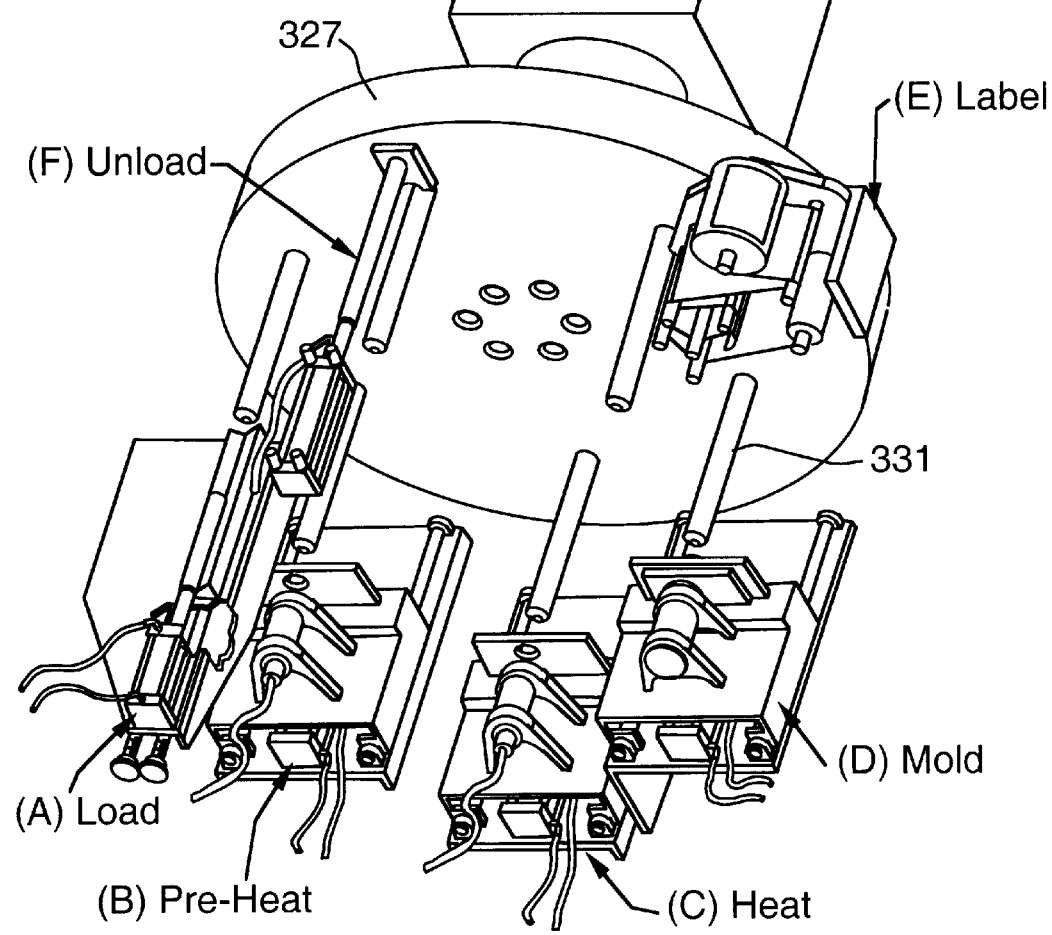
FIG. 32 is a schematic view of the machine of a fourth embodiment.

FIG. 32 illustrates a machine 325, shown without a frame, having an indexing table 327 which rotates counterclockwise in response to indexer 329; 6 manufacturing stations: load (A), preheat (B), heat (C), mold (D), label (E) and unload (F); 6 mandrels 331; and a manufacturing path capable of 6 process steps, namely: loading, preheating, heating, molding, labeling and unloading. FIG. 33 is a front view of the closed manufacturing path.

Even in the embodiment of FIG. 32, the manufacturing path may be rearranged so that labelling is performed prior to heating and molding. To do this the label (E) station would be moved to a mandrel upstream of the preheat (B) station. The advantage of a machine with six manufacturing stations and six mandrels is that it is compact, easy to operate, simple in design and consumes small amounts of power, air, electricity and other inputs.

Figure 35:
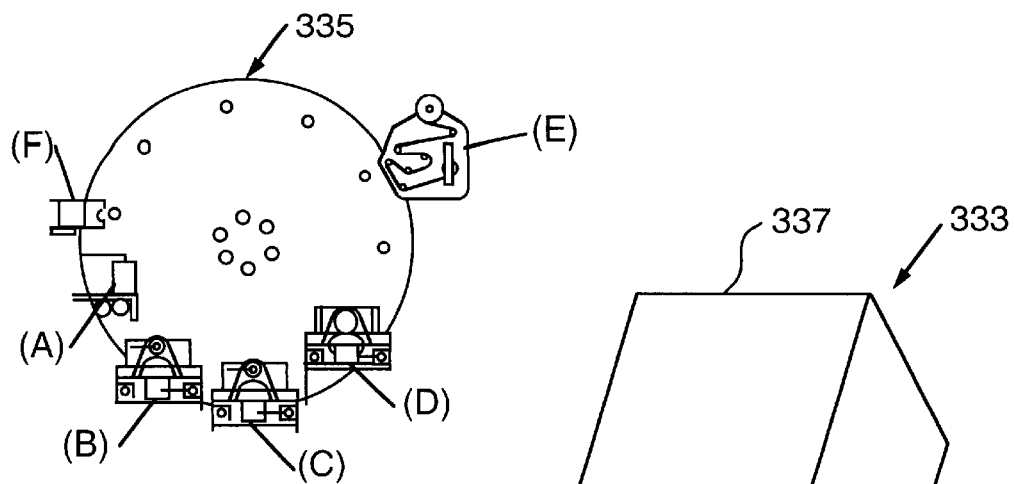
FIG. 35 is a schematic view from the front of the machine of FIG. 34.
Figure 34:
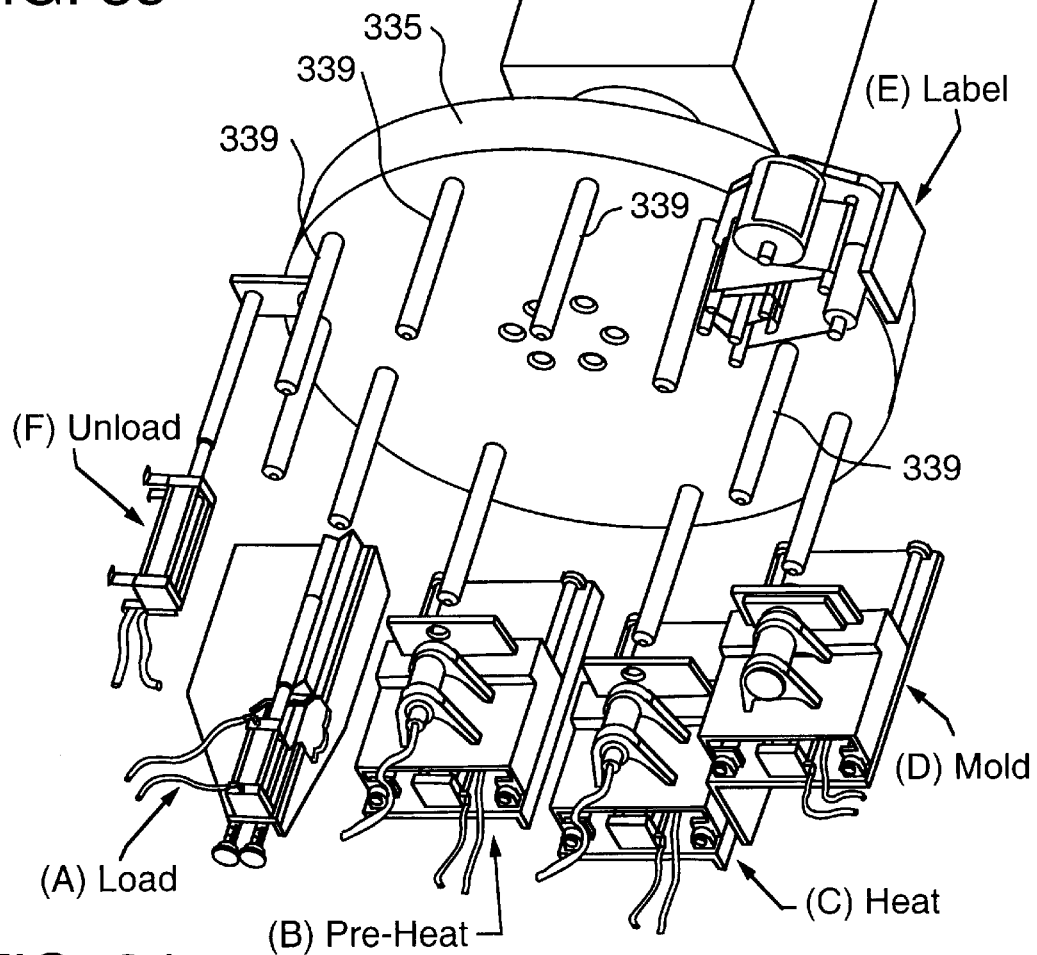
FIG. 34 is a schematic view of a machine of a fifth embodiment.

FIG. 34 illustrates a machine 333, shown without a frame, having an indexing table 335 which rotates counterclockwise in response to indexer 337; 6 manufacturing stations: load (A), preheat (B), heat (C), mold (D), label (E) and unload (F); 10 mandrels 339; and a manufacturing path capable of 6 process steps, namely: loading, preheating, heating, molding, labeling and unloading. FIG. 35 is a front view of the closed manufacturing path. Machine 333 has 4 expansion mandrels for the addition of manufacturing stations in the future. Machine 333 has the potential to accept more manufacturing process methods than machine 325 of FIG. 32 because of the expansion mandrels.

FIG. 36 illustrates a machine 341, shown without a frame, having an indexing table 343 which rotates counterclockwise in response to indexer 345; 10 manufacturing stations: load (A), preheat (B), heat (C), mold (D), label (E), inspect (F), inspect (G), unload (H), reject (I) and confirm (J); 14 mandrels 347; and a manufacturing path capable of 10 process steps, namely: loading, preheating, heating, molding, labeling, first inspecting, second inspecting, unloading, rejecting and confirming. FIG. 37 is a front view of the closed manufacturing path. Four expansion mandrels allow for the addition of other manufacturing stations as well as the flexibility to rearrange the manufacturing path illustrated in FIG. 36.

Figure 38:
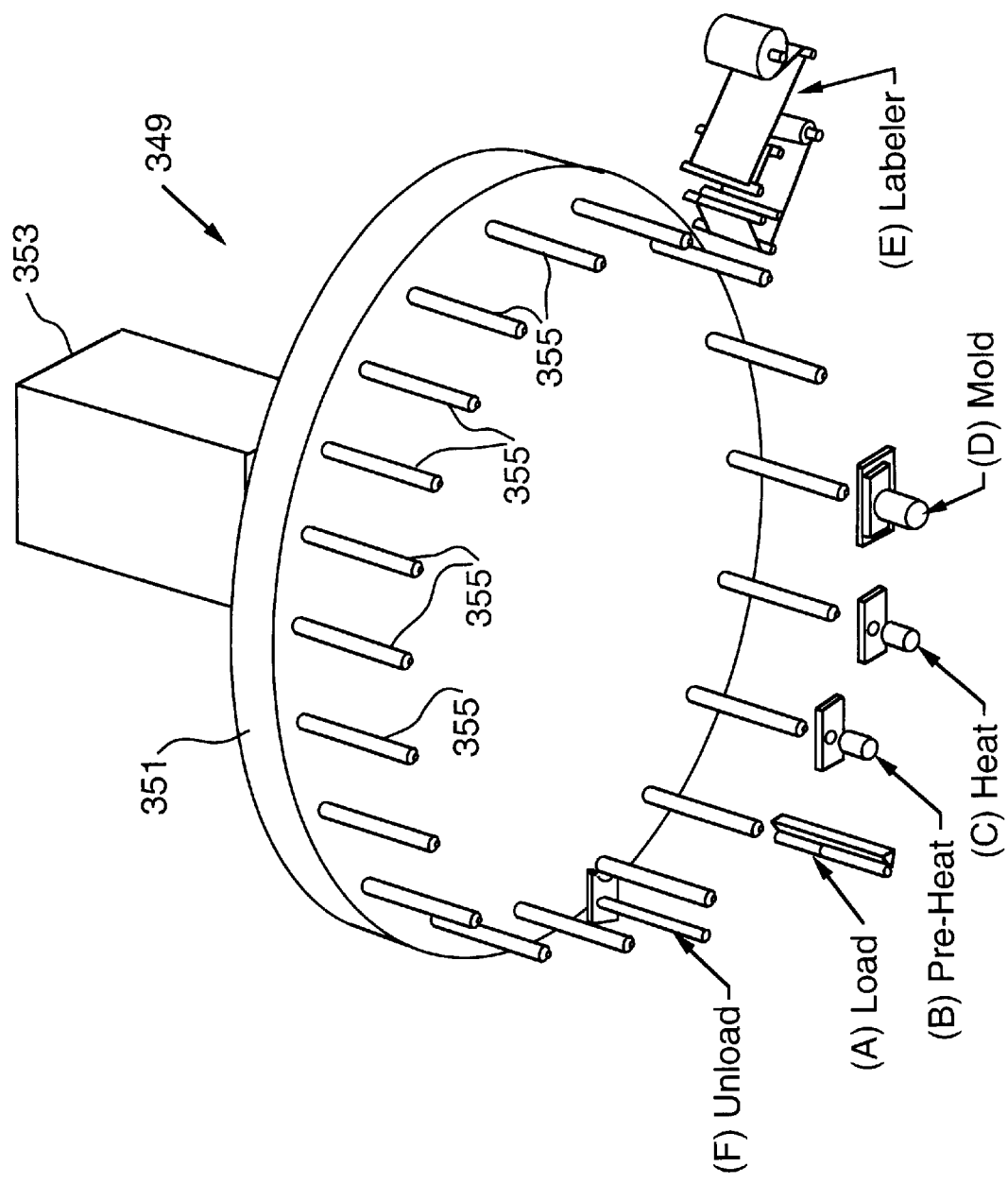
FIG. 38 is a schematic view of a machine of a seventh embodiment.

FIG. 38 illustrates a machine 349, shown without a frame and shown with only partial views of the manufacturing stations, having an indexing table 351 which rotates counterclockwise in response to indexer 353; 6 manufacturing stations: load (A), preheat (B), heat (C), mold (D), label (E) and unload (F); 20 mandrels 355; and a manufacturing path capable of 6 process steps, namely: loading, preheating, heating, molding, labeling and unloading. If space is not a constraint, machines with larger indexing tables may be built for the future potential of manufacturing expansion.

Figure 39:
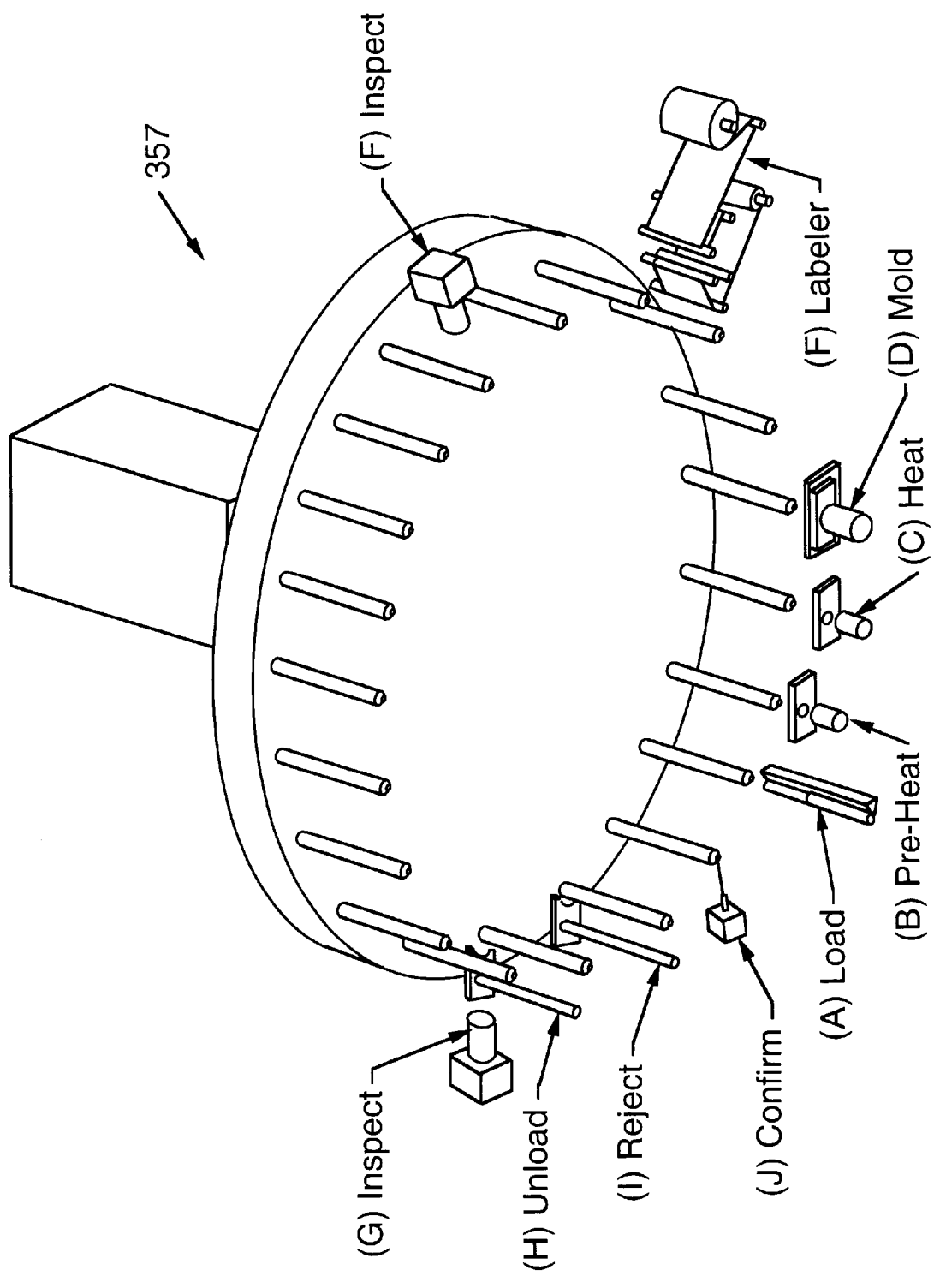
FIG. 39 is a schematic view of a machine of an eighth embodiment.

The machine 357 illustrated in FIG. 39 is similar to that of FIG. 38, having five additional manufacturing stations: inspect (F), inspect (G), unload (H), reject (I) and confirm (J) stations.

Figure 41:
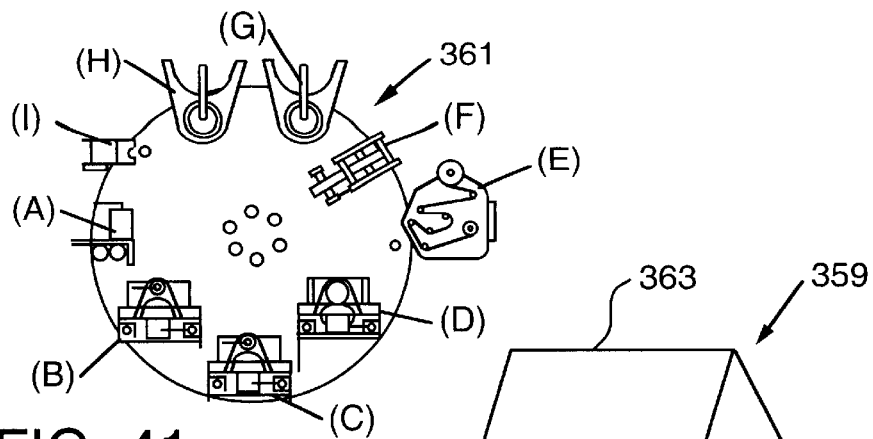
FIG. 41 is a schematic view from the front of the machine of FIG. 40.
Figure 40:
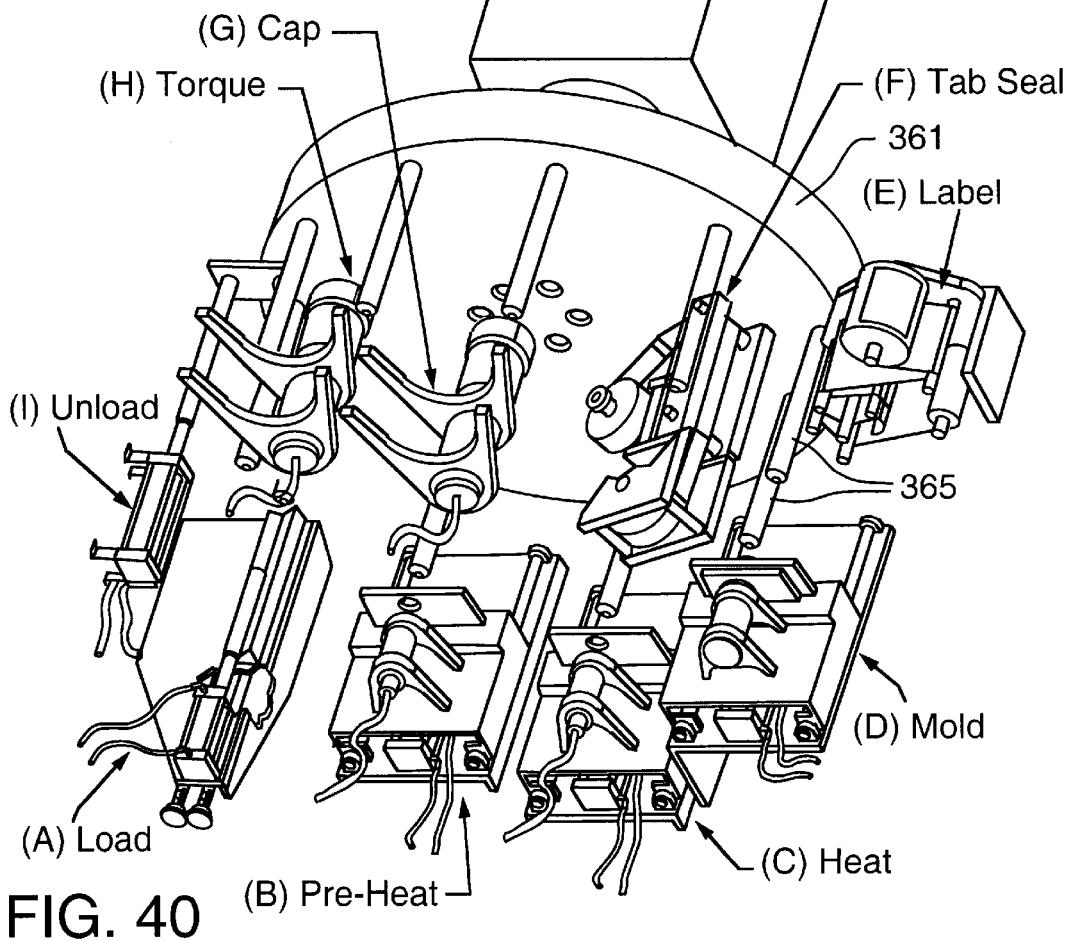
FIG. 40 is a schematic view of a machine of a ninth embodiment.

FIG. 40 illustrates a machine 359, shown without a frame, having an indexing table 361 which rotates counterclockwise in response to indexer 363; 9 manufacturing stations: load (A), preheat (B), heat (C), mold (D), label (E), tab seal (F), cap (G), torque (H) and unload (I); 9 mandrels 365; and a manufacturing path capable of 9 process steps, namely: loading, preheating, heating, molding, labeling, tab sealing, capping, torquing, and unloading. FIG. 41 is a front view of the closed manufacturing path. This manufacturing machine is compact in size and has the ability to manufacture headed, labelled, tab sealed, capped and torqued thermoplastic tubes.

Figure 43:
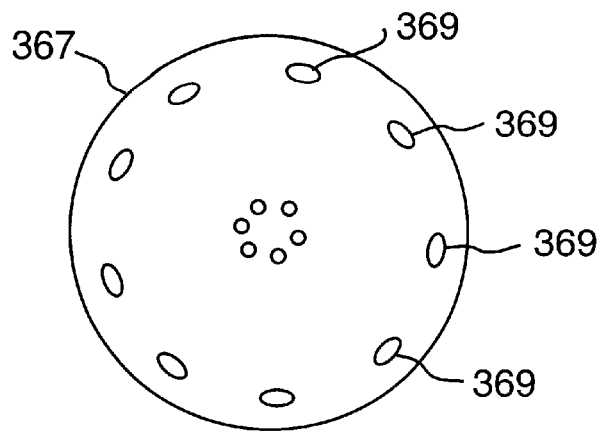
FIG. 43 is a schematic view from the front of the machine of FIG. 42.
Figure 42:
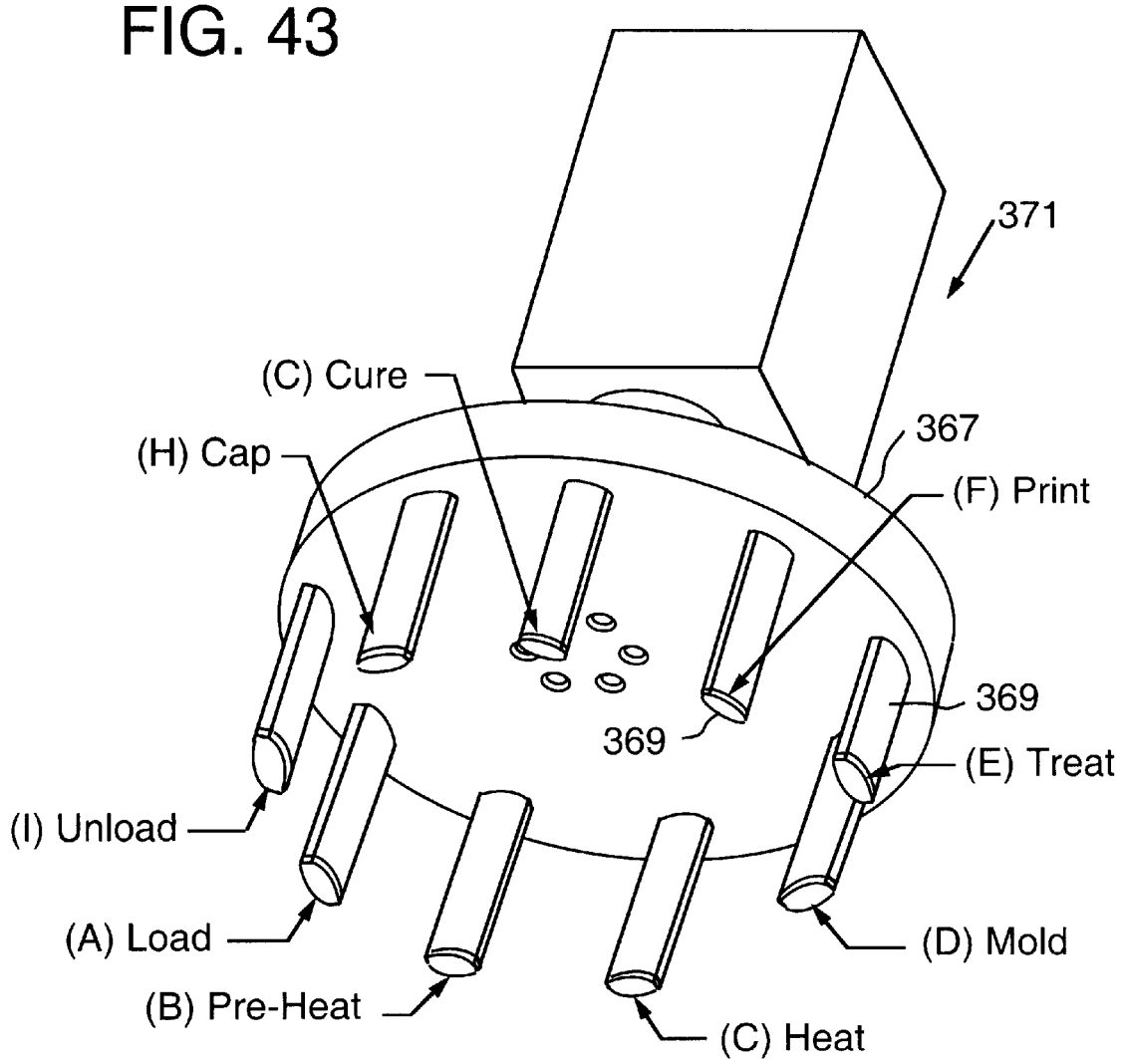
FIG. 42 is a schematic view of a machine of a tenth embodiment.

FIG. 42 shows a machine 371 of the present invention having an indexing table 367 upon which is mounted a plurality of oval forming mandrels 369, for holding oval thermoplastic sleeves to form oval thermoplastic tubes. Oval thermoplastic tubes are formed in a manufacturing path, schematically represented, having 9 manufacturing stations and corresponding process steps: load (A), preheat (B), heat (C), mold (D), treat (E), print (F), cure (G), cap (H) and unload (I). FIG. 43 is a front view of indexing table 367 with oval mandrels 369.

Figure 45:
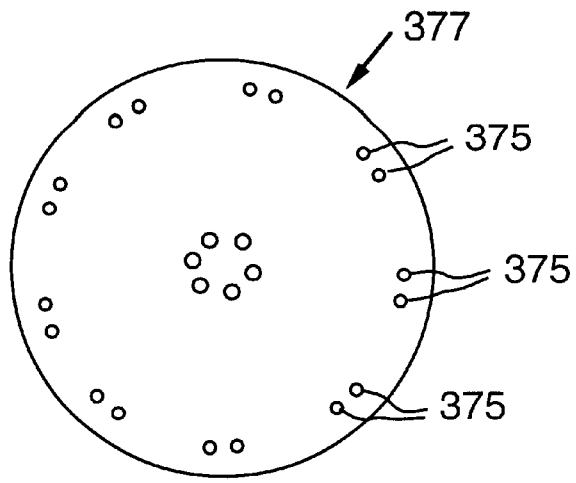
FIG. 45 is a schematic view from the front of the machine of FIG. 44.
Figure 44:
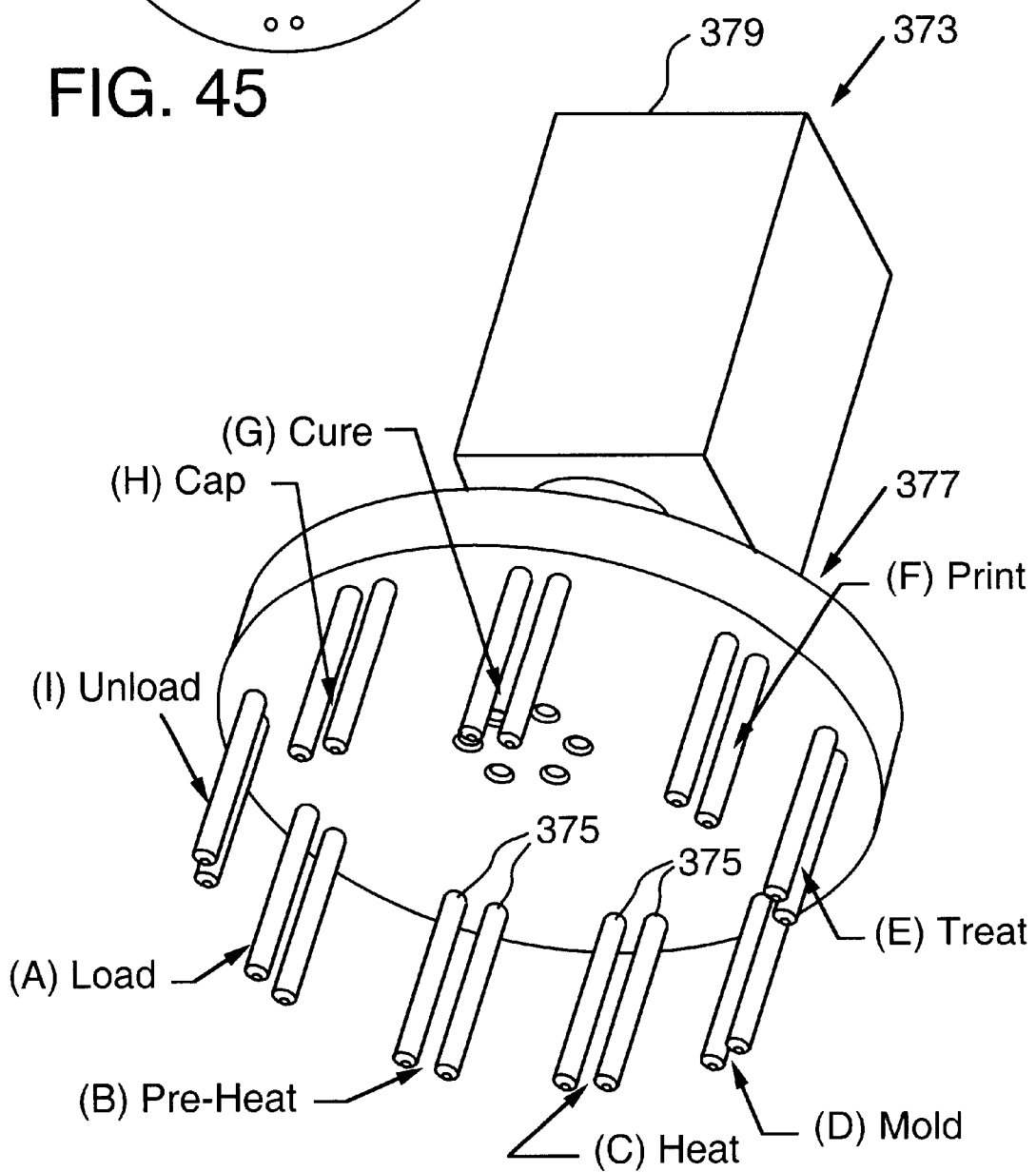
FIG. 44 is a schematic view of a machine of an eleventh embodiment.

FIG. 44 illustrates a tooling change for a machine 373 of the present invention capable of manufacturing twice as many thermoplastic tubes. Pairs of mandrels 375 are positioned side by side with only a small gap between them on indexing table 377 which rotates in response to indexer 379 so that the manufacturing stations can work on two thermoplastic articles simultaneously. The manufacturing stations may need to be altered slightly to accommodate two articles. FIG. 45 is a front view of machine 373.

Figure 46:
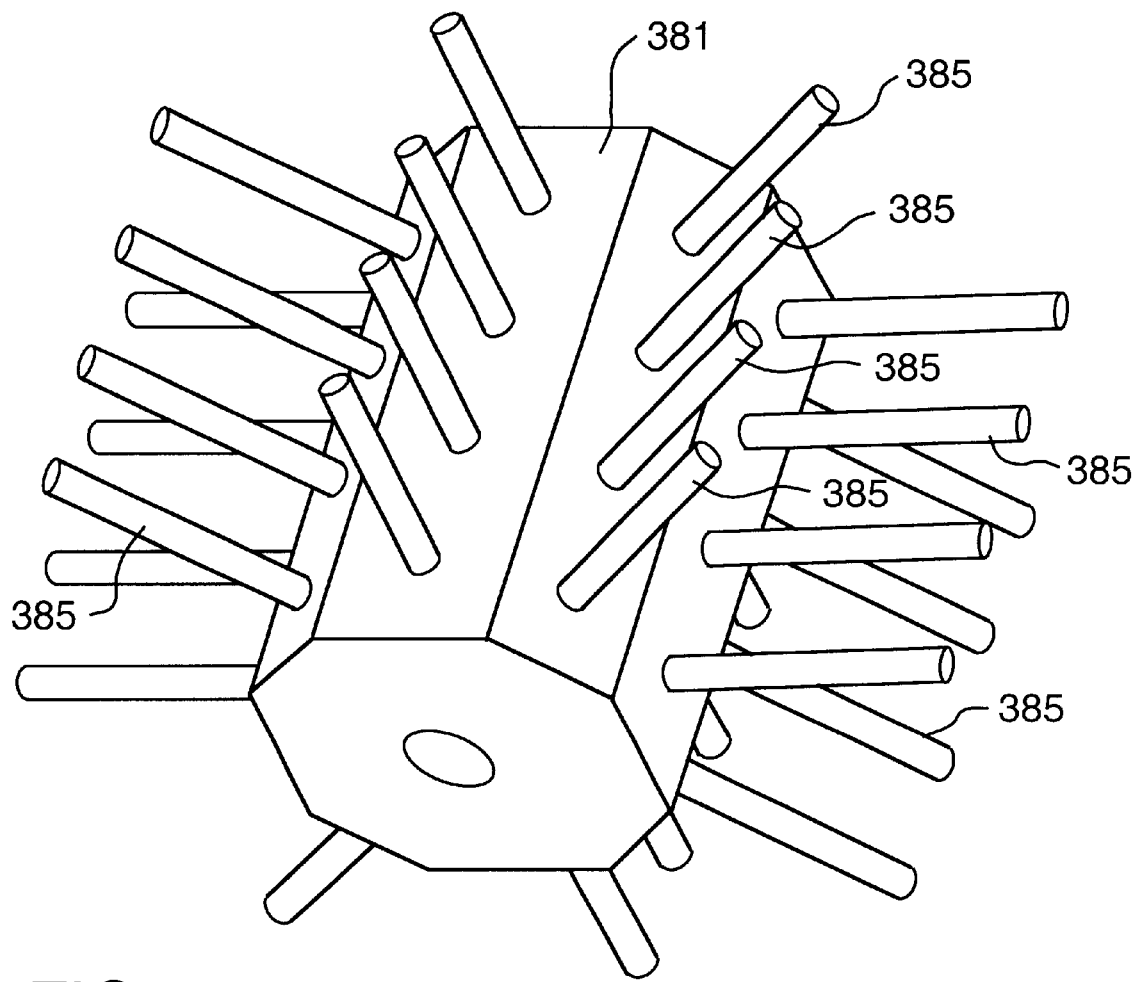
FIG. 46 is a schematic view of one embodiment of an indexing drum.
Figure 47:
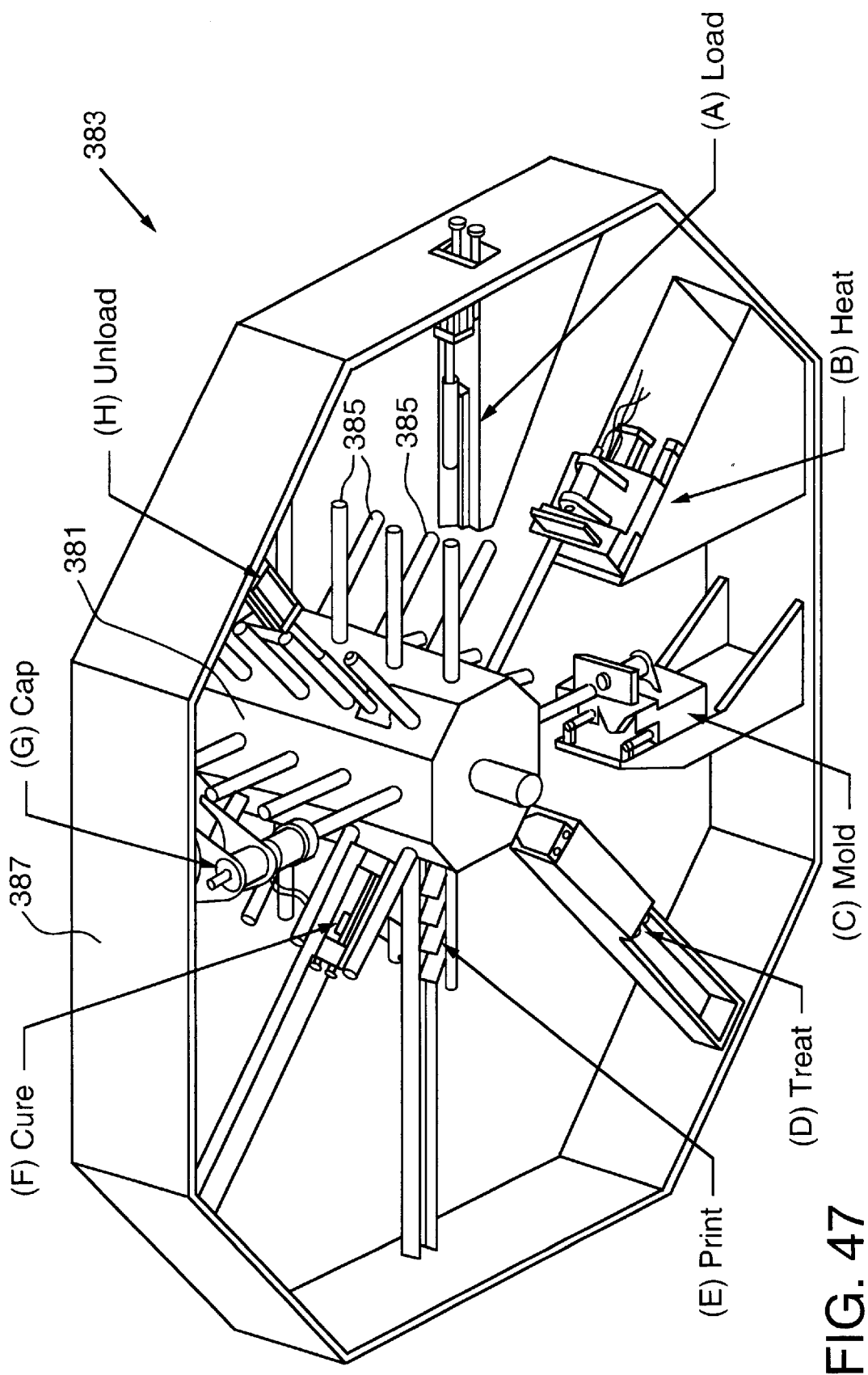
FIG. 47 is a schematic view of a machine of the present invention with an indexing drum as the indexing device.

Alternatively instead of an indexing table, an indexing drum 381 (FIG. 46) may be used as the indexing device in a machine 383 of the present invention, shown without complete frame (FIG. 47). Indexing drum 381 is a drum with the cross-sectional shape of a cylinder or polygon having a plurality of means for supporting thermoplastic sleeves, i.e) mandrels 385 around the outside length of the drum. Manufacturing stations for working on thermoplastic sleeves loaded on mandrels 385 are oriented accordingly so they can perform manufacturing steps on the thermoplastic sleeves (FIG. 47).

Machine 383 rotates clockwise in response to an indexer (not shown) around the following 8 manufacturing stations and corresponding manufacturing steps: load (A), heat (B), mold (C), treat (D), print (E), cure (F), cap (G) and unload (H), similar to like stations previously described for machine 85 of the second embodiment of a machine of the present invention. The manufacturing stations (A)–(H) are mounted on a mounting ring 387 which is further mounted on a frame of the machine 383. For clarity, FIG. 47 shows only manufacturing stations (A)–(H) and mounting ring 387 for the first set of mandrels 385 on indexing drum 381. In production, mounting ring 387 would extend the length of indexing drum 381 and all stations (A)–(H) would be repeated for the corresponding mandrels 385. Sleeves would be supplied to all load stations by a chute or transportation means (not shown).

One advantage of a indexing drum is that more thermoplastic tubes may be produced in a compact space by simply extending the indexing drum and adding more mandrels for supporting thermoplastic sleeves and additional manufacturing stations mounted on a mounting ring. The description of the process method and process control of a machine of the present invention herein applies to a machine having an indexing drum.

While there has been illustrated and described several embodiments of the present invention, it will be apparent that various changes and modifications thereof will occur to those skilled in the art. It is intended in the appended claims to cover all such changes and modifications that fall within the true spirit and scope of the present invention.

What is claimed is:

1. An apparatus for converting thermoplastic sleeves into completed thermoplastic tubes, with each completed tube having a head, comprising:

an indexing device rotatable about a shaft, means for supporting sleeves in a horizontal orientation mounted on said indexing device for advancement along a closed path in response to relative rotation of said indexing device in a predetermined direction;

a frame for mounting said indexing device and a plurality of manufacturing stations, said plurality of manufacturing stations comprising:

means for loading said sleeves onto said supporting means in a first location of said closed path;

means for forming a head on each sleeve, from thermoplastic material of the sleeve, to form tubes in a forming location of said closed path downstream of said first location, said means being in the horizontal orientation, said means for forming of a head on said sleeves to create tubes further comprises:

means for disposing the longitudinal axis of the forming mandrel in horizontal orientation;

means for rotating each of said forming mandrels about said axis, means for heating the inner wall surface of said exposed portion of each said longitudinally stretched, extruded thermoplastic sleeve during said rotating by a heat source so that the shape of the exposed portion is controlled and the exposed portion is heated uniformly, wherein the heated exposed portion shrinks and thickens to draw the heated exposed portion into a bullet-shaped exposed portion;

means for stopping the rotating of said forming mandrel; and means for pressing the heated exposed portion with sufficient force into a mold cavity to form a head on each said thermoplastic sleeves from the bullet-shaped exposed portion to thereby form said headed thermoplastic tube;

means for completing said tubes in at least one location of said closed path downstream of said forming location; and means for unloading said tubes from said supporting means in a location of said closed path downstream of said at least one completing location.

2. The apparatus according to claim 1 wherein, said means for loading sleeves onto said supporting means is a member selected from the group consisting of a push rod driven by an air cylinder; a push rod driven by a cam driver; an advancing and retracting linear actuator; a crank motion device and a servo-motor driven push rod.

3. The apparatus according to claim 1 wherein, said means for forming a head on said sleeve is a member selected from the group consisting of a heater and a mold die; a sonic welder and a heat welder.

4. The apparatus according to claim 1 wherein, said means for unloading said tubes from said supporting means is a member selected from the group consisting of a stripper driven by an air cylinder; a stripper driven by a cam driver; an advancing and retracting linear actuator; an air blower; a crank motion stripper and a servo-motor driven stripper.

5. The apparatus according to claim 1 wherein, said apparatus further comprises a PLC device connected to said indexing device, said loading means, said head forming means and said unloading means.

6. The apparatus according to claim 1, wherein said indexing device is a member selected from the group consisting of an indexing table and an indexing drum.

7. An apparatus for converting thermoplastic sleeves into completed thermoplastic tubes, with each completed tube having a head, comprising:

an indexing device rotatable about a shaft;

means for supporting sleeves in a horizontal orientation mounted on said indexing device for advancement along a closed path in response to relative rotation of said indexing device in a predetermined direction;

a frame for mounting said indexing device and a plurality of manufacturing stations;

said plurality of manufacturing stations comprising:

means for loading said sleeves onto said supporting means in a first location of said closed path;

means for forming a head on each sleeve, from thermoplastic material of the sleeve, to form tubes in a forming location of said closed path downstream of said first location, said means being in the horizontal orientation, said means for forming of a head on said sleeves to create tubes further comprises:

means for disposing the longitudinal axis of the forming mandrel in horizontal orientation, means for rotating each of said forming mandrels about said axis;

means for heating the inner wall surface of said exposed portion of each said longitudinally stretched, extruded thermoplastic sleeve during said rotating by a heat source so that the shape of the exposed portion is controlled and the exposed portion is heated uniformly, wherein the heated exposed portion shrinks and thickens to draw the heated exposed portion into a bullet-shaped exposed portion;

means for stopping the rotating of said forming mandrel; and means for pressing the heated exposed portion with sufficient force into a mold cavity to form a head on each said thermoplastic sleeves from the bullet-shaped exposed portion to thereby form said headed thermoplastic tube;

means for decorating said tubes in at least one location of said closed path downstream of said forming location; and means for unloading said tubes from said supporting means in a location of said closed path downstream of said at least one completing location.

8. The apparatus according to claim 7 wherein, said means for loading sleeves onto said supporting means is a member selected from the group consisting of a push rod driven by an air cylinder; a push rod driven by a cam driver; an advancing and retracting linear actuator; a crank motion device and a servo-motor driven push rod.

9. The apparatus according to claim 7 wherein, said means for forming a head on said sleeve is a member selected from the group consisting of a heater and a mold die; a sonic welder and a heat welder.

10. The apparatus according to claim 7, wherein said means for decorating is at least one member selected from the group consisting of labeler; offset printer; inkjet printer; screen printer; letter printer; computer printer; coater; embosser and etcher.

11. The apparatus according to claim 7 wherein, said means for unloading said tubes from said supporting means is a member selected from the group consisting of a stripper driven by an air cylinder; a stripper driven by a cam driver; an advancing and retracting linear actuator; a crank motion stripper and a servo-motor driven stripper.

12. The apparatus according to claim 7 wherein, said apparatus further comprises a PLC device connected to said indexing device, said loading means, said head forming means, said decorating means and said unloading means.

13. The apparatus according to claim 7, wherein said indexing device is a member selected from the group consisting of an indexing table and an indexing drum.

14. An apparatus for converting thermoplastic sleeves into completed thermoplastic tubes with each completed tube having a head, comprising:

an indexing device rotatable about a shaft;

means mounted on said indexing device for supporting sleeves in a horizontal orientation for advancement along a closed path in response to relative rotation of said indexing device in a predetermined direction;

a frame for mounting said indexing device and a plurality of manufacturing stations;

said plurality of manufacturing stations comprising:

means for loading said sleeves onto said supporting means in a first location of said closed path;

means for forming a head on each sleeve, from thermoplastic material of the sleeve, to form tubes in a forming location of said closed path downstream of said first location, said means being in the horizontal orientation, said means for forming of a head on said sleeves to create tubes further comprises:

means for disposing the longitudinal axis of the forming mandrel in horizontal orientation;

means for rotating each of said forming mandrels about said axis;

means for heating the inner wall surface of said exposed portion of each said longitudinally stretched, extruded thermoplastic sleeve during said rotating by a heat source so that the shape of the exposed portion is controlled and the exposed portion is heated uniformly, wherein the heated exposed portion shrinks and thickens to draw the heated exposed portion into a bullet-shaped exposed portion;

means for stopping the rotating of said forming mandrel; and means for pressing the heated exposed portion with sufficient force into a mold cavity to form a head on each said thermoplastic sleeves from the bullet-shaped exposed portion to thereby form said headed thermoplastic tube;

means for decorating said tubes in a location of said closed path downstream of said forming location;

means for finishing said tubes in a location of said closed path downstream of said decorating location; and means for unloading said tubes from said supporting means in a location of said closed path downstream of said finishing location.

15. The apparatus according to claim 14, wherein said means for finishing said tubes is a member selected from the group consisting of a tab sealer; a capping device; a torquing device and an inspecting device.

16. The apparatus according to claim 14, wherein said indexing device is a member selected from the group consisting of an indexing table and an indexing drum.

* * * * *